United States Patent [19]
Yamamoto

[11] Patent Number: 6,044,076
[45] Date of Patent: Mar. 28, 2000

[54] NETWORK SYSTEM FOR TRANSMITTING A PLURALITY OF CHANNELS, AND NODE DEVICE, PACKET TRANSMISSION METHOD, TERMINAL EQUIPMENT CONNECTION TABLE GENERATION METHOD, AND CONNECTION INFORMATION REGISTRATION METHOD USED IN THE SYSTEM

[75] Inventor: Mitsuru Yamamoto, Yokohama, Japan

[73] Assignee: Canon Kabushiki Kaisha, Tokyo, Japan

[21] Appl. No.: 08/659,933

[22] Filed: Jun. 7, 1996

[30] Foreign Application Priority Data

| Jun. 9, 1995 | [JP] | Japan | ................................... 7-168237 |
| Jun. 20, 1995 | [JP] | Japan | ................................... 7-176780 |
| Jun. 20, 1995 | [JP] | Japan | ................................... 7-176781 |
| Jul. 3, 1995 | [JP] | Japan | ................................... 7-189785 |

[51] Int. Cl.$^7$ .................................................. H04J 14/02
[52] U.S. Cl. .......................... 370/392; 370/431; 370/464; 359/124
[58] Field of Search .................................... 370/389, 392, 370/394, 60, 248, 249, 351, 400, 401, 402, 409, 410, 406, 431, 464; 395/377, 280; 359/124, 115, 117, 118, 125, 127, 128

[56] References Cited

U.S. PATENT DOCUMENTS

| 5,422,881 | 6/1995 | May et al. ................................. 370/60 |
| 5,517,500 | 5/1996 | White et al. ............................ 370/85.1 |
| 5,546,387 | 8/1996 | Larsson et al. ............................ 370/60 |
| 5,577,028 | 11/1996 | Chugo et al. ............................. 370/409 |
| 5,630,151 | 5/1997 | Muramatsu et al. ..................... 395/377 |
| 5,675,578 | 10/1997 | Gruber et al. ........................... 370/248 |
| 5,708,659 | 1/1998 | Rostoker et al. ........................ 370/392 |

OTHER PUBLICATIONS

IEEE Network, vol. 6, No. 4, Jul. 1992, pp. 20–32, Mukherjee, "WDM–Based Local Lightwave Networks Part II: Multihop Systems".

*Primary Examiner*—Huy D. Vu
*Attorney, Agent, or Firm*—Fitzpatrick, Cella, Harper & Scinto

[57] ABSTRACT

A source terminal equipment connected to a node device transmits a packet by appending a section for designating the channel to be used upon relaying the packet by the node device to the packet. The relaying node device determines the channel used upon outputting the packet by looking up the value in the section for designation of the channel. The source terminal equipment transmits the packet by appending relaying number information indicating the number of relayings of the packet to the packet. Each node device looks up the relaying number information upon looking up the value in the section for designation of the channel. When each node device outputs a packet to a terminal equipment using a separation device for separating the packet toward the sub transmission path side, the node devices determines, based on the relaying number information, whether or not it separates the packet. This invention also discloses a method of generating a terminal equipment connection table and a method of registering connection information using the above-mentioned transmission method.

44 Claims, 33 Drawing Sheets

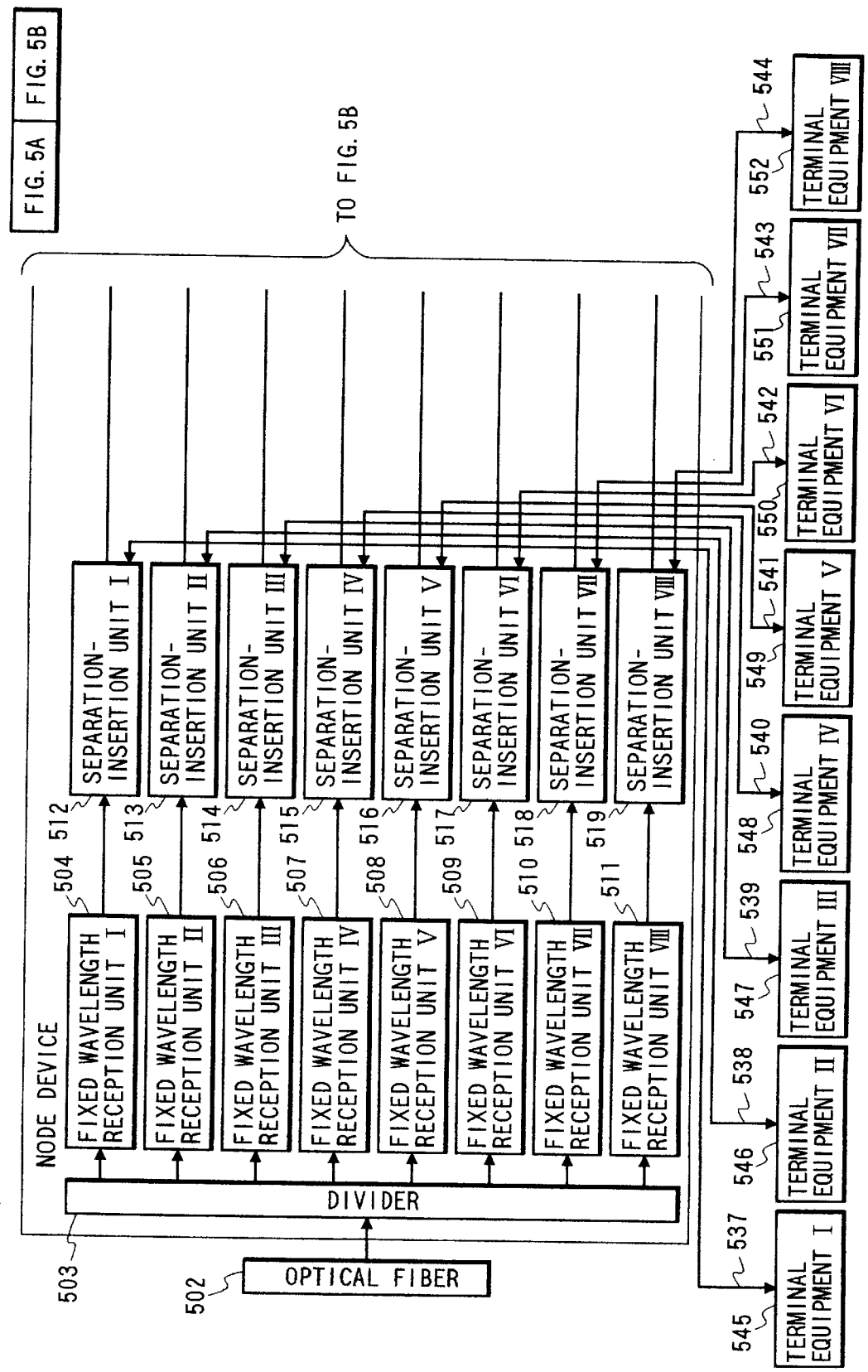

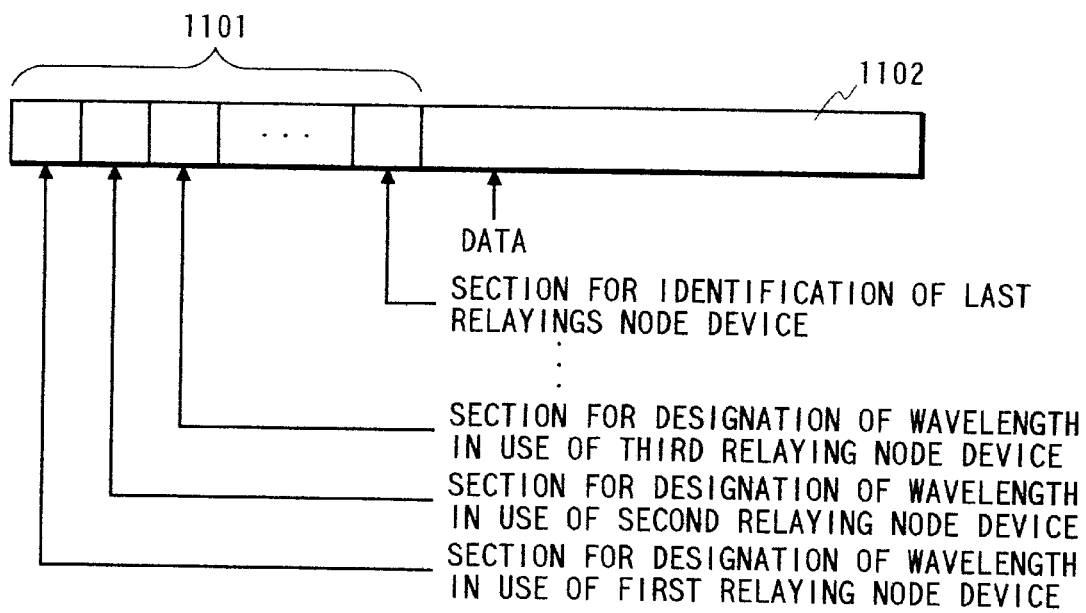
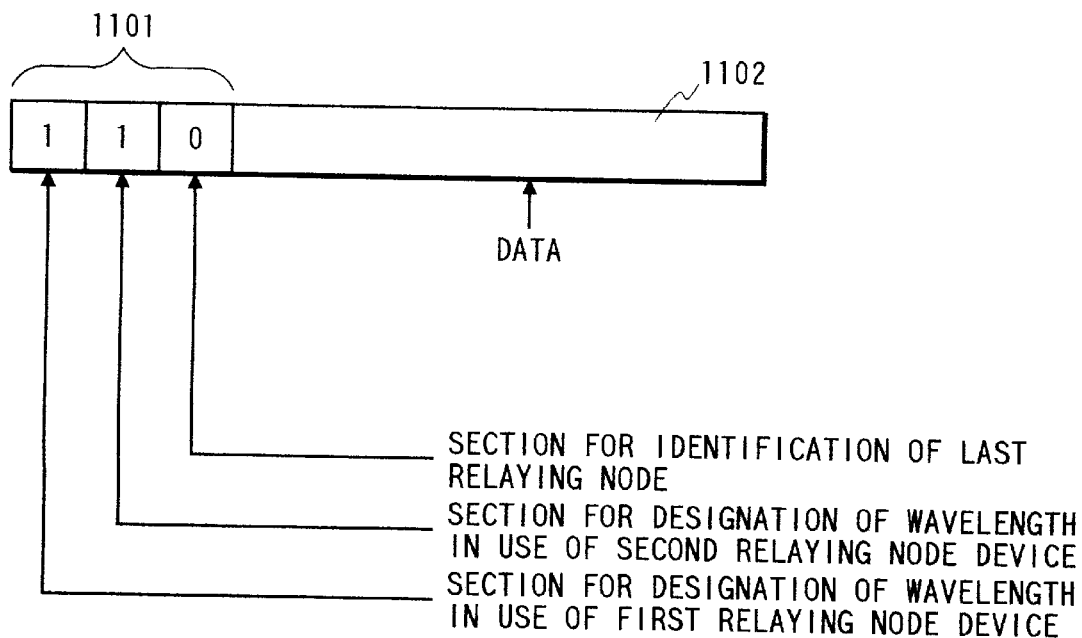

NETWORK SYSTEM FOR TRANSMITTING A PLURALITY OF CHANNELS, AND NODE DEVICE, PACKET TRANSMISSION METHOD, TERMINAL EQUIPMENT CONNECTION TABLE GENERATION METHOD, AND CONNECTION INFORMATION REGISTRATION METHOD USED IN THE SYSTEM

BACKGROUND OF THE INVENTION

1. Field of the Invention

The present invention relates to a network system, a node device and a communication method for the network system and, more particularly, to a node device for connecting a plurality of terminal equipments, a network system constituted by a channel multiplex transmission path using a plurality of channels (wavelengths or the like) for connecting a plurality of node devices, and a multihop transmission method, in the node device and the network system, for converting data to be transmitted into a packet, and relaying and transmitting the packet by a node device or devices located on the transmission route between the source terminal equipment and the destination terminal equipment.

The present invention also relates to a terminal equipment connection table generation method for setting packet addresses, and a connection information registration method for registering connection information of the own terminal equipment to the network in another terminal equipment.

2. Related Background Art

In recent years, in order to realize a high-speed network that connects terminal equipments in correspondence with high-speed terminal equipments, various kinds of network systems that use an optical wavelength multiplex transmission path using a plurality of wavelengths have been examined. As one of these network systems, a multihop network system which relays and transmits a packet by a node device or devices located on the transmission route between the source equipment and the destination terminal equipment is known. This system is explained in "WDM-Based Local Lightwave Networks Part II: Multihop Systems", Biswanath Mukherjee, IEEE Network, July (1992), pp. 20–32.

FIG. 1 shows the connection arrangement of node devices 101 to 112 in a first multihop system. Eight rings are constituted by using eight wavelengths $\lambda 1$ to $\lambda 8$ in a single optical fiber, and each node device transmits/receives only optical signals of two specific wavelengths indicated by marks o. FIG. 2 shows the arrangement of the node device. Fixed wavelength receiving means I 201 and II 205 respectively receive optical signals of predetermined wavelengths assigned to each node device. A 3×3 exchange SW 202 has three input terminals and three output terminals. The exchange SW 202 receives a total of three data, i.e., the two outputs from the two fixed wavelength receiving means 201 and 205, and transmission data output from a packet processing unit 208 to another node device via a sub transmission path, and outputs these data to one of FIFOs I 203 and II 206, and the packet processing unit 208 connected thereto via the sub transmission path. The FIFOs I 203 and II 206 temporarily store data of optical signals transmitted from fixed wavelength transmitting means I 204 and II 207. The fixed wavelength transmitting means I 204 and II 207 transmit optical signals at fixed wavelengths designated for each node device.

FIG. 3 shows the format of a packet to be transmitted in the first multihop system. Referring to FIG. 3, the packet has an address portion 301 indicating the destination terminal equipment of this packet, and a data portion 302 to be carried by the packet.

FIG. 4 shows the arrangement of the 3×3 exchange SW 202. Referring to FIG. 4, each of decoders 401 reads the destination address of an input packet, and outputs, to an SW control unit 402, output designation data for designating one of outputs X, Y, and Z as an output destination of this packet. The SW control unit 402 performs arbitration control on the basis of the output designation data output from the decoders 401, so that packets input from inputs A, B, and C do not collide in a 3×3 SW 403, and thereafter, sets connections between the inputs A, B, and C and the outputs X, Y, and Z of the 3×3 SW 403. The 3×3 SW 403 outputs packets input from the inputs A, B, and C to predetermined ones of the outputs X, Y, and Z under the control of the SW control unit 402.

In the node device of the first multihop system, packets output from three means, i.e., the fixed wavelength receiving means I 201 and II 205 and the packet processing unit 208 are input from the inputs A, B, and C. Each decoder 401 reads the address of the destination terminal equipment of an input packet, one of the fixed wavelength transmitting means I 204 and II 207 as an output destination for transmitting a packet at a predetermined transmission wavelength corresponding to the reading address or the packet processing unit 208 for performing packet reception processing is selected, and the connections between the inputs and outputs of the 3×3 SW 403 are set under the control of the SW control unit 402. Then, the packet is output from a desired output destination.

In the network system using the above-mentioned node device, for example, when a packet is to be transmitted from the node device 102 to the node device 109, if the transmission wavelength of the node device 102 is different from the reception wavelength of the node device 109, the node device 105 located therebetween performs a relaying operation for changing the wavelength of the packet and transmitting the packet. More specifically, the node device 102 serving as a source transmits a packet using an optical signal of the wavelength $\lambda 3$. The optical signal of the wavelength $\lambda 3$ is received by the fixed wavelength receiving means of the node device 105, and is temporarily stored by the 3×3 exchange SW 202 in the FIFO corresponding to the fixed wavelength transmitting means of the wavelength $\lambda 1$. Then, the packet is transmitted from the fixed wavelength transmitting means as an optical signal of the wavelength $\lambda 1$. The optical signal of the wavelength $\lambda 1$ is received by the fixed wavelength receiving means of the node device 109 serving as a destination, and is input to the packet processing unit 208 via the 3×3 exchange SW 202. The packet is then subjected to predetermined reception processing in the packet processing unit 208. In this manner, in the node device which relays and transmits a packet, the transmission wavelength is switched to the wavelength corresponding to the destination address 301 decoded by the corresponding decoder 401, and the packet is transmitted at the switched wavelength.

The arrangement of a node device used in a multihop system invented by the present inventors will be described below for the purpose of a reference. FIGS. 5A and 5B show the arrangement of a node device of this example. Referring to FIGS. 5A and 5B, a control section 501 controls the reading operations of buffers I 520 to VIII 527, and also controls the transmission wavelengths of variable wavelength transmission units I 528 to VIII 535. An optical fiber 502 serves as an optical wavelength multiplex transmission path. A divider 503 divides an optical signal transmitted from the optical fiber 502 and outputs the divided optical signal to eight fixed wavelength reception units I 504 to VIII 511. Each of the fixed wavelength reception units I 504 to VIII 511 receives only a packet transmitted as an optical signal of a corresponding one of wavelengths λ1 to λ8. Separation-insertion units I 512 to VIII 519 have a function of separating packets to be transmitted to sub transmission paths I 537 to VIII 544 from packet flows output from the fixed wavelength reception units 504 to 511 and outputting them onto the sub transmission paths I 537 to VIII 544, and a function of inserting packets transmitted from the sub transmission paths I 537 to VIII 544 into the packet flows output from the fixed wavelength reception units 504 to 511. The buffers I 520 to VIII 527 have a function of temporarily storing packets output from the separation-insertion units 512 to 519. Each of the variable wavelength transmission 535 converts a packet output from a corresponding one of the buffers 520 to 527 into an optical signal of a predetermined one of the wavelengths λ1 to λ8 under the control of the control section 501, and outputs the converted signal onto the optical fiber 502 via a wavelength multiplexer 536. These variable wavelength transmission units are controlled so that multiple variable wavelength transmission units do not transmit packets using an identical wavelength. The wavelength multiplexer 536 multiplexes optical signals of the wavelengths λ1 to λ8 output from the eight variable wavelength transmission units 528 to 535, and outputs the multiplexed signal onto the optical fiber 502. The sub transmission paths I 537 to VIII 544 serve as packet transmission paths between the separation-insertion units 512 to 519 and terminal equipments I 545 to VIII 552. The terminal equipments I 545 to VIII 552 are respectively connected to the sub transmission paths I 537 to VIII 544. These terminal equipments receive packets output from the separation-insertion units 512 to 519, generate packets to be transmitted to other terminal equipments, and transmit them to the separation-insertion units 512 to 519 via the sub transmission paths 537 to 544.

Note that the format of a packet in the second multihop system as the example is the same that to be transmitted in the above-mentioned first multihop system.

FIG. 6 shows the arrangement of a network system using the node device of the second multihop system shown in FIGS. 5A and 5B, and exemplifies a case wherein four node devices are connected via optical fibers. Node devices 601 to 604 are equivalent to that shown in FIGS. 5A and 5B, and eight terminal equipments are connected to each node device via eight sub transmission paths. Optical fibers 605 to 608 constitute an optical wavelength multiplex transmission path.

FIG. 7 shows the internal arrangement of each of the separation-insertion units I 512 to VIII 519 used in the node device of the second multihop system. The separation-insertion units I to VIII have the same internal arrangement. Referring to FIG. 7, a decoder I 701 reads a destination address 301 of an input packet and instructs a demultiplexer 702 as to whether or not this packet is to be output to an I/F (Interface) unit 703. The demultiplexer 702 outputs an input packet to the I/F unit 703 or a FIFO II 705 in accordance with an instruction from the decoder I 701. The I/F unit 703 outputs a packet output from the demultiplexer 702 onto the sub transmission path, and outputs a packet input from the sub transmission path to a FIFO I 704. The FIFOs I 704 and II 705 temporarily store input packets, and output the stored packets to a selector I 707 in the input order under the control of an insertion control unit 706. The insertion control unit 706 controls the reading operations of the FIFOs I 704 and II 705, and instructs the selector I 707 of the FIFO to be selected, thereby inserting a packet transmitted from the sub transmission path into a packet flow output from the fixed wavelength reception unit. The selector I 707 selects the FIFO that stores a packet signal to be output in accordance with an instruction from the insertion control unit 706.

FIG. 8 shows the detailed arrangement of each of the buffers I to VIII used in the node device of the second multihop system. Referring to FIG. 8, a decoder II 801 reads an address portion 301 indicating the destination terminal equipment of an input packet, and instructs a writing address counter 802 of the writing start address value of a dual port memory 804 in which the packet is to be written in accordance with the destination of the packet. The writing address counter 802 sequentially outputs address signals of the packet to the dual port memory 804 in accordance with the writing start address value output from the decoder II 801. A reading address counter 803 sequentially outputs reading address signals of a packet to the dual port memory 804 using an offset value output from a buffer control unit in the control section 501 as the reading start address. The dual port memory 804 independently performs the writing and reading operations of the packet data 302. The memory region of the dual port memory 804 is divided in correspondence with the wavelengths to be used upon transmission.

FIG. 9 shows the arrangement of the terminal equipment. Referring to FIG. 9, an I/F (Interface) unit 901 outputs a packet output from a packet processing unit 902 onto a corresponding one of the sub transmission paths 537 to 544, and outputs a packet input from the corresponding sub transmission path to the packet processing unit 902. The packet processing unit 902 obtains the value of an address portion 301 corresponding to the destination terminal equipment by looking up a terminal equipment connection table 903, and writes the obtained value in a predetermined section of a header, i.e., adds the value to data to be transmitted to form a packet. Also, the unit 902 removes the header portion of a received packet input via the I/F unit 901, and performs predetermined reception processing. The terminal equipment connection table 903 has address information of the respective terminal equipments connected to this network system. An input/output unit 904 has an interface function such as a keyboard, a display device, and the like.

In the second multihop system described above, a packet output from the source terminal equipment is inserted into a packet flow output from a corresponding one of the fixed wavelength reception units 504 to 511 by a corresponding one of the separation-insertion units 512 to 519. The address of the destination terminal equipment is read by a corresponding one of the buffers 520 to 527, and the packet is temporarily stored in the memory region corresponding to the reading address. Thereafter, the packet is output from a corresponding one of the variable wavelength transmission units 528 to 535 as an optical signal of a predetermined wavelength, and is relayed by the node devices present before the node device to which the destination terminal equipment is connected. In each node device that performs the relaying operation, the address of the destination node device is read by the decoders in the separation-insertion units 512 to 519 and the buffers 520 to 527, and the packet is then written in a predetermined memory region of the dual port memory 804. The stored packet is transmitted from a corresponding one of the variable wavelength transmission units 528 to 535 as an optical signal of a predetermined wavelength. By repeating the relaying operation, a corresponding one of the variable wavelength transmission units 528 to 535 of the node device immediately before the node device, to which the destination terminal equipment is connected, converts the packet into an optical signal of the wavelength to be received by a corresponding one of the fixed wavelength reception units 504 to 511 for outputting packets to the separation-insertion units 512 to 519 to which the sub transmission path 537 to 544 including the destination are connected. The packet output from the variable wavelength transmission unit is received by the predetermined fixed wavelength reception unit, and is then output from the separation-insertion unit to the sub transmission path. Then, the packet is received by the destination terminal equipment. As described above, in the second multihop system, in the relaying operation of the node device, the address 301 of the destination terminal equipment is read, and the packet is transmitted at the transmission wavelength corresponding to the reading address, thereby routing a packet to a desired terminal equipment of a desired node device.

In the first and second multihop systems, since each decoder has a large hardware scale, as will be described below, each node device becomes expensive.

FIG. 10 shows the arrangement of the decoder used in the 3×3 exchange SW in the first multihop system shown in FIG. 4 or in the separation-insertion unit and the buffer in the second multihop system, and exemplifies an arrangement for decoding the addresses of n terminal equipments.

Referring to FIG. 10, a latch 1001 has a function of temporarily storing the destination address portion 301 of an input packet. A decoder management unit (not shown) writes the addresses of n terminal equipments respectively in n memories 1002. Comparators 1003 compare the destination address of the packet temporarily stored in the latch 1001 with the addresses stored in the memories 1002. When the two addresses coincide with each other, each comparator 1003 outputs a coincidence signal to a table address generator 1004. The table address generator 1004 generates a table address for reading out an output designation table 1005. The output designation table 1005 stores desired output designation data. The table address generated by the table address generator 1004 is an address for reading out a table corresponding to the serial number of the comparator 1003 that generated a coincidence signal, and hence, the output designation data of the table corresponding to the destination address of the input packet is read out. Based on this output designation data, the output destination of the packet to be transmitted using a desired transmission wavelength, is determined.

As described above, in the decoder with the above arrangement, the destination address of an input packet is compared with the addresses of all the terminal equipments connected to the network system, and output designation data is read out from the output designation table on the basis of the matching address of the terminal equipment as a result of comparison. For this reason, the number of required pairs of memories and comparators must be equal to or larger than the number of terminal equipments connected to the network system, and the number of table data stored in the output designation table must also be equal to or larger than the number of terminal equipments. Furthermore, the table address generator requires a longer time for generating table addresses as the number of input coincidence signals increases.

Therefore, the decoder with the above arrangement requires a larger hardware scale and higher cost and becomes difficult to attain high-speed address decoding as the number of terminal equipments connected to the network system increases, thus hampering a high-speed operation of the network system.

The present invention has been made in consideration of the problems of the prior art and the example, and has as its object to provide a low-cost node device by preventing an increase in hardware scale of the node device by a node device and a communication method which allow to simplify decoders in the node device, and to realize a high-speed operation of a network system.

SUMMARY OF THE INVENTION

The present application solves the above-mentioned problems by the following network system.

(1) A network system for transmitting a packet by connecting a plurality of node devices via a transmission path for transmitting a plurality of channels, comprises:

the transmission path; and a node device comprising:

receiving means for respectively receiving at least two channels of the plurality of channels; and output means for outputting a packet received by the receiving means by selecting one of the at least two channels, wherein the packet used in the network system has a section for designation of a channel to be looked up when the packet is relayed by the at least one node device, and the at least one node device selects the channel used for outputting the packet by looking up a value in the section for designation of the channel.

According to this network system, the node device that performs the relaying operation can determine an output channel by looking up the section for designation of a channel.

(2) Furthermore, the present application discloses the following arrangement as an arrangement for efficiently looking up the section for designation of a channel.

The node device further comprises processing means for processing the packet so that another node device can look up the section for designation of the channel to be looked up when the received packet is relayed and output toward the other node device.

Also, the following arrangements are available.

(3) The section for designation of the channel is arranged in correspondence with each of the node devices which are to relay the packet.

(4) A plurality of sections for designation of a channel equivalent to the channel for designation of the channel are arranged in correspondence with the node devices which are to relay the packet, and the processing means processes the packet so that the section for designation of the channel to be looked up by the other node device is located at a predetermined position in the packet.

(5) In this case, the plurality of sections for designation of the channel are arranged at predetermined positions in the packet in an order to be looked up by the node devices that are to relay the packet, and the processing means deletes the section for designation of the channel that has been looked up by the own node device.

(6) The packet has a section for indication of the number of relayings, which describes relaying number information indicating the number of relayings of the packet, and the node device may further comprise determination means for determining, by looking up the section for indication of the number of relayings, whether or not the own node device is a node device which should look up the section for designation of the channel.

(7) Furthermore, when the node device further comprises rewriting means for rewriting the relaying number information when the received packet is relayed and output, the information for number of relayings can indicate the number of relayings of a packet thereafter.

(8) More specifically, the rewriting means performs a predetermined calculation of the relaying number information.

(9) As another arrangement, a plurality of sections for designation of a channel equivalent to the channel for designation of the channel are arranged in correspondence with the node devices which are to relay the packet, and the packet has a section for indication of the number of relayings, which describes relaying number information indicating the number of relayings of the packet, and the node device further comprises determination means for determining, by looking up the relaying number information, the section for designation of the channel to be looked up of the plurality of sections for designation of the channel, and rewriting means for rewriting the relaying number information.

(10) An output destination to which the output means outputs the packet may be selected from the at least two channels and a sub transmission path. At this time, for example, the terminal equipment is connected to the node device via the sub transmission path.

(11) In place of allowing the output means to output a packet to the sub transmission path in (10), the node device may further comprise separation means for separating a predetermined packet from the packets received by the receiving means to a sub transmission path. With this arrangement, the output destination selection load on the output means of the node device can be reduced.

(12) At this time, if the packet has a section for indication of the number of relayings, which describes relaying number information indicating the number of relayings of the packet, the separation means can determine, by looking up the relaying number information of the input packet, whether or not the packet is to be separated.

(13) As the channels to be received by the node device, the node device may receive only some of the channels used in the network or may receive all the channels. In either case, channels that can be output from the output means are preferably common to those to be received by the node device. This is because the need for using another means for avoiding radio interferences with other channels can be obviated when the reception channels are set to common to the output channels.

The present application also discloses the above-mentioned node device.

The present application discloses the following transmission method as a packet transmission method.

(1) A transmission method for transmitting a packet in a network system constituted by connecting a plurality of node devices via a transmission path for transmitting a plurality of channels, comprises the steps of:

transmitting, from a source of a packet, the packet by appending a section for designation of a channel for designating a channel to be used upon outputting the packet in at least one of the node devices which are to relay the packet, to the packet to be transmitted;

determining a channel for outputting the packet by looking up the section for designation of the channel in at least one of the node devices which are to relay the packet, and outputting the packet using the determined channel; and receiving, by a node device which is to receive the packet, the packet transmitted using the determined channel.

Also, the present application discloses the following transmission method as a method of transmitting a packet to a plurality of destinations using the above-mentioned packet having the section for designation of a channel.

(2) A transmission method for transmitting a packet to a plurality of destinations in a network system which connects a plurality of node devices via a transmission path for transmitting a plurality of channels, and relays a packet to be transmitted in turn toward a downstream side in a transmission direction by the plurality of node devices, comprises:

the first step of sequentially transmitting, from a source of a packet, packets corresponding in number to all the channels received by a node device, serving as a target node device in the first step, next to a first node device, which receives the packets transmitted from the source first, by sequentially designating all the channels received by the node device next to the first node device in sections for designation of channels for designating channels used upon outputting, from the first node device, the packets transmitted from the source; and the second step of defining a node device next to the target node device in the first step as a target node device, and sequentially transmitting, from the source of a packet or packet transmitting means designated before the second step, packets corresponding in number to all the channels received by the target node device in the second step by sequentially designating all the channels received by the target node device in the second step in sections for designation of a channel for designating channels used by the target node device in the first step upon outputting the packets to the target device in the second step, wherein the transmission method repeats the second step after the first step.

(3) In this transmission method, the source can receive a packet transmitted using at least one of the plurality of channels, the plurality of node devices are connected in a ring pattern, and the source repeats the second step until the source receives the same packet as the packet transmitted by itself. With this arrangement, the source (or broadcasting source) can transmit a packet to all the node devices even when it does not recognize the number of node devices connected to the network.

(4) Furthermore, in this case, when the source receives the same packet as the packet transmitted by itself during the second step, the transmission of the packets ends after the second step which is not completed yet is completed. With this arrangement, the packet can be received by all the channels to be received by all the node devices including all the channels to be received by the node device to which the broadcasting source is connected.

(5) In order to obtain the same effect as in (4), the following arrangement may be used. In the first and second steps, the packets transmitted to the target node device in each of the first and second steps and corresponding in number to all the channels received by the target node device are sequentially transmitted in an order in which the target node device receives the packet transmitted using the channel that can be received by the source last.

(6) In the first and second steps, the source or the designated packet transmitting means transmits the packet by appending information for identifying the target node devices to the packet to be transmitted. With this arrangement, the node device that relays the packet can easily discriminate whether or not the own node device is a target node device.

(7) More specifically, the information for identifying the target node device is relaying number information indicating the number of relayings of the packet.

(8) As a method of designating the transmitting means, the source or the designated packet transmitting means appends information for designating transmitting means for transmitting packets in the subsequent step to one of the packets to be transmitted in each step.

(9) In the above-mentioned transmission method, the source appends identification information for identifying the source to the packets to be transmitted. With this format, the destination terminal equipment that received the packet or the own source can recognize the source.

(10) A terminal equipment connection table can be generated as follows using the transmission method of (1). As the network arrangement at this time, each of the plurality of node devices comprises separation means for separating a predetermined packet of the packets received using a plurality of channels to be received by the node device to different terminal equipments in units of received channels, the source transmits a packet for notification of the number of node devices indicating the number of node devices connected to the network as the packet, and the method further comprises:

the third step of transmitting, from each of the terminal equipments which receive the packet for notification of the number of node devices, information indicating the node device to which the own terminal equipment is connected and information indicating channels which can be received by the own terminal equipment, to the source; and the fourth step of generating, by the source, a terminal equipment connection table on the basis of the information sent from the terminal equipments.

(11) In this case, the method further may comprise, as the step of counting, by the source, the number of node devices connected to the network system:

the step of sequentially transmitting, from the source, a packet for count of the number of node devices having relaying number information which designates the number of relayings by the node devices by sequentially increasing the number of relayings indicated by the relaying number information, receiving, by the source, the packet for count of the number of node devices transmitted by itself, and counting the number of node devices connected to the network system on the basis of the number of relayings of the received packet for count of the number of node devices.

(12) Also, in this case, the method may further comprises, as another step of counting, by the source, the number of node devices connected to the network system:

the step of sequentially transmitting, from the source, a packet for count of the number of node devices having a section for describing information indicating the number of relayings to the next node device, receiving the packet for count of the number of node devices by a terminal equipment connected to the next node device, performing a predetermined calculation for the information indicating the number of relayings by the terminal equipment, transferring the packet for count of the number of node devices from the terminal equipment to the next node device, repeating the transfer operation until the source receives the packet for count of the number of node devices, and counting, by the source, the number of node devices connected to the network system on the basis of the information indicating the number of relayings.

(13) Furthermore, when the source transmits the terminal equipment connection table generated in the fourth step to the terminal equipments, other terminal equipments need not generate their terminal equipment connection tables.

(14) In the transmission method of (1), each of the plurality of node devices comprises separation means for separating a predetermined packet of the packets received using a plurality of channels to be received by the node device to different terminal equipments in units of received channels, and the source is one of the terminal equipments, and the packets transmitted by the source includes information indicating the node device to which the own terminal equipment is connected, and information indicating channels that can be received by the own terminal equipment. With this arrangement, connection information of the own terminal equipment can be transmitted to terminal equipments connected to the respective node devices.

(15) Furthermore, when the source requests the terminal equipments other than itself to transmit terminal equipment connection information, the source can collect terminal equipment connection information.

(16) The present application also proposes the following terminal equipment connection table generation method.

A terminal equipment connection table generation method in a network system constituted by connecting a plurality of node devices, each of which can receive a plurality of channels, and can output packets transmitted using the receiving channels to different terminal equipments in units of receiving channels, via a transmission path for transmitting a plurality of channels, comprises:

the first step of counting, by a first terminal equipment, the number of node devices connected to the network system;

the second step of notifying the counted number of node devices from the first terminal equipment to other terminal equipments;

the third step of transmitting, from each of the terminal equipments which are notified of the number of node devices, information indicating the node device to which the own terminal equipment is connected and information indicating channels which can be received by the own terminal equipment to the first terminal equipment; and the fourth step of generating, by the first terminal equipment, a terminal equipment connection table on the basis of the information sent from the terminal equipments.

(17) The present application also proposes the following connection information registration method.

A connection information registration method in a network system constituted by connecting a plurality of node devices, each of which can receive a plurality of channels, and can output packets transmitted using the receiving channels to different terminal equipments in units of receiving channels, via a transmission path for transmitting a plurality of channels, comprises:

the first step of transmitting, from a first terminal equipment which requests to register connection information of the own terminal equipment in other terminal equipments, information indicating the node device to which the own terminal equipment is connected and information indicating channels which can be received by the own terminal equipment to other terminal equipments.

BRIEF DESCRIPTION OF THE DRAWINGS

FIG. 11 is a view showing the format of a packet according to the first embodiment of the present invention;

FIG. 13 is a view showing the format of a packet used in the present invention;

DETAILED DESCRIPTION OF THE PREFERRED EMBODIMENTS (First Embodiment)

Figure 1:
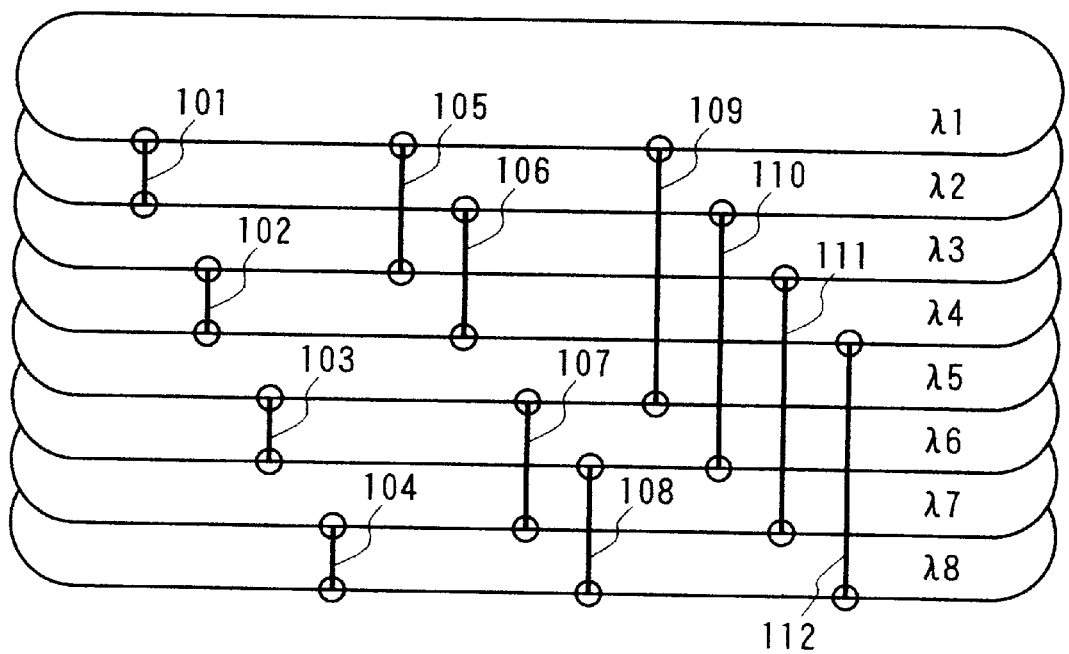
FIG. 1 is a diagram showing a first multihop system.
Figure 3:
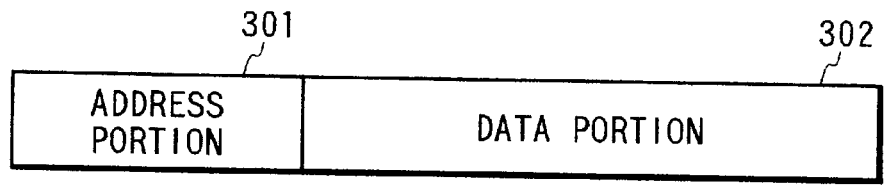
FIG. 3 is a view showing the format of a packet used in the first multihop system.
Figure 2:
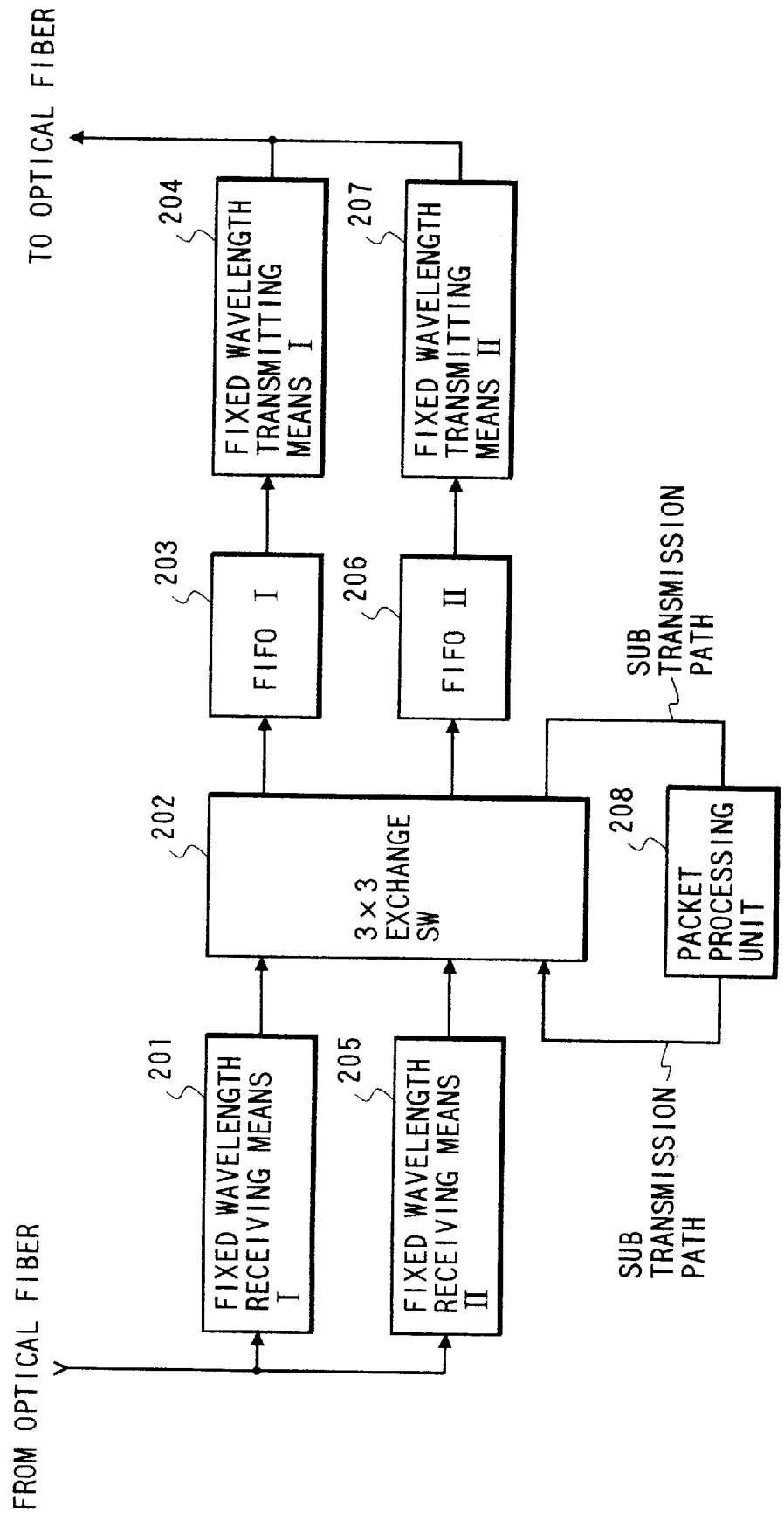
FIG. 2 is a block diagram showing the arrangement of a node device used in the first multihop system.
Figure 4:
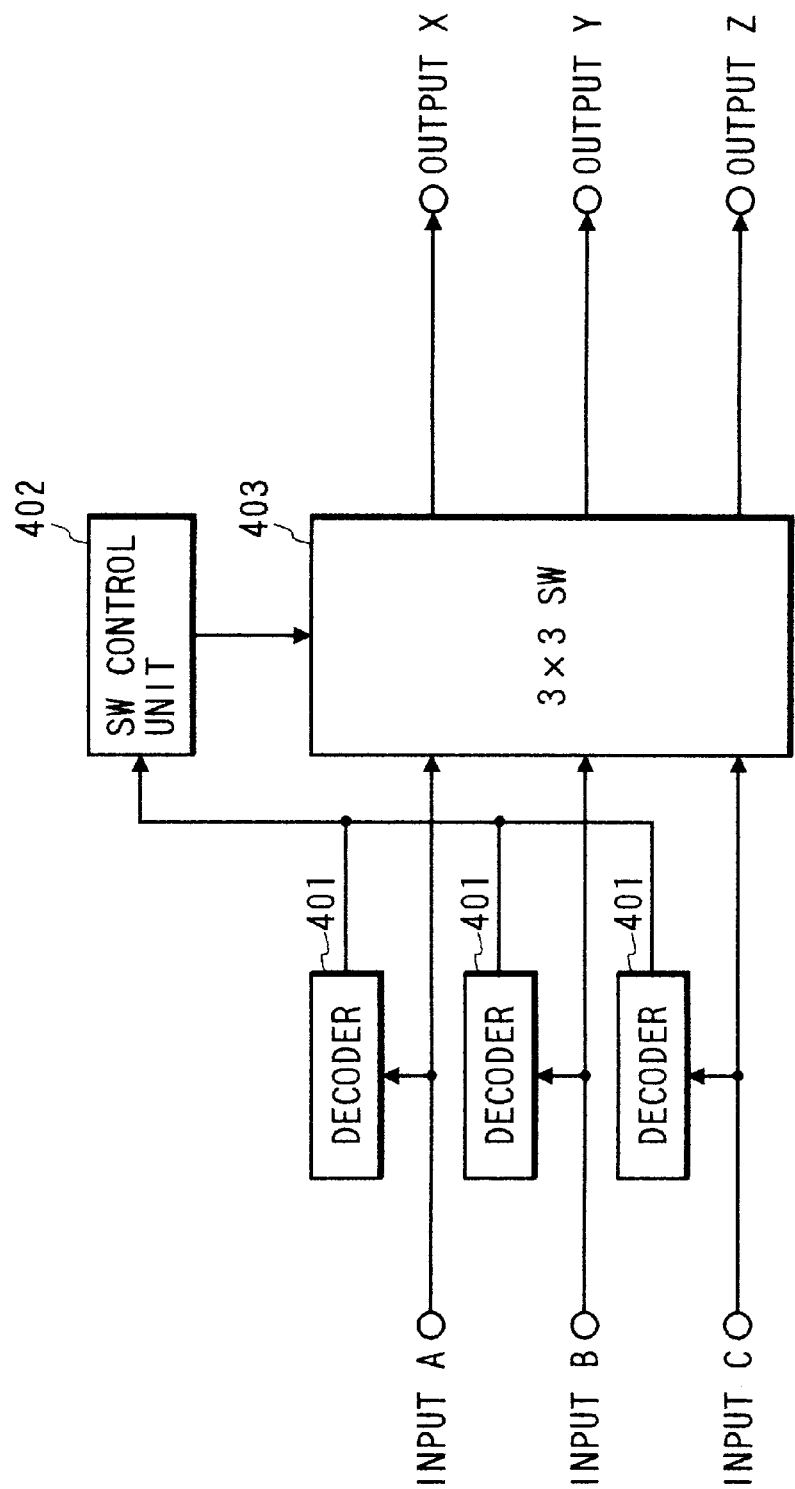
FIG. 4 is a block diagram showing the arrangement of a 3×3 exchange SW of the node used in the first multihop system.

FIG. 11 shows the format of a packet according to the first embodiment of the present invention, which is suitably used in the optical communication method of the first multihop system shown in FIGS. 1 and 2.

Referring to FIG. 11, a header portion 1101 includes sections for designating the wavelengths to be used in relaying operations of an optical signal. More specifically, the header portion 1101 includes a section for designation of the wavelength in use of the first relaying node device, a section for designation of the wavelength in use of the second relaying node device, a section for designation of the wavelength in use of the third relaying node device, sections for designation of the wavelength in use of the subsequent relaying node devices (not shown) that perform relaying operations in turn, which sections are used for designating the wavelengths to be used in the respective node devices, and a section for identification of the last relaying node device. A data portion 1102 is carried by this packet. As the value used in each section of this header portion 1101, "1" is assigned when the shorter one (λs) of two wavelengths (λs, λe; λs <λe) as the transmission wavelengths of each node device is used, and "2" is assigned when the longer wavelength (λe) is used. Assume that optical wavelengths satisfy λ1<λ2<λ3<λ4<λ5<λ6<λ7<λ8, and the shorter one (λs) of the two wavelengths to be transmitted by two fixed wavelength transmitting means I 204 and II 207 of each node device is transmitted by the fixed wavelength transmitting means I 204. Similarly, assume that the shorter one (λs) of the two wavelengths to be received by two fixed wavelength receiving means I 201 and II 205 of each node device is received by the fixed wavelength receiving means I 201. Furthermore, in Table 1 below, as the value for identifying the last relaying node device, "0" is assigned.

TABLE 1

| Wavelength Used by Relaying Node Device | Value in Section for Designation of Wavelength in Use of Relaying Node Device |
|---|---|
| λs | 1 |
| λe | 2 |
| Identification of Last Relaying Node | Value in Section for Identification of Last Relaying Node Device |
| In Case of Last Relaying Node Device | 0 |

Figure 12:
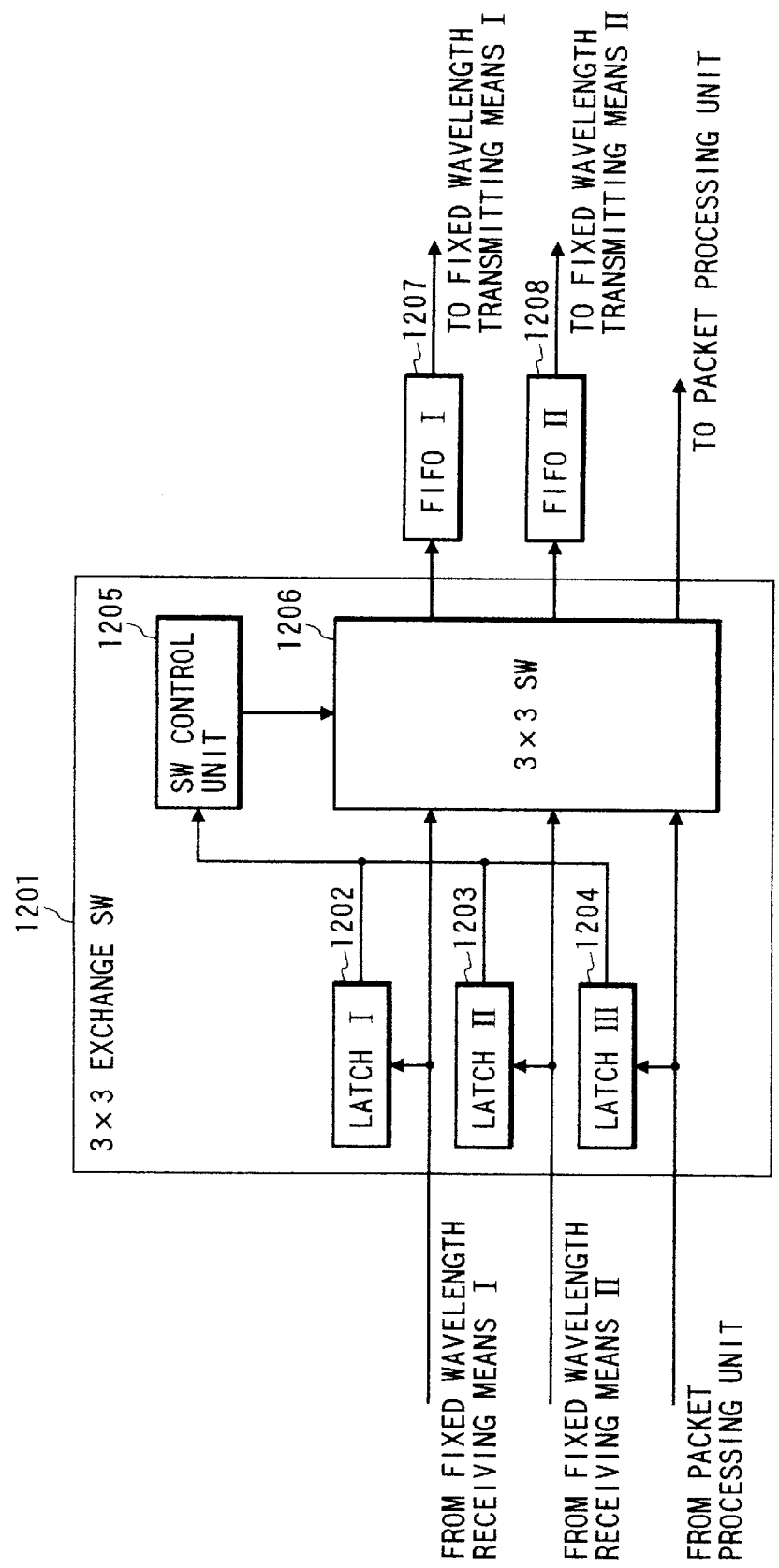
FIG. 12 is a block diagram showing the arrangement of a 3×3 SW, and FIFOs I and II according to the first embodiment of the present invention.

FIG. 12 shows the arrangement of a 3×3 exchange SW, and FIFOs I and II suitably used in a system using an optical communication method according to the first embodiment of the present invention. Note that other portions are the same as those in the node device of the first multihop system shown in FIG. 2. Referring to FIG. 12, a 3×3 exchange SW 1201 includes latches I 1202 to III 1204. The latches I 1202 to III 1204 respectively store the contents of the first sections of the header portions of packets output from the fixed wavelength receiving means I and II, and a packet processing unit, and output the stored values to an SW control unit 1205. The value output at this time is "1" or "2" for instructing the wavelength λs or λe in a node device other than the last relaying node device, or is "0" for identifying the last relaying node device in the last relaying node device, as shown in Table 1 above. The SW control unit 1205 performs arbitration control on the basis of the values output from the latches 1202 to 1204, so that packets output from the fixed wavelength receiving means I and II, and the packet processing unit do not collide in a 3×3 SW 1206, and then, outputs each input packet to a desired output destination of FIFOs I 1207 and II 1208, and the packet processing unit. In this packet output operation, the SW control unit 1205 removes the first section in the header portion 1101 of an input packet by controlling the first section of the packet to be not output to the output destination. The 3×3 SW outputs packets output from the fixed wavelength receiving means I and II, and the packet processing unit to required ones of the FIFOs I and II, and the packet processing unit. The FIFOs I 1207 and II 1208 temporarily store packets output from the 3×3 SW 1206, and output the stored packets to the fixed wavelength transmitting means I and II, respectively.

FIG. 13 shows the format of a packet according to the first embodiment, which packet is suitably used when a packet is transmitted from a node device 102 to a node device 109 in the first multihop system shown in FIG. 1 using the above-mentioned node device. In FIG. 13, a value "1" for designating λs=λ3 as the wavelength to be used is designated in the section for designation of the wavelength in use of the first relaying node device in the header portion 1101, and a value "1" for designating λs =λ1 as the wavelength to be used is designated in the section for designation of the wavelength in use of the second relaying node device. The third section has a value "0" that indicates the section for identification of the last relaying node device. In the following description, this packet will be referred to as a packet A.

The operation for transmitting the packet A shown in FIG. 13 according to the first embodiment of the present invention will be described below with reference to FIGS. 11, 12, and 13, and FIGS. 1 and 2. In the following description, the same constituting elements of different node devices will be denoted by the same reference numerals in FIGS. 11, 12, and 13 and FIGS. 1 and 2, for the sake of convenience.

When data to be transmitted to the node device 109 is generated in a packet processing unit 208 of the node device 102, the packet processing unit 208 forms a packet A by adding a header portion 1101, which designates the wavelengths to be used in the respective relaying node devices, to the data, and outputs this packet A to the 3×3 exchange SW 1201.

In the 3×3 exchange SW 1201, the value in the section for designation of the wavelength in use of the first relaying node device as the first section of the header portion 1101 of the packet A is read by the latch III 1204, and the read value "1" is output to the SW control unit 1205. The SW control unit 1205 performs arbitration control on the basis of the values output from the latches I 1202 and II 1203, and the value "1" output from the latch III 1204, so that packets do not collide in the 3×3 SW 1206, and thereafter, sets the 3×3 SW 1206, so that the packet A output from the packet processing unit 208 is output to the FIFO I 1207. In this packet output operation, the SW control unit 1205 removes the section for designation of the wavelength in use of the first relaying node device of the header portion 1101 of the packet by controlling the section for designation of the wavelength in use of the first relaying node device as the first section of the input packet A to be not output to the FIFO I 1207. The packet A output to the FIFO I 1207 is temporarily stored in the FIFO I, and thereafter, is transmitted from the fixed wavelength transmitting means I 204 (for transmitting a shorter wavelength) onto an optical fiber as an optical signal of the wavelength λs=λ3. The optical signal is received by the fixed wavelength receiving means II 205 (for receiving a longer wavelength) of a node device 105, and is output to the 3×3 exchange SW 1201.

In the 3×3 exchange SW 1201 of the node device 105, the value in the section for designation of the wavelength in use of the second relaying node device as the first section of the header portion 1101 of the input packet A is read by the latch II 1203, and the read value "1" is output to the SW control unit 1205. As in the node device 102, the SW control unit 1205 performs arbitration control on the basis of the values output from the latches I 1202 and III 1204, and the value "1" output from the latch II 1203, so that packets do not collide in the 3×3 SW 1206, and thereafter, sets the 3×3 SW 1206, so that the packet A output from the fixed wavelength receiving means II 205 is output to the FIFO I 1207. When the packet is output, the section for designation of the wavelength in use of the second relaying node device as the first section of the input packet A is removed.

In this manner, the packet A is temporarily stored in the FIFO I 1207, and is transmitted from the fixed wavelength transmitting means I 204 (for transmitting a shorter wavelength) onto the optical fiber as an optical signal of the wavelength λs=λ1. The optical signal is received by the fixed wavelength receiving means I 201 (for receiving a shorter wavelength) of the node device 109, and is output to the 3×3 exchange SW 1201.

In the 3×3 exchange SW 1201 of the node device 109, the value in the first section of the header portion of the packet A is read by the latch I 1202. Since the sections for designation of the wavelength in use of the first and second relaying node devices of the packet A have already been removed in the node devices 102 and 105, respectively, the first section of the header portion of the packet A is the section for identification of the last relaying node device, and has a value "0". The value "0" in the section for identification of the last relaying node device is output to the SW control unit 1205. As in the node devices 102 and 105, the SW control unit 1205 performs arbitration control on the basis of the values output from the latches II 1203 and III 1204, and the value "0" output from the latch I 1202, so that packets do not collide in the 3×3 SW 1206, and thereafter, sets the 3×3 SW 1206, so that the packet A output from the fixed wavelength receiving means I 201 is output to the packet processing unit 208. When the packet A is output, the section for identification of the last relaying node device as the first section of the input packet A is removed. In this manner, each of the node devices 102 and 105 for performing the relaying operations removes the first section of the packet A formed by adding the header portions 1101 that designates the wavelengths to be used in the respectively relaying node devices to data in the packet processing unit 208 of the node device 102, and the packet is supplied to the packet processing unit 208 of the node device 109. The packet is then subjected to desired processing.

(Second Embodiment)

Figure 14:
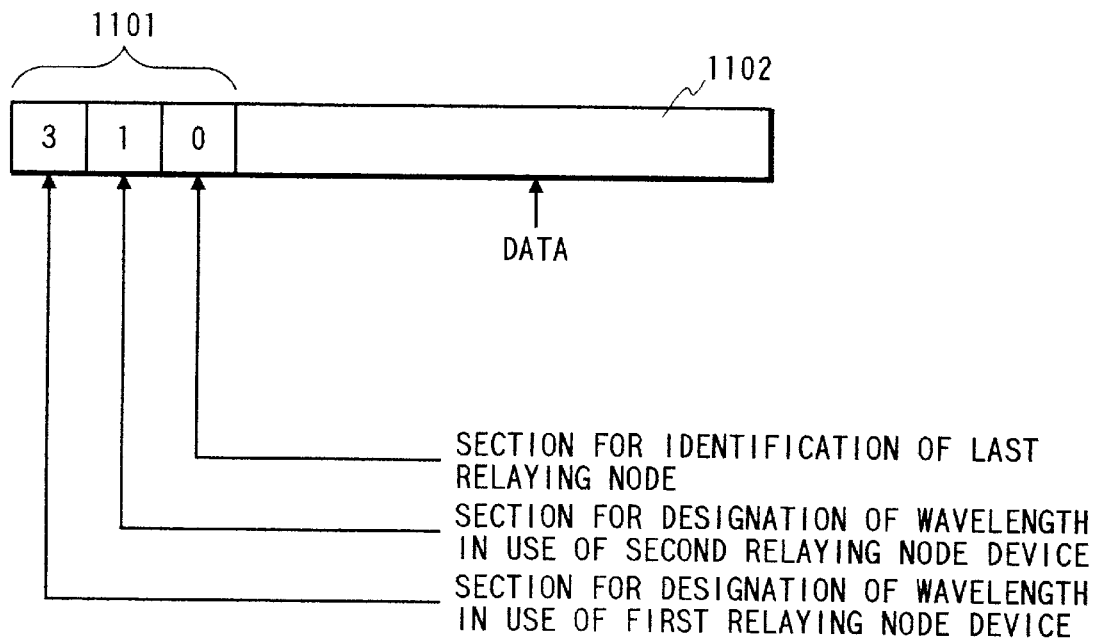
FIG. 14 is a view showing the format of a packet according to the second embodiment of the present invention.

Table 2 below shows another example of the values in sections for designation of wavelengths in use of relaying node devices of the first embodiment of the present invention. As the values in sections for designation of the wavelengths in use of relaying node devices, "1" to "8" are assigned in correspondence with transmission wavelengths λ1 to λ8. FIG. 14 shows an embodiment of the above-mentioned packet A using Table 2 below. In this embodiment, since the wavelength to be used is designated by a serial number assigned to each wavelength in place of a value indicating a shorter or longer wavelength, each node device can easily change its transmission/reception wavelength.

TABLE 2

| Wavelength Used by Relaying Node Device | Value in Section for Designation of Wavelength in Use of Relaying Node Device |
|---|---|
| λ1 | 1 |
| λ2 | 2 |
| λ3 | 3 |
| λ4 | 4 |
| λ5 | 5 |
| λ6 | 7 |
| λ7 | 8 |

| Identification of Last Relaying Node | Value in Section for Identification of Last Relaying Node Device |
|---|---|
| In Case of Last Relaying Node Device | 0 |

(Third Embodiment)

Figure 5B:
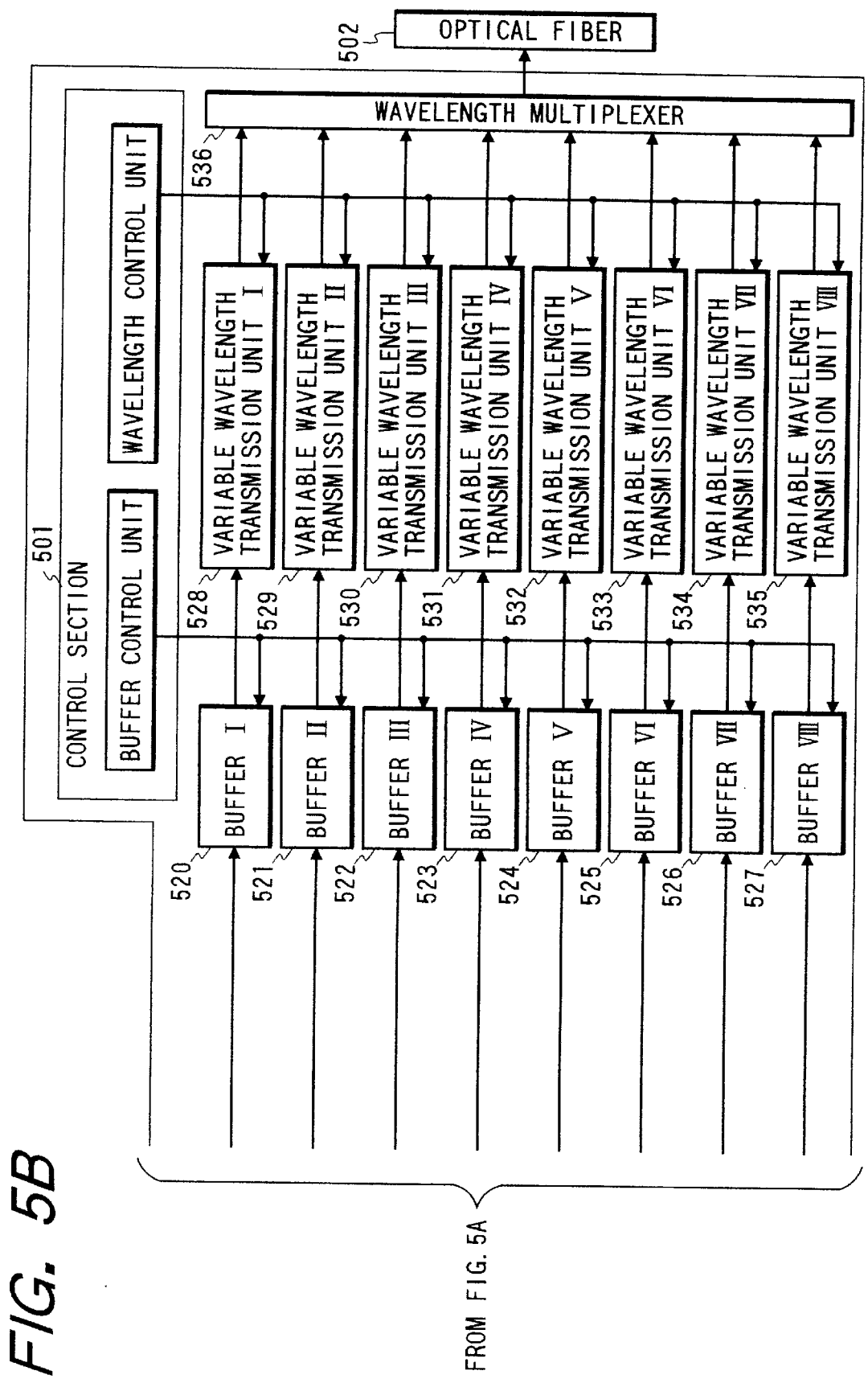
FIG. 5 is comprised of FIGS. 5A and 5B illustrating block diagrams showing the arrangement of a node device used in a second multihop system.
Figure 6:
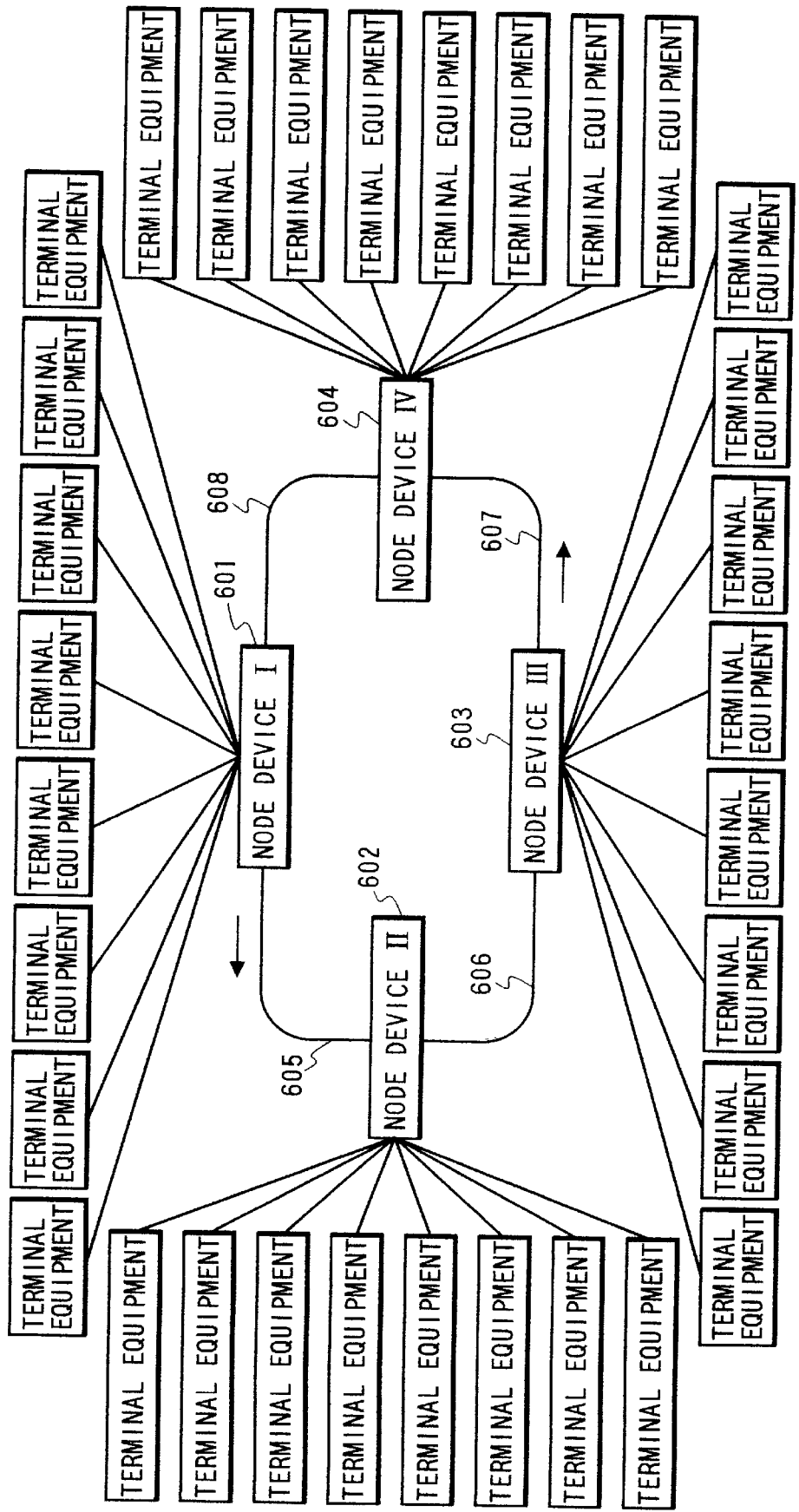
FIG. 6 is a diagram showing the arrangement of the second multihop system.
Figure 7:
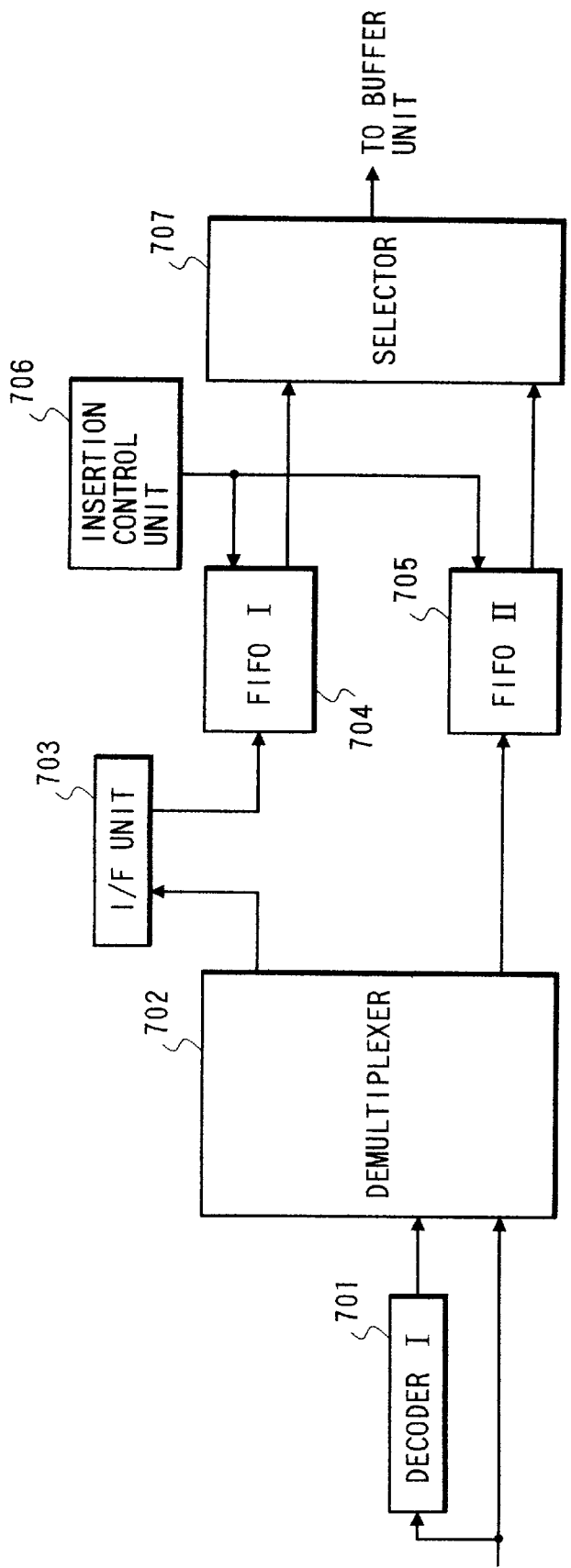
FIG. 7 is a block diagram showing the arrangement of a separation-insertion unit of the node device used in the second multihop system.
Figure 8:
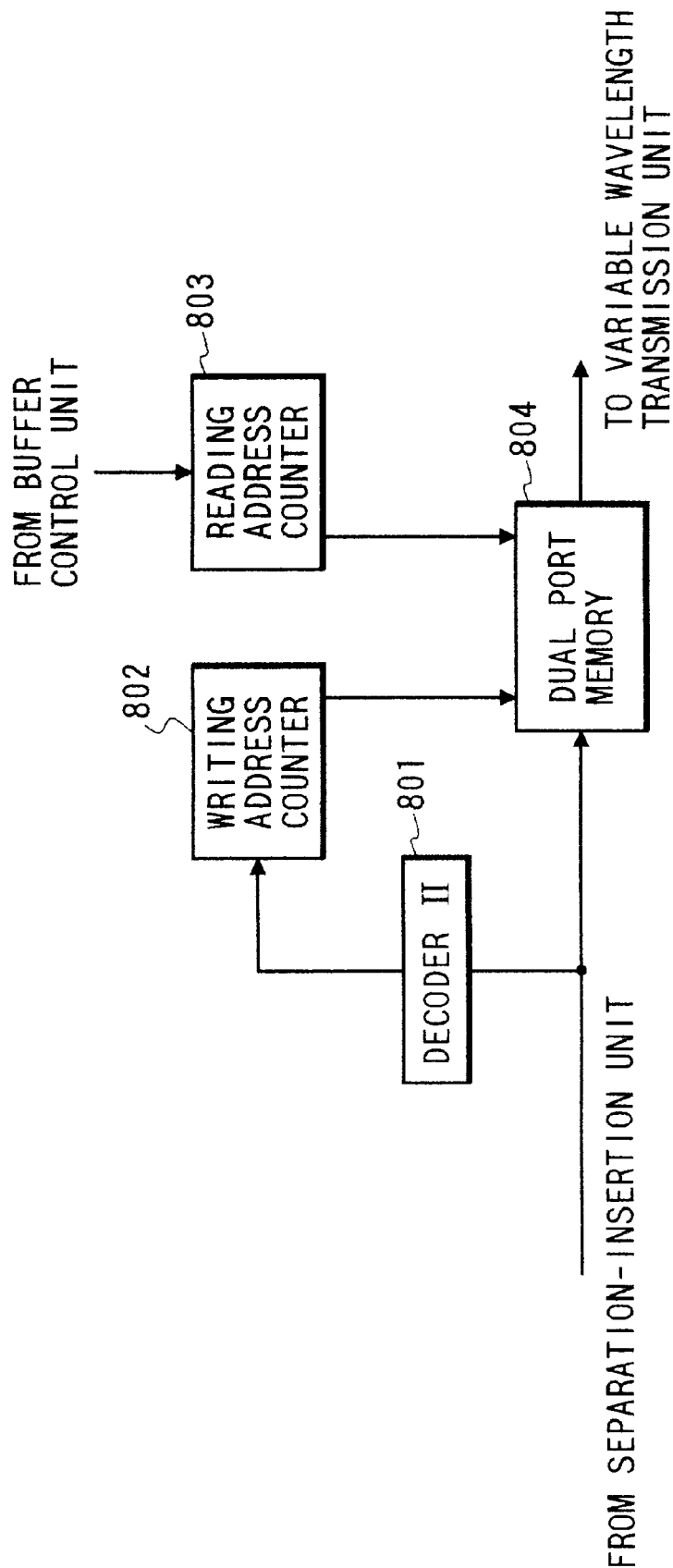
FIG. 8 is a block diagram showing the arrangement of a buffer of the node device used in the second multihop system.
Figure 9:
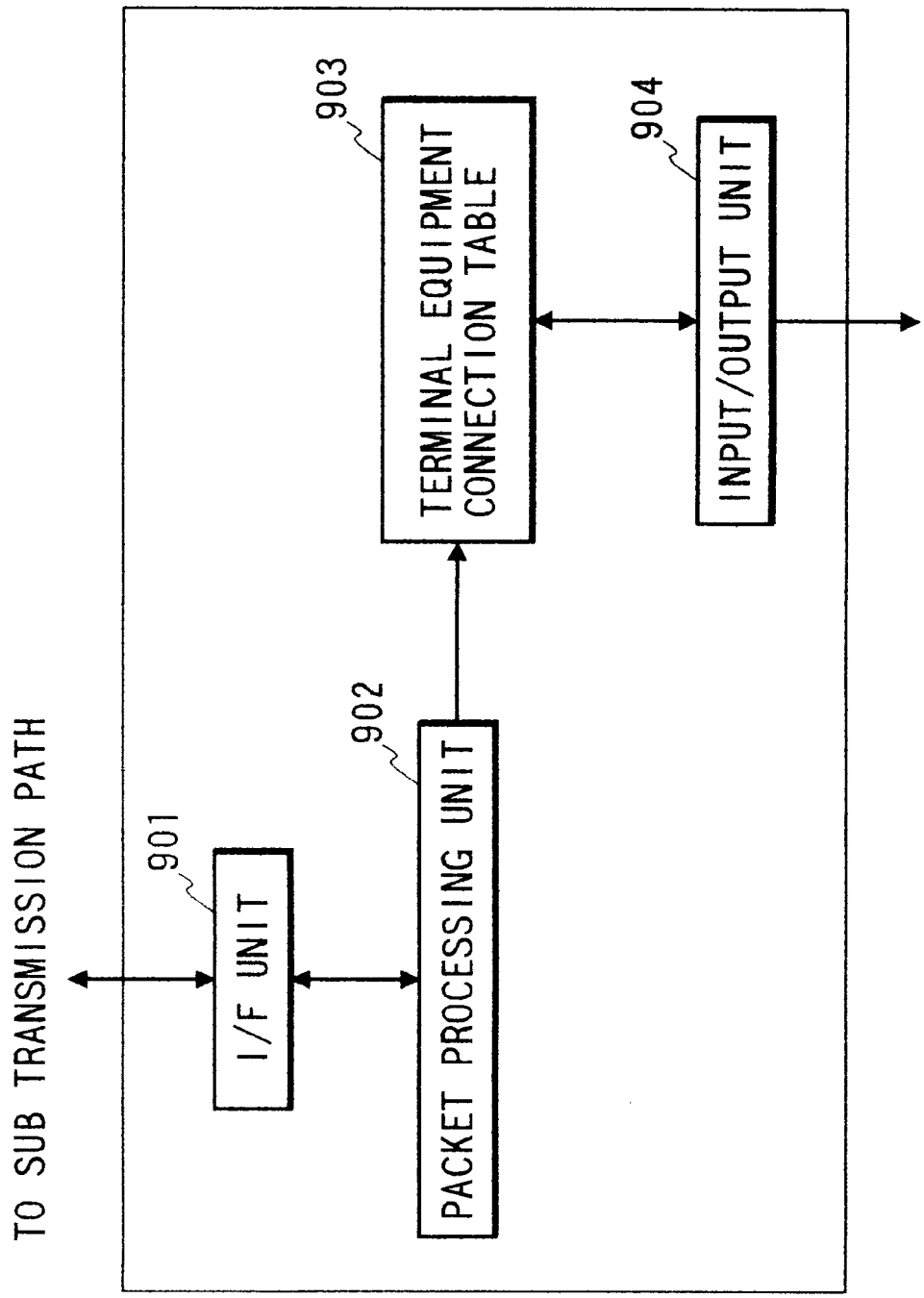
FIG. 9 is a block diagram showing the arrangement of a terminal equipment used in the second multihop system.
Figure 10:
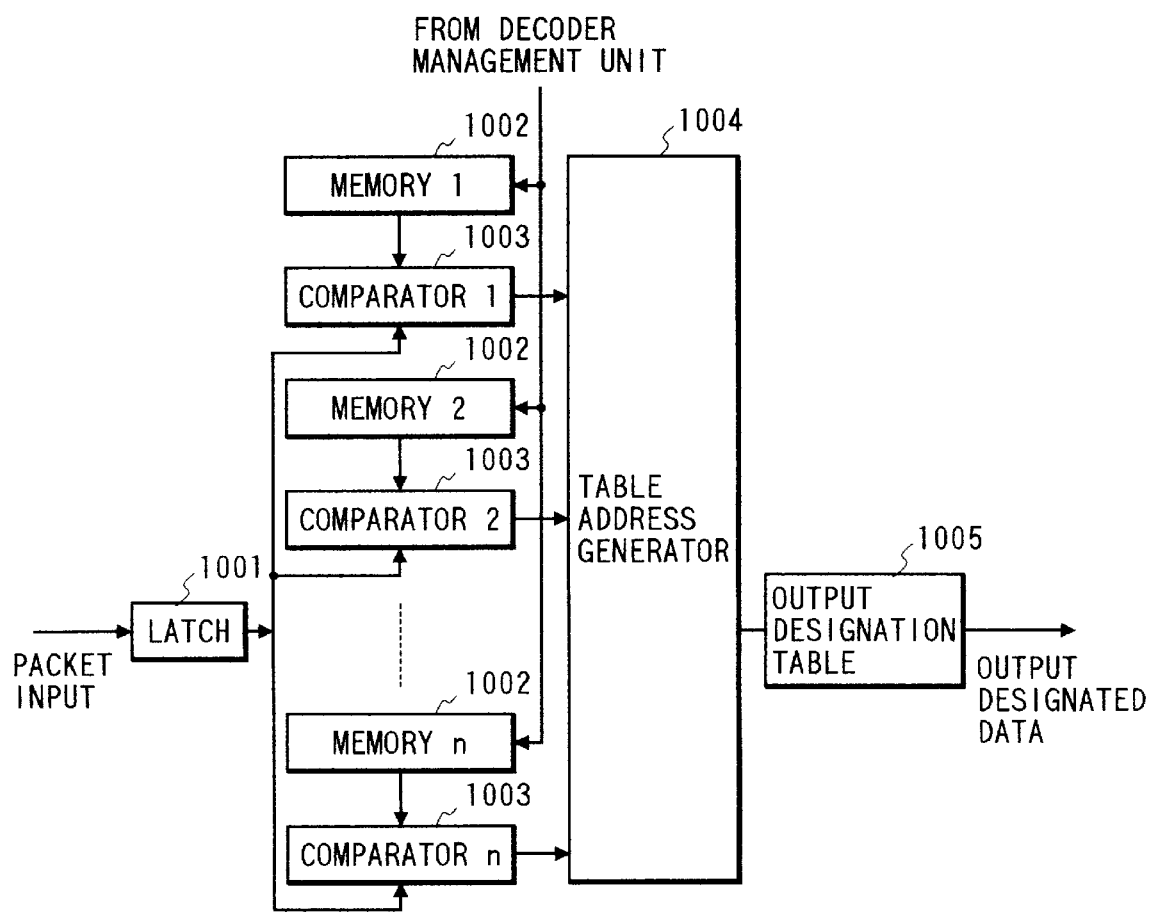
FIG. 10 is a block diagram showing the arrangement of a decoder.
Figure 15:
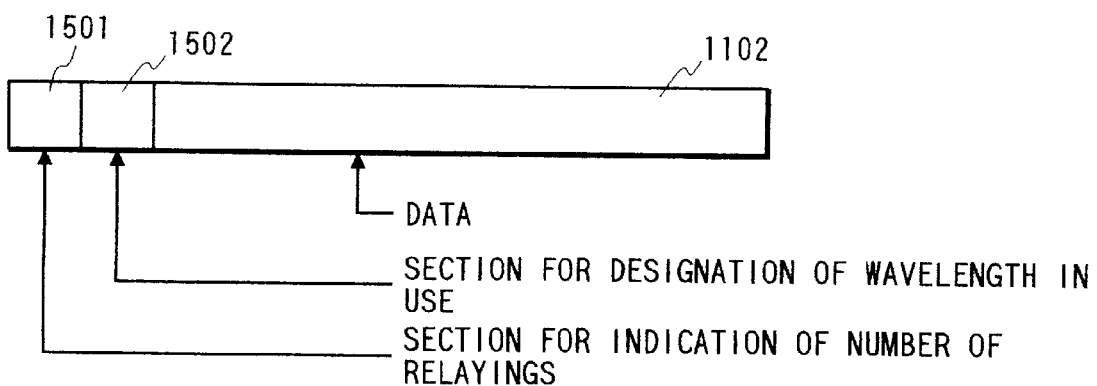
FIG. 15 is a view showing the format of a packet according to the third embodiment of the present invention.

FIG. 15 shows the format of a packet according to the third embodiment of the present invention, which packet is suitably used in the second multihop system shown in FIGS. 5 and 6.

In the first and second embodiments, since channels (wavelengths) that can be output from an intermediate relaying node device are predetermined, the source of a packet must indicate the number of relayings by the number of sections for designation of wavelengths in use of relaying node devices, and must designate channels to be used in units of relaying node devices.

However, in the network arrangement of this embodiment, since each relaying node device has no limitation on channels (wavelengths) to be output, and can output a packet using a desired channel, the output channels need not be designated in units of relaying node devices.

Referring to FIG. 15, a section 1501 for indication of the number of relayings indicates the number of relayings required for transmitting a packet from a node device as the source to a node device as the destination. Each relaying node device can recognize based on the value of the section for indication of the number of relayings whether or not a node device, which neighbors the own node device at the downstream side in the transmission direction, is the destination node device. Furthermore, each node device can recognize whether or not the own node device is the destination by checking if the value in this section is "0". A section 1502 for designation of the wavelength in use is used for designating the wavelength to be used in the relaying transmission operation. The section 1501 for indication of the number of relayings and the section 1502 for designation of the wavelength in use constitute a header portion. As the value used in the section 1502 for designation of the wavelength in use of this header portion, "1" to "8" are assigned in correspondence with transmission wavelengths λ1 to λ8, as shown in Table 3. A data portion 1102 is carried by this packet.

The arrangement of a node device used in a system using an optical communication method according to the third embodiment of the present invention is substantially the same as that of the second multihop system shown in FIGS. 5A and 5B, except for separation-insertion units I 512 to VIII 519 and buffers I 520 to VIII 527.

TABLE 3

| Wavelength Used by Relaying Node Device | Value in Section for Designation of Wavelength in Use |
|---|---|
| λ1 | 1 |
| λ2 | 2 |
| λ3 | 3 |
| λ4 | 4 |
| λ5 | 5 |
| λ6 | 6 |
| λ7 | 7 |
| λ8 | 8 |

Figure 16:
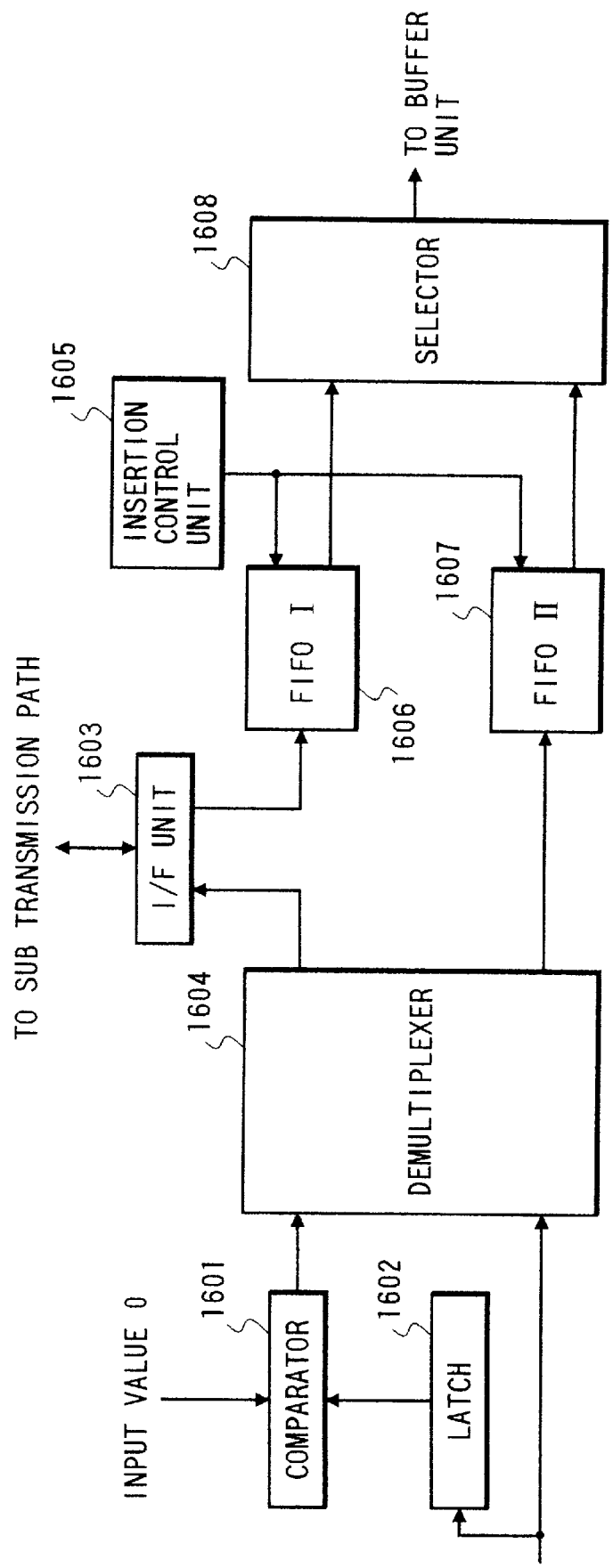
FIG. 16 is a block diagram showing the arrangement of a separation-insertion unit according to the third embodiment of the present invention.

FIG. 16 shows the arrangement of each of the separation-insertion units I to VIII of the node device suitably used in the system using the optical communication method of this embodiment. The separation-insertion units I to VIII have the same internal arrangement.

Referring to FIG. 16, a comparator 1601 checks by comparison if the value in the section for indication of the number of relayings of a packet output from a latch 1602 is "0". If the value in the section is "0", the comparator 1601 outputs a separation instruction to a demultiplexer 1604; otherwise, it outputs a relaying instruction to the demultiplexer 1604. The latch 1602 stores the value in the section for indication of the number of relayings of a packet output from a fixed wavelength reception unit, and outputs the stored value to the comparator 1601. An I/F unit 1603 outputs a packet output from the demultiplexer 1604 onto a sub transmission path, and outputs a packet input from the sub transmission path to a FIFO I 1606. The demultiplexer 1604 outputs an input packet to the I/F unit 1603 when the comparison result output from the comparator 1601 indicates a separation instruction; or outputs the packet to a FIFO II 1607 when the comparison result indicates a relaying instruction. An insertion control unit 1605 controls the reading operations of the FIFOs I and II, and instructs a selector 1608 of the FIFO to be selected, thereby inserting a packet transmitted from the sub transmission path into packet flows output from fixed wavelength reception units 504 to 511. The FIFOs I 1606 and II 1607 temporarily store input packets, and output the stored packets to the selector in the input order under the control of the insertion control unit 1605. The selector 1608 selects the FIFO that stores a packet signal to be output in accordance with an instruction from the insertion control unit 1605.

Figure 17:
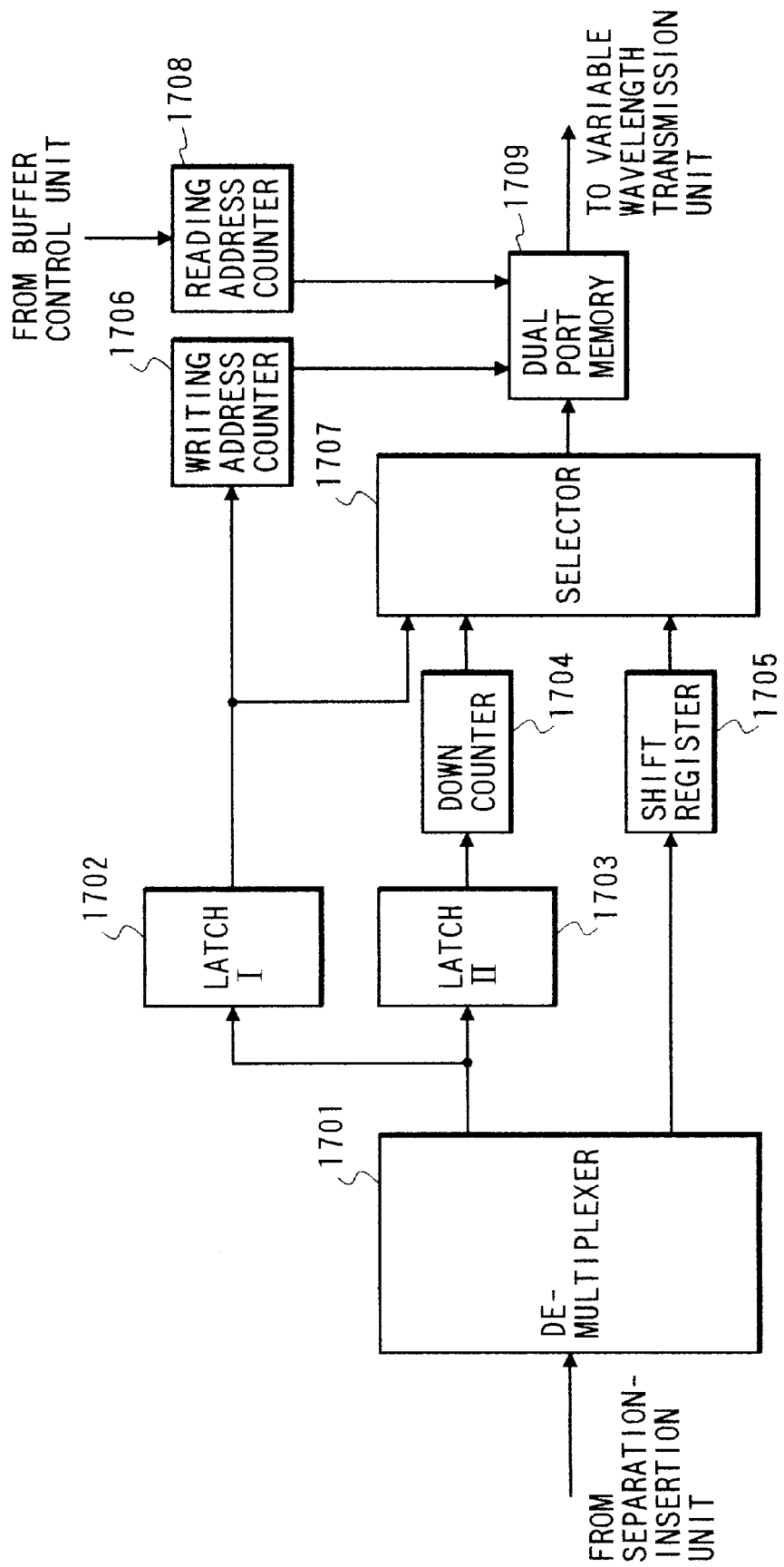
FIG. 17 is a block diagram showing the arrangement of a buffer according to the third embodiment of the present invention.

FIG. 17 shows the internal arrangement of the buffers I 520 to VIII 527 used in this embodiment. The buffers I to VIII have the same internal arrangement. Referring to FIG. 17, a demultiplexer 1701 outputs the value in the section 1502 for designation of the wavelength in use of the header portion of a packet output from the separation-insertion unit to a latch I 1702, the value in the section 1501 for indication of the number of relayings to a latch II 1703, and the data portion 1102 to a shift register 1705. The latch I 1702 stores the value in the section 1502 for designation of the wavelength in use of the header portion of a packet, and outputs the stored value to a writing address counter 1706 and a selector 1707. The latch II 1703 stores the value in the section. 1501 for indication of the number of relayings of the header portion of the packet, and outputs the stored value to a down counter 1704. The down counter 1704 decrements the value in the section 1501 for indication of the number of relayings of the header portion of the packet output from the latch II 1703, and outputs the decremented value to the selector 1707. The shift register 1705 delays the data portion 1102 of the packet output from the demultiplexer 1701 by a predetermined period of time, and outputs the delayed data portion 1102 to the selector 1707. The writing address counter 1706 generates writing addresses of the packet to be written in a dual port memory 1709 in accordance with the value in the section 1502 for designation of the wavelength in use of the header portion of the packet output from the latch I 1702, and sequentially outputs writing address signals of the packet to the dual port memory 1709. The selector 1707 re-constructs a packet with the decremented value in the section 1501 for indication of the number of relayings by sequentially selecting the value in the section 1502 for designation of the wavelength in use of the header portion of the packet output from the latch I 1702, the value, decremented by the down counter 1704, in the section 1501 for indication of the number of relayings, and the delayed data portion 1102 of the packet output from the shift register 1705, and outputs the packet to the dual port memory 1709. A reading address counter 1708 sequentially outputs reading address signals of the packet to the dual port memory 1709 using an offset value output from a buffer control unit in a control section 501 as the reading start address. The dual port memory 1709 independently performs the writing and reading operations of packet data. The memory region of the dual port memory 1709 is divided into eight regions in correspondence with the transmission wavelengths of a packet. Memory regions I to VIII respectively correspond to the transmission wavelengths $\lambda 1$ to $\lambda 8$. The start addresses of these regions are respectively A1, A2, A3, A4, A5, A6, A7, and A8.

Figure 18:
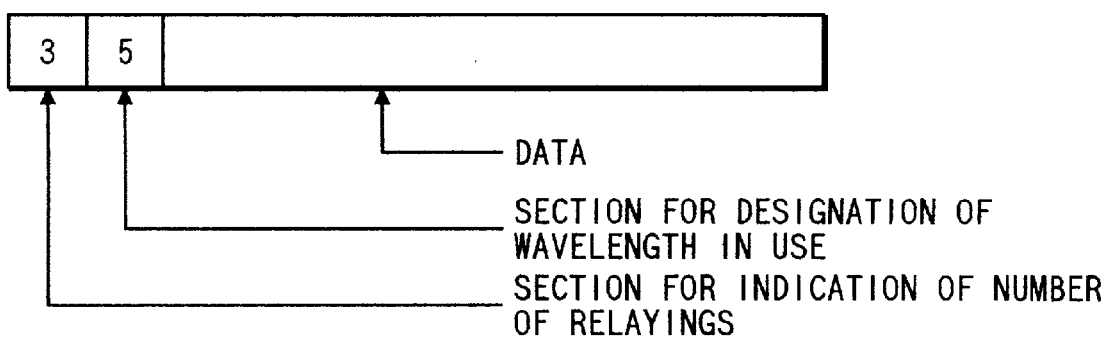
FIG. 18 is a view showing the format of a packet used in the present invention.

FIG. 18 shows the format of a packet according to this embodiment, whose source is a terminal equipment I 545 connected to a sub transmission path I 537 of a node device I 601 and whose destination is a terminal equipment V 549 connected to a sub transmission path V 541 of a node device IV 604 in the second multihop system shown in FIGS. 5 and 6 using the above-mentioned node device. Referring to FIG. 18, a value "5" for designating an optical signal of the wavelength $\lambda 5$ to be received by a fixed wavelength reception unit V 508 that outputs a packet to a separation-insertion unit V 516 to which the sub transmission path 541 as the destination of the node device IV 604 is connected is set in the section 1502 for designation of the wavelength in use of the header portion. In the section 1501 for indication of the number of relayings, a value "3" indicating the four relaying operations in the own node device I 601, a node device II 602, a node device III 603, and the node device IV 604 is written. In the following description, this packet will be referred to as a packet B.

The operation of this embodiment will be described below with reference to FIGS. 16, 17, and 18, and FIGS. 5 and 6. In the following description, the same constituting elements of different node devices will be denoted by the same reference numerals in FIGS. 16, 17, and 18, and FIGS. 5 and 6, for the sake of convenience.

The terminal equipment I 545 as the source, which is connected to the sub transmission path I 537 of the node device I 601, forms data to be transmitted to the terminal equipment V 549 connected to the sub transmission path V 541 of the node device IV 604 as the packet B, as shown in FIG. 18, and transmits the packet to the separation-insertion unit I 512 of the node device I 601 via the sub transmission path I 537.

The I/F unit 1603 of the separation-insertion unit I 512 of the node device I 601 sequentially writes the packet B transmitted through the sub transmission path I 537 in the FIFO I 1606. Upon completion of the writing operation of the packet B in the FIFO I 1606, the insertion control unit 1605 detects a division of a packet flow which is being read out from the FIFO II 1607, switches the FIFO as the input source of the selector 1608 to the FIFO I 1606, stops the reading operation of the FIFO II 1607, and starts a reading operation of the FIFO I 1606. Thereafter, upon completion of the reading operation of the packet B written in the FIFO I 1606, the insertion control unit 1605 switches the FIFO as the input source of the selector 1608 to the FIFO II 1607 again, stops the reading operation of the FIFO I 1606, and restarts a reading operation of the FIFO II 1607. The packet B output from the selector 1608 is input to the buffer I 520.

The demultiplexer 1701 of the buffer I 520 outputs the value in the section 1502 for designation of the wavelength in use of the header portion of the packet B output from the separation-insertion unit I 512 to the latch I 1702, the value in the section 1501 for indication of the number of relayings to the latch II 1703, and the data portion 1102 to the shift register 1705, respectively. The latch I 1702 stores the value in the section 1501 for indication of the number of relayings, and outputs the stored value to the down counter 1704. The value in the section 1501 for indication of the number of relayings of the header portion of the packet B output from the latch II 1703 is decremented by the down counter 1704, and the decremented value is output to the selector 1707. The shift register 1705 delays the data portion 1102 of the packet B output from the demultiplexer 1701 by a desired period of time, and outputs the delayed data portion 1102 to the selector 1707. The selector 1707 re-constructs a packet with the decremented value in the section 1501 for indication of the number of relayings by sequentially selecting the value in the section 1502 for designation of the wavelength in use of the header portion of the packet output from the latch I 1702, the value, decremented by the down counter 1704, in the section 1501 for indication of the number of relayings, and the delayed data portion 1102 of the packet output from the shift register 1705, and outputs the packet to the dual port memory 1709. On the other hand, the writing address counter 1706 sets the writing start address of the dual port memory 1709 in which the packet B is to be written to be A5 in correspondence with the value "5" in the section 1502 for designation of the wavelength in use of the header portion of the packet B output from the latch I 1702, and sequentially outputs writing address signals of the packet to the dual port memory 1709. The input port of the dual port memory 1709 receives the re-constructed packet B via the selector 1707, and the packet B is sequentially written in the memory region V in accordance with the addresses output from the writing address counter 1706.

In this manner, after the packet B is written in the memory region V, when the transmission wavelength of a variable wavelength transmission unit I 528 is set to be λ5 under the control of a wavelength control unit in the control section 501, a buffer control unit in the control section 501 outputs an offset value A5 corresponding to the memory region V to the reading address counter 1708 of the buffer I 520. Based on this offset value A5, the reading address counter 1708 sequentially generates addresses for reading out the packet B written in the memory region V by incrementing a counter, and outputs the addresses to the dual port memory 1709. The packet B is sequentially read out from the output port of the dual port memory 1709 in accordance with the reading addresses, and is output to the variable wavelength transmission unit I 528. At this time, since the transmission wavelength of the variable wavelength transmission unit I 528 is set to be λ5, the packet B is output from the variable wavelength transmission unit I 528 to a wavelength multiplexer 536 as an optical signal of the wavelength λ5, and the optical signal is multiplexed with optical signals of different wavelengths output from other variable wavelength transmission units II 529 to VIII 535. The multiplexed signal is output onto an optical fiber 502, and is transmitted to the neighboring node device II 602 at the downstream side.

The packet B transmitted to the node device II 602 as the optical signal of the wavelength λ5 is subjected to the following relaying transmission processing in the node device II 602.

Optical signals of the wavelengths λ1 to λ8 transmitted from the node device I 601 via the optical fiber 502 are divided by a divider 503 in the node device II 602, and the divided signals are respectively input to fixed wavelength reception units I 504 to VIII 511. The packet B output from the node device I 601 as the optical signal of the wavelength λ5 is received by the fixed wavelength reception unit V 508 which receives only an optical signal of the wavelength λ5. The packet B received by the fixed wavelength reception unit V 508 is output to the separation-insertion unit V 516.

The latch 1602 of the separation-insertion unit V 516 stores the value in the section for indication of the number of relayings of the packet B output from the fixed wavelength reception unit V 508, and outputs the stored value to the comparator 1601. Since the value in the section for indication of the number of relayings of the packet B output from the latch 1602 is "2", the comparator 1601 outputs a relaying instruction to the demultiplexer 1604. Upon reception of the relaying instruction from the comparator 1601, the demultiplexer 1604 outputs the input packet B to the FIFO II 1607. The packet B written in the FIFO II 1607 is read out under the control of the insertion control unit 1605, and is output to the buffer V 524 via the selector 1608.

The value in the section for indication of the number of relayings of the packet B input to the buffer V 524 is decremented to "1" by the down counter 1704 as in the buffer I 520 in the node device I 601. Thereafter, the packet is re-constructed, and is written in the memory region V of the dual port memory 1709. Thereafter, the packet B is output as an optical signal of the wavelength λ5 as in the node device I 601, and is transmitted to the neighboring node device III 603 at the downstream side.

The packet B transmitted to the node device III 603 as the optical signal of the wavelength λ5 is subjected to the relaying transmission processing as in the node device II 602, and is then transmitted to the node device IV 604 as an optical signal of the wavelength λ5. At this time, the value in the section for indication of the number of relayings has been decremented to "0".

The packet B transmitted to the node device IV 604 as the optical signal of the wavelength λ5 is received by the fixed wavelength reception unit V 508 of the node device IV 604, and is output to the separation-insertion unit V 516.

The latch device 1602 of the separation-insertion unit V 516 stores the value in the section for indication of the number of relayings of the packet B output from the fixed wavelength reception unit V 508, and outputs the stored value to the comparator 1601. Since the value in the section for indication of the number of relayings of the packet B output from the latch 1602 is "0", the comparator 1601 determines that the own node device is the last relaying node device and the packet is the one to be relayed to the sub transmission path, and outputs a separation instruction to the demultiplexer 1604. Upon reception of the separation instruction from the comparator 1601, the demultiplexer 1604 outputs the input packet B to the I/F unit 1603. Thus, the packet B is output to the I/F unit 1603, and is received by the terminal equipment V 549 as the destination via the sub transmission path V 541. After the header portion of the packet is removed, only the data portion 1102 is extracted and is subjected to required processing.

In this manner, the packet B to be transmitted from the terminal equipment I 545 as the source connected to the sub transmission path I 537 of the node device I 601 toward the terminal equipment V 549 connected to the sub transmission path V 541 of the node device IV 604 is output from the variable wavelength transmission unit I 528 of the node device I 601 as an optical signal of the wavelength λ5. The packet B is relayed as the optical signal of the wavelength λ5 while the value in the section for indication of the number of relayings is decremented in the node devices I 601, II 602, and III 603. Thereafter, the separation-insertion unit V 516 of the node device IV 604 detects that the value in the section for indication of the number of relayings is "0", and the packet B is separated and transmitted onto the sub transmission path V 541. Then, the packet B is received by the terminal equipment V 549.

(Fourth Embodiment)

As in the third embodiment, when the output channels of each node device are not limited like in the above-mentioned second multihop system, the output channel need only be designated in the node device immediately before the last node device. As has been exemplified in the third embodiment, when a packet is to be transmitted from the node device I 601 to the node device IV 604 in FIG. 6, the packet can be input to only the node device IV 604 as the last relaying node device using the channel designated by the value in the section 1502 for designation of the channel. Therefore, at this time, the output channel of the packet in the node devices I 601 and II 602 is not particularly limited.

Such communication method can be realized in such a manner that the packet can be stored in any memory region of the dual port memory 1709 when the value in the section for indication of the number of relayings is other than "1" in the third embodiment. Alternatively, the following arrangement may be preferably used.

Figure 19:
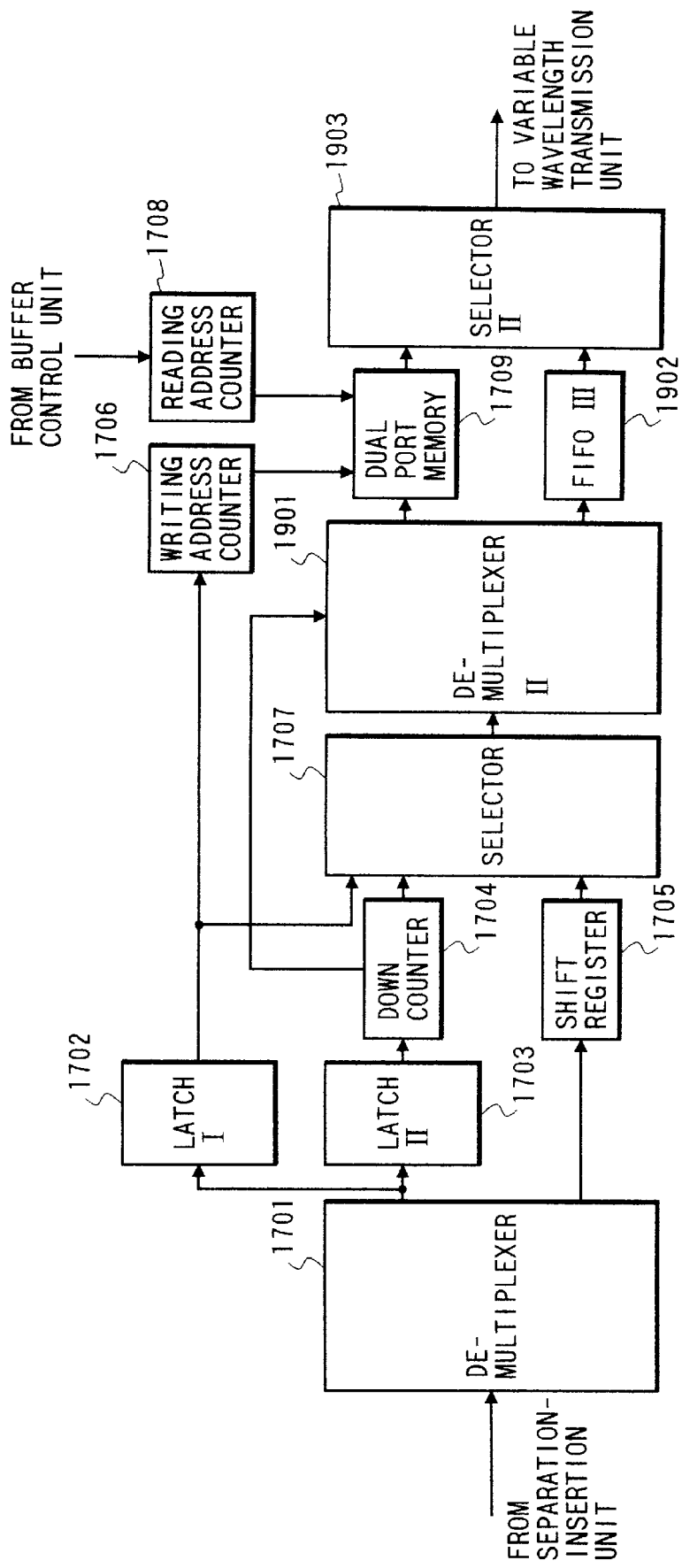
FIG. 19 is a block diagram showing the arrangement of a buffer according to the fourth embodiment of the present invention.

FIG. 19 shows another internal arrangement of each of the buffers I 520 to VIII 527 used in the fourth embodiment of the present invention. The buffers I 520 to VIII 527 have the same internal arrangement.

The same reference numerals in FIG. 19 denote the same blocks as in FIG. 17. Referring to FIG. 19, the down counter 1704 decrements the value in the section 1501 for indication of the number of relayings of the header portion of a packet output from the latch II 1703 and outputs the decremented value to the selector 1707 as in FIG. 17. Also, when the input value is not "1", the down counter 1704 instructs a demultiplexer II 1901 to set its output destination to be a FIFO III 1902. On the other hand, when the input value is "1", the down counter 1704 instructs the demultiplexer II 1901 to set its output destination to be the dual port memory 1709 since the packet must be input to the fixed wavelength reception unit, to which the sub transmission path as the destination is connected, of those of the next node device. The demultiplexer II 1901 outputs the input packet to either the dual port memory 1709 or the FIFO III 1902 in accordance with the decremented result from the down counter 1704. The FIFO III 1902 temporarily stores the input packet, and outputs the stored packet to a selector II 1903 in the input order under the control of a reading control unit. The selector II 1903 selects one of the outputs from the dual port memory 1709 and the FIFO III 1902 to be output to the variable wavelength transmission unit in accordance with an instruction from a buffer control unit.

In the communication method using buffers with this arrangement, after the transmission wavelength of the variable wavelength transmission unit is set under the control of a wavelength control unit, a packet which is written in the dual port memory 1709 and is to be transmitted at the set wavelength is read out under the control of the buffer control unit, and thereafter, the contents of the FIFO III 1902 are read out. Thereafter, the transmission wavelength of the variable wavelength transmission unit is changed, and the reading operations of the dual port memory 1709 and the FIFO III 1902 are performed again.

In the above-mentioned arrangement and the communication method, the above-mentioned packet B is written in the FIFO III 1902 in the buffer I 520 of the node device I 601 since the value in the section 1501 for indication of the number of relayings of its header portion input to the down counter 1704 is not "1". Thereafter, the packet B is output from the variable wavelength transmission unit I 528 as an optical signal of one of the wavelengths $\lambda 1$ to $\lambda 8$. The packet B is received by the fixed wavelength reception unit, which receives an optical signal of the transmission wavelength of the packet B, of the eight fixed wavelengths reception units I 504 to VIII 511 in the node device II 602, and is input to the buffer via the separation-insertion unit. In the buffer, as in the node device I 601, since the value in the section 1501 for indication of the number of relayings of the header portion B input to the down counter 1704 is "2" but not "1", the packet B is written in the FIFO III 1902, and thereafter, is transmitted from the variable wavelength transmission unit as an optical signal of one of the wavelengths $\lambda 1$ to $\lambda 8$.

Subsequently, in the node device III 603, since the value in the section 1501 for indication of the number of relayings is "1", the packet B is written in the dual port memory 1709. The memory region in which the packet B is written at that time is determined by looking up the value in the section for designation of the wavelength in use of the header portion of the packet B, and the memory region V is used since the value is "5". The packet B written in the memory region V is read out under the control of the buffer control unit, and is output from the variable wavelength transmission unit V 528 as an optical signal of the wavelength $\lambda 5$. Since the separation-insertion unit V 508 of the node device IV 604 detects that the value in the section for indication of the number of relayings is "0", the packet B is separated and transmitted onto the sub transmission path V 541 and is received by the terminal equipment V 549.

In the communication method using buffers with the arrangement of this embodiment, after a packet written in the dual port memory 1709 is transmitted, a packet written in the FIF0 III 1902 is transmitted without changing the wavelength. Therefore, the number of times of changing the wavelength of the variable wavelength transmission unit can be reduced, and the transmission disable time required for changing the wavelength can be shortened, thus improving communication efficiency.

In the third and fourth embodiments, since a node device that can transmit a packet, received at a certain wavelength, at a desired one of all the wavelengths used in the network is used, even when a certain packet is to be relayed by a plurality of node devices, only one of the relaying node devices must relay the packet using the designated wavelength. In this embodiment, the node device which relays the packet using the designated wavelength is a node device immediately before the last relaying node device. However, the present invention is not limited to this. For example, a node device before the node device immediately before the last relaying node device may relay the packet using the designated wavelength. In this case, when the value in the section for indication of the number of relayings is a predetermined value, the value in the section for designation of the wavelength in use is looked up, and the packet is relayed using the designated wavelength. At this time, each of the subsequent relaying node devices outputs the packet using the same channel as the input channel. In this embodiment, since the wavelength to be used is designated in only the relaying operation in one node device, the header portion of the packet, i.e., the format of the section for designation of the wavelength in use and the section for indication of the number of relayings can be simplified.

(Another Embodiment)

In the above and subsequent embodiments, each node device serves as a node for relaying communications between end terminal equipments or end sub transmission paths. The sub transmission path may be connected not only to a terminal equipment but also to another network. The present invention can be applied not only to a signal input to a node device via a sub transmission path but also to a communication of a signal generated in the node device between node devices. In this case as well, when a node device in which a signal is generated and which starts a communication is processed as a relaying node device, the present invention can be directly applied. When the destination of a packet is not a sub transmission path (or a terminal equipment connected thereto) connected to a node device but the node device itself, the present invention can be applied if the destination node device is processed as the last relaying node device.

In the first embodiment, sections for designating the wavelengths to be used by the respective node devices are used, and the section for designation of the wavelength in use looked up by the node device that performs the relaying operation is deleted in each relaying operation. As another format of the header portion in the first embodiment, a section for indication of the number of relayings may be allocated at the beginning of a packet. Other sections are the same as the sections for designation of the wavelength in use in the first embodiment. A node device that relays this packet looks up the section for indication of the number of relayings in the packet, and then looks up the section for designation of the wavelength in use corresponding to the value in the former section, thereby determining the transmission wavelength. The initial value in the section for indication of the number of relayings of the packet is "1", and the first node device looks up the first section for designation of the wavelength in use as that corresponding to the value "1". Thereafter, the node device processes this packet to increment the value in the section for indication of the number of relayings to "2", and outputs the processed packet onto the transmission path. The next relaying node device looks up the second section for designation of the wavelength in use since the value in the section for indication of the number of relayings is "2". Thereafter, the node device increments the value in the section for indication of the number of relayings to "3", and outputs the packet onto the transmission path. Each node device increments the value in the section for indication of the number of relayings in each relaying operation. With this format, the looked-up section for designation of the wavelength in use need not be deleted in each relaying operation unlike in the first embodiment.

More specifically, according to the present invention, a packet has a format with which each relaying node device can recognize whether or not the wavelength to be used in the relaying operation is designated or which transmission wavelength it must use when the wavelength is designated, without looking up all the addresses. For this reason, the relaying node device can look up only a portion to be looked up by the own node device of the address portion in the packet only when the own node device is required to look it up. Furthermore, when a packet is relayed by a plurality of node devices, each relaying node device need only have means for allowing a subsequent node device or devices, which must relay the packet by looking up the sections for designation of the wavelength in use, to look up a portion to be looked up (e.g., by removing the section looked up by the own node device or performing a calculation for the section for indication of the number of relayings).

In the above and subsequent embodiments, a plurality of channels are constituted using different wavelengths. However, the present invention is not limited to this, but is effective to a case wherein a destination terminal equipment or the like is connected to only some channels in a network having a plurality of transmission channels. More specifically, as transmission channels, in place of the wavelength multiplex channels in the above-mentioned embodiments, various kinds of channels such as frequency multiplex channels using electrical signals, spatial multiplex channels obtained by bundling a plurality of transmission paths, and the like may be used. Note that term "multiplex" here means a theoretical one, and a plurality of channels need not be physically multiplexed in a single transmission path or a plurality of transmission paths need not be physically bundled. For example, a plurality of channels may be obtained by the wavelength multiplex method using space as a transmission path.

In the third and fourth embodiments, the section for indication of the number of relayings is allocated in the packet to indicate the number of relayings. Alternatively, the system of each of the third and fourth embodiments may adopt an arrangement using the packet used in the first embodiment. In this case, however, since the channels of node devices other than a node device immediately before the destination node device need not be designated, significant values need not be set in sections for designation of the wavelength in use of relaying node devices other than that of the node device immediately before the last relaying node device (destination node device). The number of sections for designation of the wavelength in use of relaying node devices set in a packet serves as information indicating the number of relayings.

As described above, according to the node device for the channel multiplex network system and the communication method of the present invention, since the channel of a signal used in the relaying operation is determined based on each of or a combination of information indicating whether or not an output channel must be designated in the relaying operation, information indicating the output channel, information indicating the number of relayings, and the like, without comparing the destination address with those of all the terminal equipments connected to the network system, decoders in the node device can be simplified or omitted, and the channel to be used in the relaying operation can be determined at high speed. For this reason, a low-cost node device which can prevent an increase in its hardware scale can be provided, and a high-speed operation of the network system can be assured.

Since the sections for designating channels of a signal to be used in the relaying operations are assigned in units of relaying node devices, each relaying node device performs the relaying operation by, e.g., deleting the section assigned to the own node device. For this reason, since the relaying node device need only process the section for designating a channel of a signal to be used in the own node device, which section is located at the beginning of the header portion, simple, high-speed processing can be assured.

Furthermore, when the header portion includes a section for indicating the number of relayings and a section for designating the channel of a signal to be used in the relaying operation, if the number of relayings is large, the header portion can be shortened as compared to a case wherein the channels to be used by the respective node devices are individually designated, thus improving the communication efficiency.

Moreover, when the header portion is assigned a function of instructing not to designate the channel to be used in the relaying operation, the change interval of the transmission wavelength can be prolonged, and the transmission disable time required for changing the wavelength can be shortened, thus improving the communication efficiency.

(Fifth Embodiment)

In the arrangement of each of the third and fourth embodiments, when a terminal equipment wants to broadcast a packet to all the terminal equipments connected to the network system, it looks up a terminal equipment connection table to obtain information associated with the numbers of relayings to the respective terminal equipments and the channels to which the respective terminals are connected, forms a packet using the obtained information as address information, and transmits the packet toward the respective terminal equipments, thereby broadcasting the packet.

In this embodiment and the sixth embodiment to be described later, the broadcasting method is improved, and a packet can be broadcasted without looking up the terminal equipment connection table.

Figure 20:
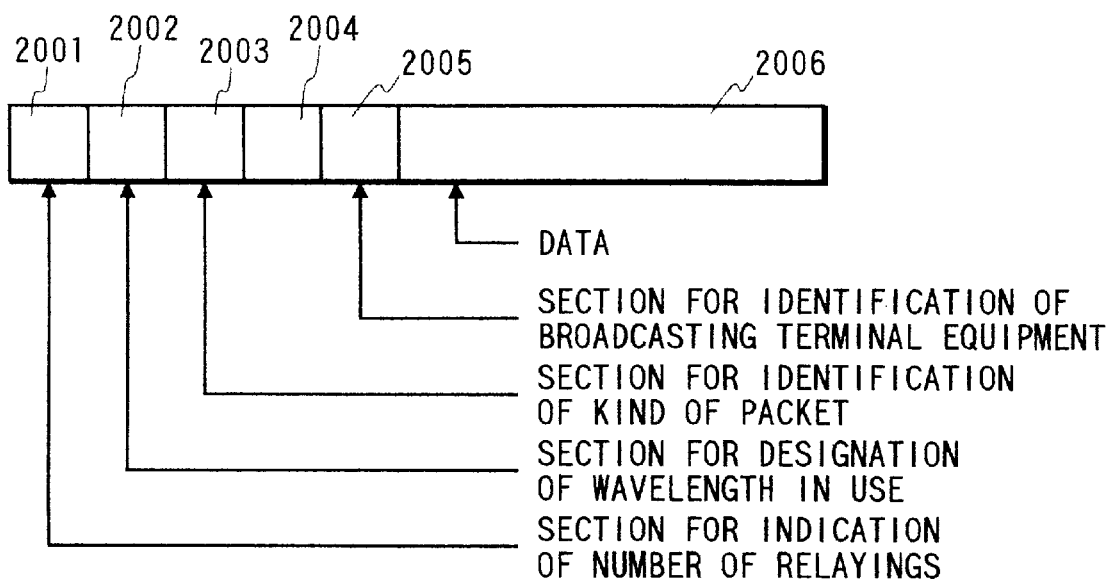
FIG. 20 is a view showing the format of a broadcasting packet according to the fifth embodiment of the present invention.

FIG. 20 shows the format of a broadcasting packet suitably used in this embodiment.

Referring to FIG. 20, a section 2001 for indication of the number of relayings indicates the number of relayings required for transmitting a packet from the source node device of the broadcasting packet to the destination node device. Each relaying node device can recognize whether or not the neighboring node device at the downstream side in the transmission direction is the destination node device by checking if the value in the section 2001 for indication of the number of relayings is "1". Also, by checking if this value is "0", each node device can recognize whether or not a terminal device connected to itself is the destination. A section 2002 for designation of the wavelength in use designates the wavelength to be used in the relaying transmission operation. As the value to be used in the section 2002 for designation of the wavelength in use of this header portion, "1" to "8" are respectively assigned in correspondence with transmission wavelengths λ1 to λ8, as shown in Table 2 above. A section 2003 for identification of the kind of packet indicates the kind of this packet, and a value indicating a broadcasting packet is set as the type of packet. The header portion also includes a remaining header portion 2004. The section 2001 for indication of the number of relayings, the section 2002 for designation of the wavelength in use, the section 2003 for identification of the kind of packet, and the remaining header portion 2004 constitute the header portion. A section 2005 for identification of the broadcasting terminal equipment is written with the terminal equipment identification number of the broadcasting terminal equipment as the source of a broadcasting packet. Data to be broadcasted is written in a data portion 2006.

Figure 21:
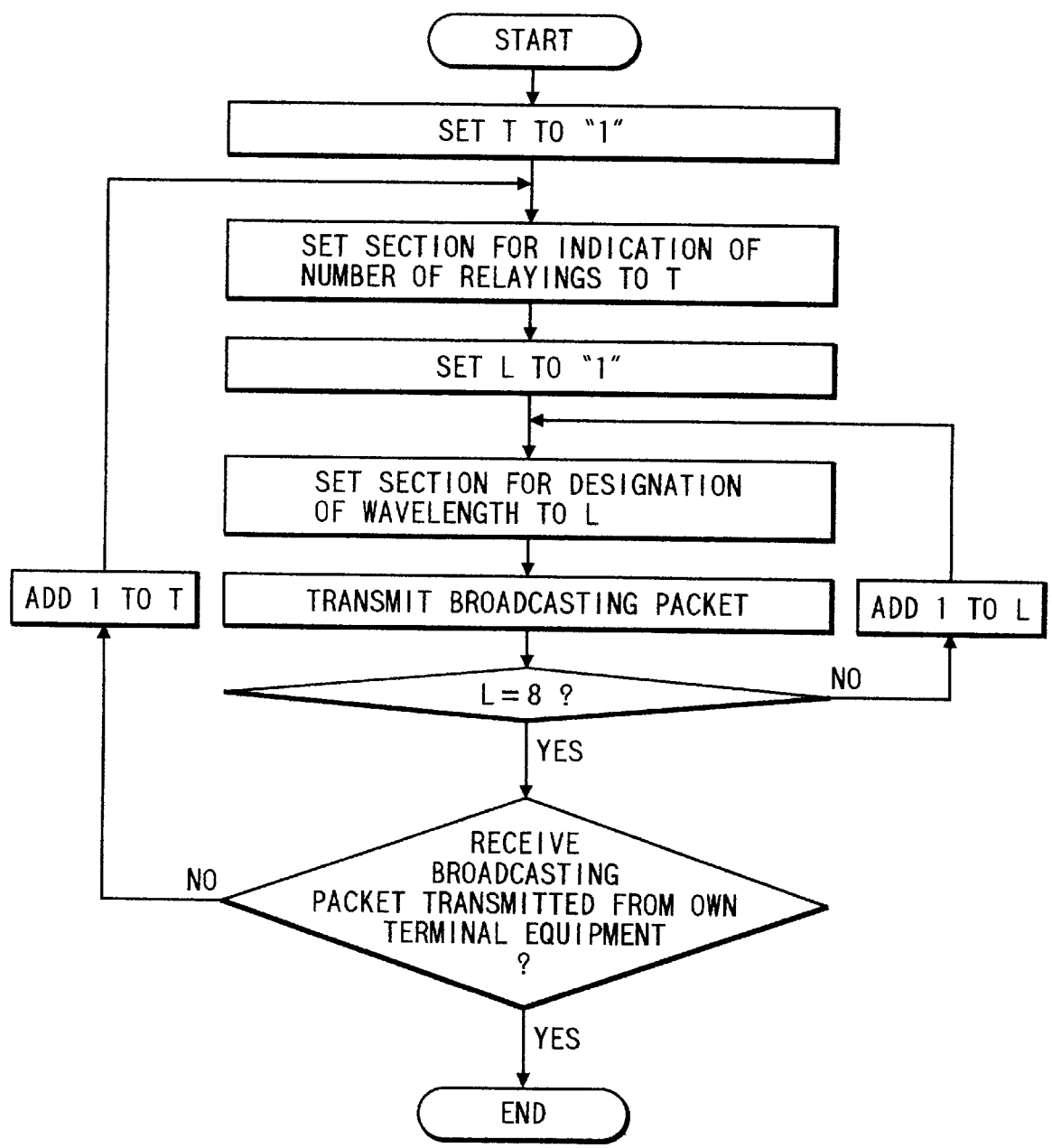
FIG. 21 is a flow chart showing the operation of a terminal equipment as a source of the broadcasting packet according to the fifth embodiment of the present invention.

FIG. 21 is a flow chart showing the operation of the broadcasting terminal equipment as the source of a broadcasting packet in this embodiment.

A case will be exemplified below wherein the terminal equipment I 545 connected to the node device I 601 broadcasts data in the arrangement of the network system shown in FIG. 6 using the arrangement of the node device shown in FIGS. 5A and 5B. In the following description, the same constituting elements in different terminal equipments are denoted by the same reference numerals as in FIGS. 5A, 5B, 6, 9, 16, and 17, for the sake of convenience.

The terminal equipment I 545 as the broadcasting terminal equipment connected to the node device I 601 forms a broadcasting packet by setting "1" in the section 2001 for indication of the number of relayings and "1" in the section 2002 for designation of the wavelength in use, and transmits the packet to the separation-insertion unit I 512 of the node device I 601 via the sub transmission path I 537. At this time, the identification number of the terminal equipment I 545 is written in the section for identification of the broadcasting terminal equipment of the broadcasting packet. In the following description, this packet will be referred to as a packet C.

The I/F unit 1603 of the separation-insertion unit I 512 of the node device I 601 sequentially writes the broadcasting packet C transmitted via the sub transmission path I 537 in the FIFO I 1606. Upon completion of the writing operation of the broadcasting packet C in the FIFO I 1606, the insertion control unit 1605 detects a division of a packet flow which is being read out from the FIFO II 1607, switches the input source of the selector 1608 to the FIFO I 1606, stops the reading operation of the FIFO II 1607, and starts a reading operation of the FIFO I 1606. Thereafter, upon completion of the reading operation of the broadcasting packet C written in the FIFO I 1606, the insertion control unit 1605 switches the input source of the selector 1608 to the FIFO II 1607 again, stops the reading operation of the FIFO I 1606, and restarts a reading operation of the FIFO II 1607. The broadcasting packet C output from the selector 1608 is input to the buffer I 520.

The demultiplexer 1701 of the buffer I 520 outputs the value in the section 2002 for designation of the wavelength in use of the header portion of the broadcasting packet C output from the separation-insertion unit to the latch I 1702, the value in the section 2001 for indication of the number of relayings to the latch II 1703, and the data portion 2006 to the shift register 1705, respectively. The latch I 1702 stores the value in the section 2002 for designation of the wavelength in use of the header portion of the broadcasting packet C, and outputs the stored value to the writing address counter 1706 and the selector 1707. The latch II 1703 stores the value in the section 2001 for indication of the number of relayings of the header portion of the broadcasting packet C, and outputs the stored value to the down counter 1704. The value "1" in the section 2001 for indication of the number of relayings of the header portion of the broadcasting packet C output from the latch II 1703 is decremented to "0" by the down counter 1704, and the value "0" is output to the selector 1707. The shift register 1705 delays the data portion 2006 of the broadcasting packet C output from the demultiplexer 1701 by a desired period of time, and outputs the delayed data portion 2006 to the selector 1707. The selector 1707 re-constructs the broadcasting packet B with the decremented value in the section 2001 for indication of the number of relayings by sequentially selecting the value in the section 2002 for designation of the wavelength in use of the header portion of the packet C output from the latch I 1702, the value in the section 2002 for indication of the number of relayings decremented by the down counter 1704, and the delayed data portion 2006 of the broadcasting packet C output from the shift register 1705. The selector 1707 then outputs the packet to the dual port memory 1709.

On the other hand, the writing address counter 1706 sets the writing start address of the dual port memory 1709, in which the broadcasting packet C is to be written, to be A1 in accordance with the value "1" in the section 2002 for designation of the wavelength in use of the header portion of the broadcasting packet C output from the latch I 1702, and sequentially outputs writing address signals of the packet to the dual port memory 1709. The input port of the dual port memory 1709 receives the re-constructed broadcasting packet C via the selector 1707, and the packet C is sequentially written in the memory region I in accordance with the addresses output from the writing address counter 1706. After the broadcasting packet C is written in the memory region I in this manner, when the transmission wavelength of the variable wavelength transmission unit I 528 is set to be λ1 under the control of the wavelength control unit in the control section 501, the buffer control unit in the control section 501 outputs an offset value A1 corresponding to the memory region I to the reading address counter 1708 of the buffer I 520. Based on this offset value A1, the reading address counter 1708 generates addresses for reading out the broadcasting packet C written in the memory region I by sequentially incrementing a counter, and outputs the addresses to the dual port memory 1709. The broadcasting packet C is sequentially read out from the output port of the dual port memory 1709 on the basis of the reading addresses, and is output to the variable wavelength transmission unit I 528. Since the transmission wavelength of the variable wavelength transmission unit I 528 is set to be λ1, the broadcasting packet C is output from the variable wavelength transmission unit I 528 to the wavelength multiplexer 536 as an optical signal of the wavelength λ1, and is multiplexed with optical signals of different wavelengths output from other variable wavelength transmission units II 529 to VIII 535 by the wavelength multiplexer 536. Then, the multiplexed signal is output onto the optical fiber 502 and is transmitted to the neighboring node device II 602 at the downstream side.

The broadcasting packet C transmitted to the node device II 602 as the optical signal of the wavelength λ1 is received by the fixed wavelength reception unit I 504 of the node device II 602, and is output to the separation-insertion unit I 512. The latch 1602 of the separation-insertion unit I 512 stores the value in the section 2001 for indication of the number of relayings of the broadcasting packet C output from the fixed wavelength reception unit I 504, and outputs the stored value to the comparator 1601. Since the value in the section 2001 for indication of the number of relayings of the broadcasting packet C output from the latch 1602 is "0", the comparator 1601 outputs a separation instruction to the demultiplexer 1604. Upon reception of the separation instruction from the comparator 1601, the demultiplexer 1604 outputs the input broadcasting packet C to the I/F unit 1603. Thus, the broadcasting packet C is output to the I/F unit 1603, and is transmitted onto the sub transmission path I 537. Thereafter, the packet C is received by the terminal equipment I 545 as the destination. The packet processing unit 902 reads the value in the section 2003 for identification of the kind of packet of the header portion and performs predetermined reception processing of the packet since the value indicating the broadcasting packet is set in the section 2003.

After the first broadcasting packet C is transmitted, the terminal equipment I 545 as the broadcasting terminal equipment connected to the node device I 601 forms seven broadcasting packets by setting "1" in their sections 2001 for indication of the number of relayings, and setting "2" to "8" in their sections 2002 for designation of the wavelength in use, and transmits these packets to the separation-insertion unit I 512 of the node device I 601 via the sub transmission path I 537 as in the above-mentioned broadcasting packet C.

At this time, the values in the sections 2005 for identification of the broadcasting terminal equipment of these seven broadcasting packets are the same as that in the broadcasting packet C. These seven broadcasting packets are respectively processed in the same manner as the broadcasting packet C and are output from the separation-insertion unit I 512 to the buffer I 520. In the buffer I 520, the values "1" in the sections 2001 for indication of the number of relayings in these seven broadcasting packets are decremented to "0" by the down counter 1704, and the seven broadcasting packets are respectively written in the memory regions II to VIII of the dual port memory in accordance with the values in the sections 2002 for designation of the wavelength in use of their header portions. After the seven broadcasting packets are written in the memory regions II to VIII in this manner, these packets are transmitted from the variable wavelength transmission unit I 528 to the neighboring node device II 602 at predetermined wavelengths set in their sections 2002 for designation of the wavelength in use under the control of the wavelength control unit and the buffer control unit in the control section 501.

The seven broadcasting packets transmitted to the node device II 602 are respectively received by the fixed wavelength reception units II 505 to VIII 5111 of the node device II 602 in accordance with the wavelengths set in their sections 2002 for designation of the wavelength in use, and are separated by the separation-insertion units II 513 to VIII 519 as in the broadcasting packet C. Then, the seven broadcasting packets are respectively output to the terminal equipments II 546 to VIII 552 via the corresponding sub transmission paths. In the terminal equipments II 546 to VIII 552, the packets are subjected to reception processing in the same manner as the broadcasting packet C.

In this manner, the broadcasting packets are transmitted from the terminal equipment I 545 connected to the node device I 601 to the terminal equipments I 545 to VIII 552 connected to the node device II 601 and are subjected to reception processing.

Subsequently, the terminal equipment I 545 as the broadcasting terminal equipment connected to the node device I 601 forms eight broadcasting packets by setting "2" in their sections 2001 for indication of the number of relayings, and setting "1" to "8" in their sections 2002 for designation of the wavelength in use, and transmits these packets. At this time, the values in the sections 2005 for identification of the broadcasting terminal equipment of these eight broadcasting packets are the same as that in the above-mentioned broadcasting packet C. These eight broadcasting packets are processed by the node device I 601 in the same manner as in the broadcasting packet C, and the values in their sections 2001 for indication of the number of relayings are decremented from "2" to "1". Thereafter, these packets are output to the node device II 602. In the separation-insertion unit of the node device II 602, since the values in the sections 2001 for indication of the number of relayings are "1", the input packets are not separated but are output to the buffers. After the values in the sections 2001 for indication of the number of relayings are decremented from "1" to "0", the packets are output from the variable wavelength transmission unit to the node device III 603. Since the values in the sections 2001 for indication of the number of relayings are "0", these packets are separated in the node device III 603, and are respectively output to the terminal equipments I 545 to VIII 552. Thereafter, the packets are subjected to the processing in the same manner as described above. In this manner, the broadcasting packets are transmitted to the terminal equipments I 545 to VIII 552 connected to the node device III 603 and are subjected to reception processing.

Subsequently, the terminal equipment I 545 as the broadcasting terminal equipment connected to the node device I 601 similarly forms eight broadcasting packets by setting "3" in their sections 2001 for indication of the number of relayings, and transmits these packets.

These eight broadcasting packets are relayed by the node devices II 602 and III 603 in the same manner as described above, and are separated from packet flows of the respective channels by the eight separation-insertion units of the node device IV 604. The separated packets are transmitted to the terminal equipments I 545 to VIII 552 connected to the node device IV 604 and are then subjected to reception processing.

Furthermore, the terminal equipment I 545 as the broadcasting terminal equipment connected to the node device I 601 similarly forms eight broadcasting packets by setting "4" in their sections 2001 for indication of the number of relayings, and transmits these packets. These eight broadcasting packets are relayed by the node devices II 602, III 603, and IV 604 in the same manner as described above, and are received by the eight terminal equipments connected to the node device I 601. At this time, the terminal equipments II 546 to VIII 552 connected to the node device I 601 perform the reception processing of the broadcasting packets.

On the other hand, the terminal equipment I 545 connected to the node device I 601 is the broadcasting terminal equipment that transmitted the broadcasting packets. The broadcasting terminal equipment detects based on the value in the section 2005 for identification of the broadcasting terminal equipment in the received broadcasting packet that this broadcasting packet was transmitted from the own terminal equipment, was relayed by all the node devices on the network system, and returned to the own terminal equipment after it traveled through the network once, thus ending transmission of the broadcasting packets.

In this embodiment, since all the node devices can receive all the wavelengths and have a function of transmitting a received packet using a desired wavelength as in the third and fourth embodiments, the transmission wavelength of only one of the relaying node devices of a broadcasting packet need be designated.

(Sixth Embodiment)

Figure 22:
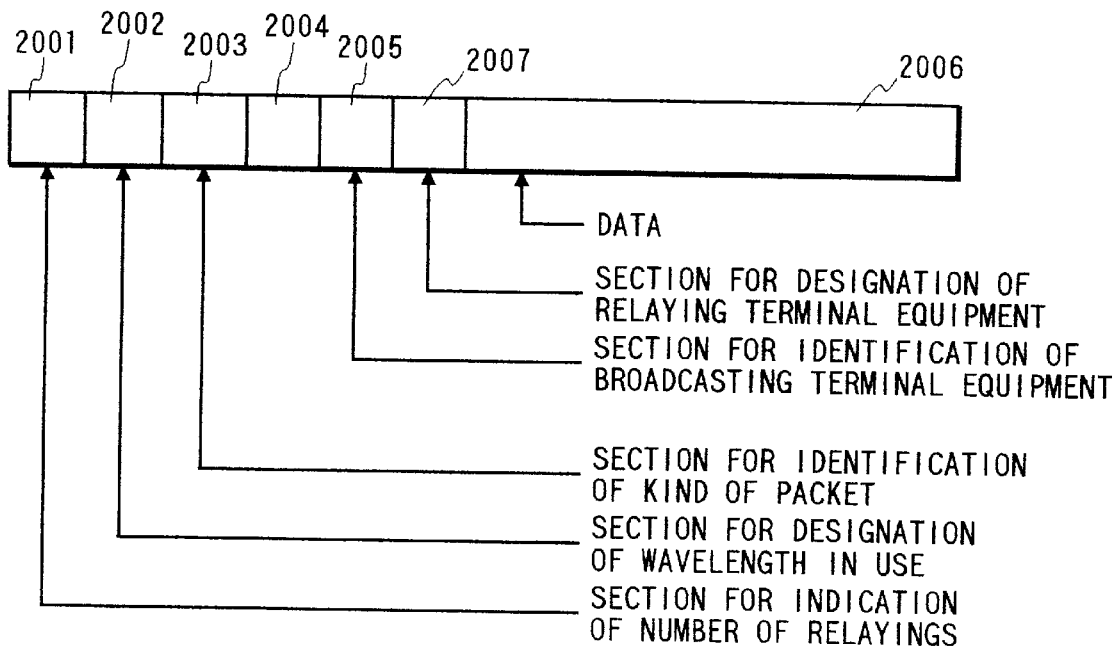
FIG. 22 is a view showing the format of a broadcasting packet according to the sixth embodiment of the present invention.

FIG. 22 shows the second embodiment of a broadcasting packet according to the present invention. Referring to FIG. 22, a section 2007 for designation of the relaying terminal equipment designates the terminal equipment, which must relay and transmit a received broadcasting packet, of the eight terminal equipments connected to the node device. The designation is attained by designating the wavelength (to be referred to as a reception wavelength hereinafter) which is received by the fixed wavelength reception unit that outputs a packet to the separation-insertion unit to which the terminal equipment is connected via the sub transmission path, and the terminal equipment which received the packet of the designated wavelength relays and transmits the broadcasting packet.

Figure 23:
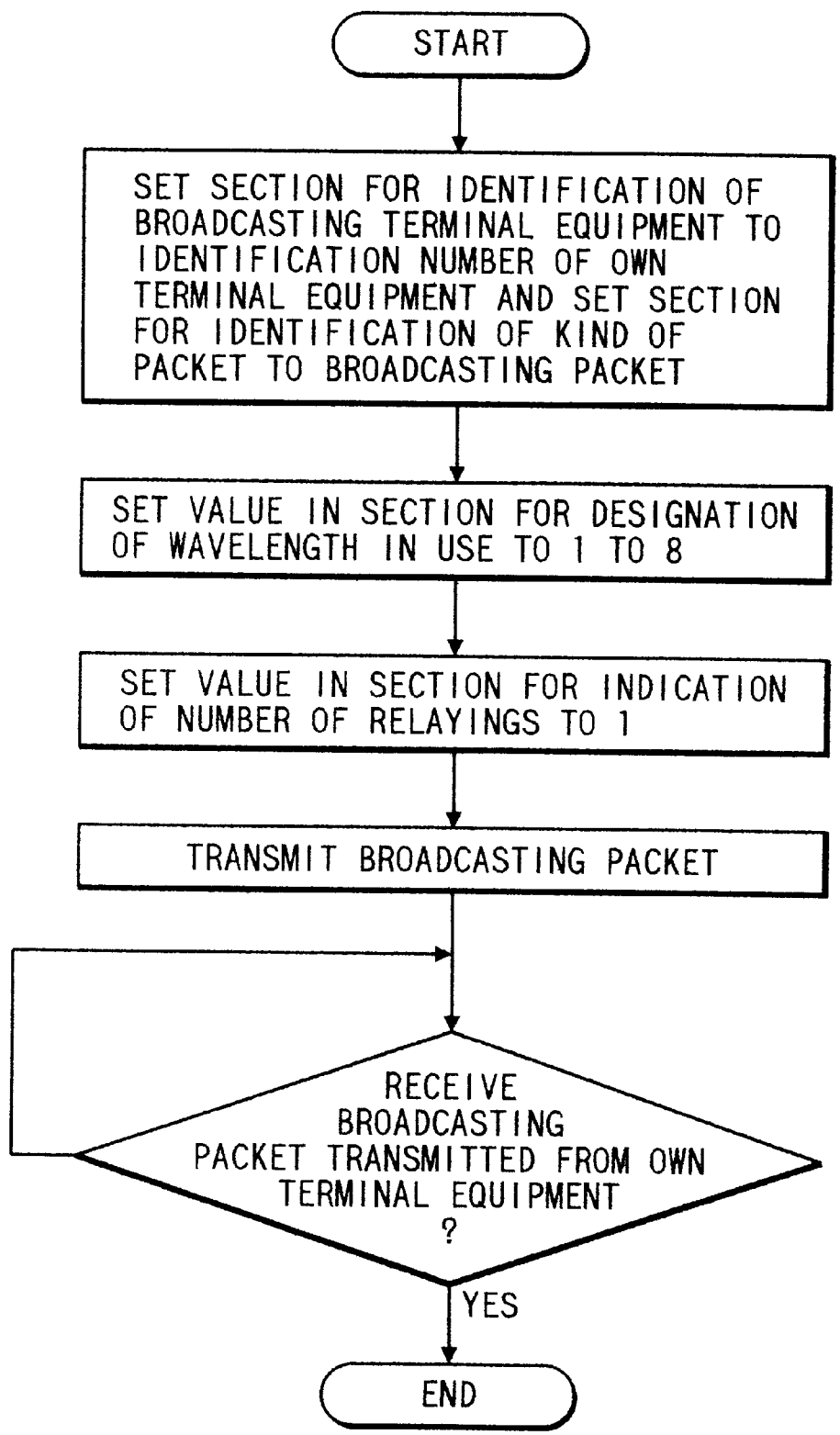
FIG. 23 is a flow chart showing the operation of a terminal equipment as a source of the broadcasting packet according to the sixth embodiment of the present invention.

FIG. 23 is a flow chart showing the operation of the terminal equipment as the source of a broadcasting packet in this embodiment.

Figure 24:
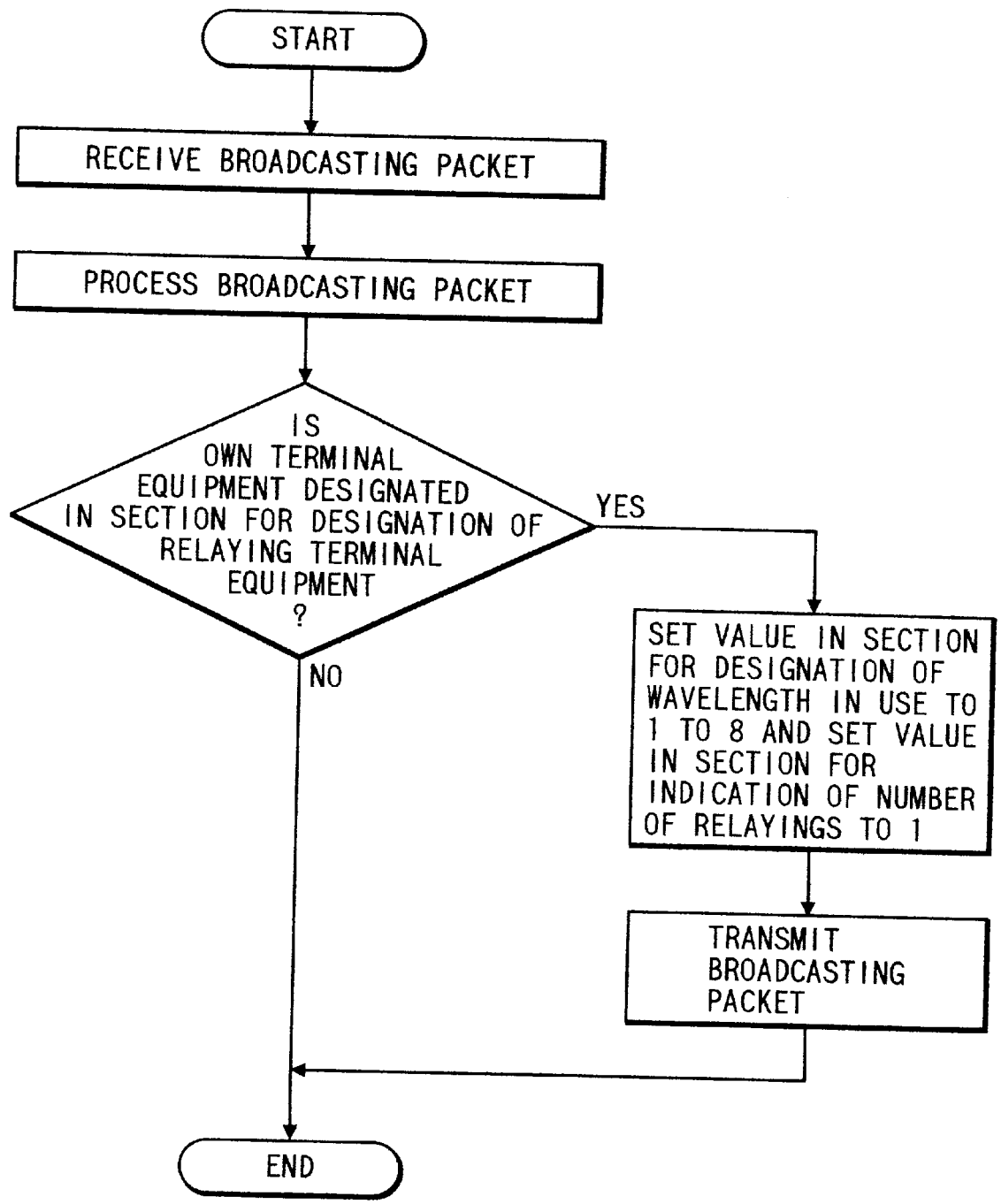
FIG. 24 is a flow chart showing the operation of a terminal equipment for receiving the broadcasting packet according to the sixth embodiment of the present invention.

FIG. 24 is a flow chart showing the operation of the terminal equipment which receives the broadcasting packet in this embodiment.

In this embodiment, the terminal equipment as the source of a broadcasting packet sequentially outputs eight packets in which "1" is set in the sections 2001 for indication of the number of relayings, and "1" to "8" are set in the sections 2002 for designation of the wavelength in use, and transmits the broadcasting packets to only the terminal equipments connected to the neighboring node device at the downstream side. The terminal equipments which received these broadcasting packets perform the reception processing of the broadcasting packets as in the fifth embodiment. Furthermore, the terminal equipment designated by the value in the section 2007 for designation of the relaying terminal equipment transmits eight packets, in which "1" is set in the sections 2001 for indication of the number of relayings, and "1" to "8" are set in the sections 2002 for designation of the wavelength in use, to only the eight terminal equipments connected to the neighboring node device at the downstream side. In this manner, the broadcasting packets are sequentially transmitted from the terminal equipment designated by the value in the section for designation of the relaying terminal equipment in the broadcasting packet to the terminal equipments connected to the neighboring node device at the downstream side. When the terminal equipment as the source of the broadcasting packet receives this broadcasting packet, the transmission of the broadcasting packet ends.

In this embodiment, since the number of broadcasting packets to be transmitted from the terminal equipment as the source of the broadcasting packet can become small, and the broadcasting packets are transmitted from a plurality of terminal equipments, the load upon transmission of the broadcasting packet can be reduced.

In the fifth embodiment, after the value in the section for designation of the wavelength in use is changed from "1" to "8" while the number of relayings is fixed, whether or not the broadcasting operation is to be ended is determined by checking if the broadcasting packet transmitted from the own terminal equipment is received, before the number of relayings is increased. However, the present invention is not limited to this. For example, the broadcasting operation may be ended as soon as it is detected that the received packet is the broadcasting packet transmitted from the own terminal equipment. However, in this arrangement, if the packet transmitted from the own terminal equipment is received before the broadcasting packet to be transmitted is broadcasted to all the terminal equipments (such an error tends to occur especially when the number of nodes or the number of wavelengths is small), transmission of the broadcasting packet undesirably ends at that time, and the broadcasting packet can no longer be transmitted even if more destinations to which the broadcasting packet need be transmitted still remain (in particular, other destinations connected to the node device to which the broadcasting source is connected). In order to solve this problem, a packet to be transmitted from the source to the respective node devices using a wavelength that can be received by the own terminal equipment ($\lambda 1$ in the fifth embodiment) is sent after packets transmitted using other wavelengths. For example, in the fifth embodiment, when packets in which the value in the section for designation of the wavelength in use is sequentially changed while the value in the section for indication of the number of relayings is fixed are output from the source terminal equipment, the value to be set in the section for designation of the wavelength in use can be changed in the order of, e.g., $2 \rightarrow 3 \rightarrow 4 \rightarrow 5 \rightarrow 6 \rightarrow 7 \rightarrow 8 \rightarrow 1$, so that "1" indicating the wavelength that can be received by the source is set last.

The same applies to the sixth embodiment. However, in the sixth embodiment, if there are two or more node devices, the source receives a packet relayed by another terminal equipment (not limited to the terminal equipment as long as a means can process and transmit a packet) as a packet broadcasted by the own source, the wavelength that can be received by the source must be designated for the relaying terminal equipment. Alternatively, the need for this designation can be obviated if terminal equipments that can receive the same wavelength as reception wavelength of the broadcasting source are used as relaying terminal equipments.

As described above, in the packet broadcasting method of the fifth and sixth embodiments, since a broadcasting packet can be transmitted to all the terminal equipments via the network system without looking up the terminal equipment connection table, a packet can be broadcasted even when none of the terminal equipments have a terminal equipment connection table (e.g., when a new network system is constituted or when the arrangement of the network system is changed).

The terminal equipment as the source can detect that the broadcasting packet was transmitted to all the terminal equipments since the broadcasting packet transmitted from the own terminal equipment is sent back to the own terminal equipment. For this reason, each terminal equipment which received the broadcasting packet need not send back a reception response packet, and completion of transmission of the broadcasting packet to all the terminal equipments can be easily detected. A packet can be broadcasted from a terminal equipment, which is not registered in the terminal equipment connection tables of other terminal equipments on the network system (such as a new terminal equipment added to the network system or a terminal equipment whose connection relationship is changed). Also, a packet can be broadcasted even when the network system includes a terminal equipment whose terminal equipment connection table suffers an error.

(Seventh Embodiment)

Figure 25:
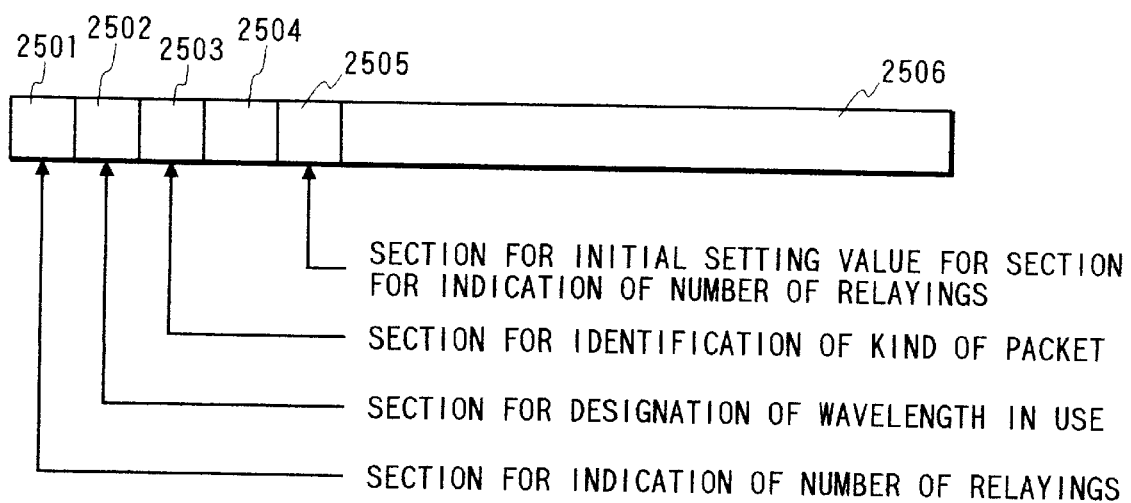
FIG. 25 is a view showing the format of a packet for count of the number of node devices according to the seventh embodiment of the present invention.

FIG. 25 shows the format of a packet for count of the number of node devices according to the seventh embodiment of the present invention, which packet is suitably used in a terminal equipment connection table generation method in the above-mentioned multihop system. The packet for count of the number of node devices is transmitted from a terminal equipment (to be referred to as a server hereinafter) which generates a terminal equipment connection table when a new network system is constituted or when the arrangement of the network system is changed, and is used for counting the number of node devices connected to the network system. The number of node devices obtained using this packet is used for calculating the values in sections for indication of the number of relayings in the terminal equipment connection table, as will be described later.

Referring to FIG. 25, a section 2501 for indication of the number of relayings indicates the number of relayings required for transmitting a packet from a node device as the source to a node device as the destination. Each node device can recognize based on the value in the section for indication of the number of relayings in the relaying operation whether or not the neighboring node device at the downstream side in the transmission direction is a node device as the destination. Also, each node device can determine whether or not a terminal equipment connected to the own node device is the destination by checking if the value in this section is "0". A section 2502 for designation of the wavelength in use designates the wavelength to be used in the relaying transmission operation. As the value to be used in the section 2502 for designation of the wavelength in use, "1" to "8" are assigned in correspondence with transmission wavelengths λ1 to λ8, as shown in Table 2 above. A section 2503 for identification of the kind of packet indicates the kind of packet, and a value indicating the packet for count of the number of node devices is set as the kind of packet. The header portion also includes a remaining header portion 2504. The section 2501 for indication of the number of relayings, the section 2502 for designation of the wavelength in use, the section 2503 for identification of the kind of packet, and the remaining header portion 2504 constitute the header portion.

A section 2505 for the initial setting value in the section of indication of the number of relayings is written with a value, which is set in the section for indication of the number of relayings by the source terminal equipment of the packet for count of the number of node devices. The packet also has a remaining data portion 2506. The value in the section 2505 for the initial setting value in the section of indication of the number of relayings and the remaining data portion 2506 constitute a data portion to be carried by this packet.

Figure 26:
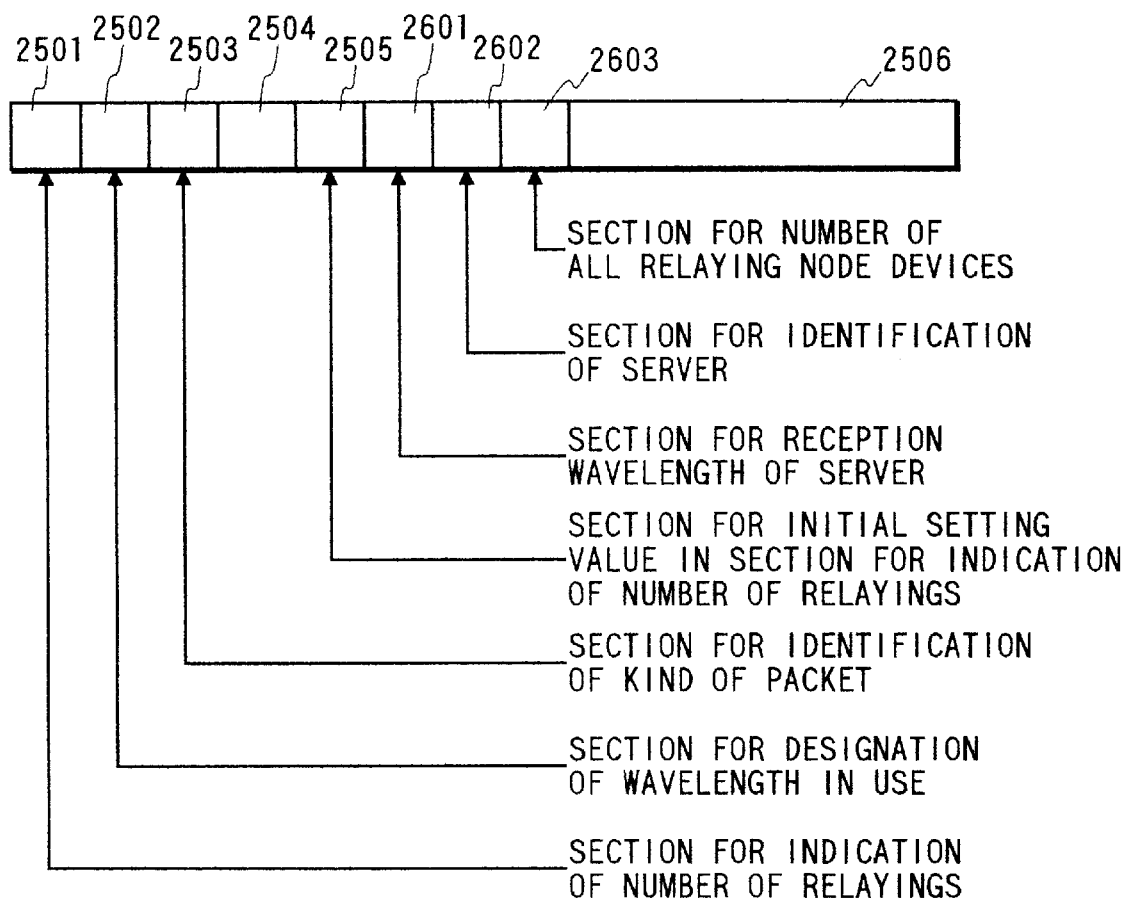
FIG. 26 is a view showing the format of a packet for notification of the number of node devices according to the seventh embodiment of the present invention.

FIG. 26 shows the format of a packet for notification of the number of nodes according to the present invention. The packet for notification of the number of nodes is transmitted from the server to notify all the terminal equipments on the network system of the number of node devices after the server obtains the number of node devices connected to the network system using the packet for count of the number of node devices. Referring to FIG. 26, a section 2601 for the reception wavelength of the server stores a value indicating the reception wavelength of the server. A section 2602 for identification of the server stores a value indicating the identification number of the server. A section 2603 for the number of all relaying node devices stores a value indicating the number of all the relaying node devices obtained by using the packet for count of the number of node devices. In the packet for notification of the number of node devices, a value indicating the packet for notification of the number of node devices as the kind of packet is set in the section for identification of the kind of packet.

Figure 27:
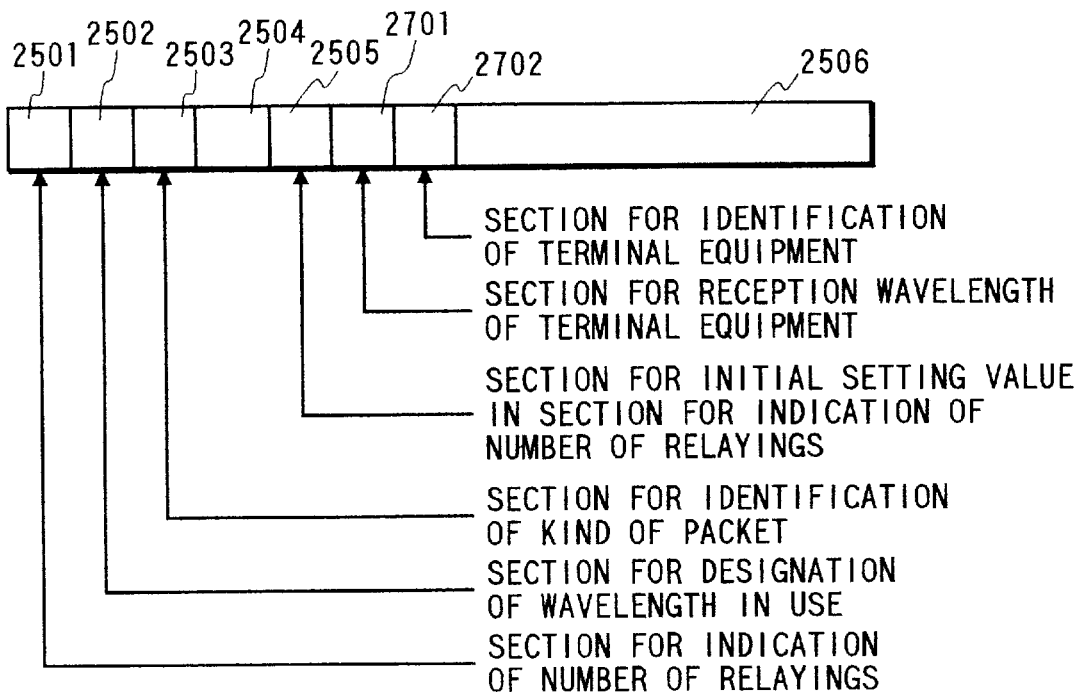
FIG. 27 is a view showing the format of a packet for report of the connection form according to the seventh embodiment of the present invention.

FIG. 27 shows the format of a packet for report of the connection form according to the present invention. The packet for report of the connection form is transmitted from a terminal equipment which received the packet for notification of the number of node devices transmitted from the server so as to report the connection information and identification number of the own terminal equipment to the server. Referring to FIG. 27, a section 2701 for the reception wavelength of the terminal equipment stores a value indicating the reception wavelength of the terminal equipment. A section 2702 for identification of the terminal equipment stores a value indicating the identification number of the terminal equipment. In the packet for report of the connection form, a value indicating the packet for report of the connection form as the kind of packet is set in the section for identification of the kind of packet.

The first embodiment of a terminal equipment connection table generation method according to the present invention using the packet for count of the number of node devices, the packet for notification of the number of node devices, and the packet for report of the connection form described above will be described below with reference to the operation flow charts shown in FIGS. 28 and 29. In the following description, a case will be exemplified below wherein the terminal equipment I 545 connected to the node device I 601 serves as a server when a network system having the arrangement shown in FIG. 6 using the arrangement of the node device shown in FIGS. 5A and 5B is newly constituted.

Figure 28:
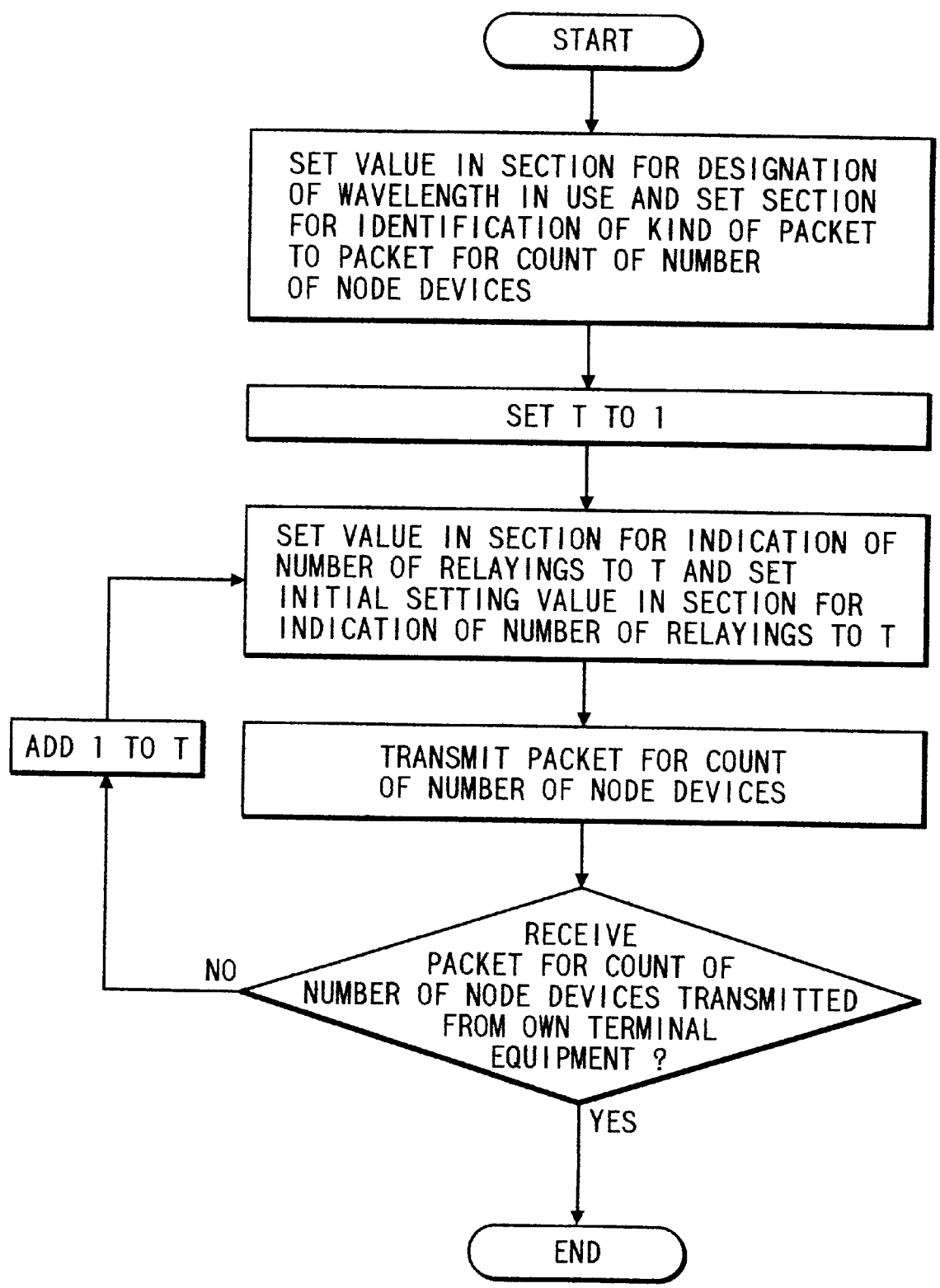
FIG. 28 is a flow chart showing the operation of a server in the first process according to the seventh embodiment of the present invention.
Figure 29:
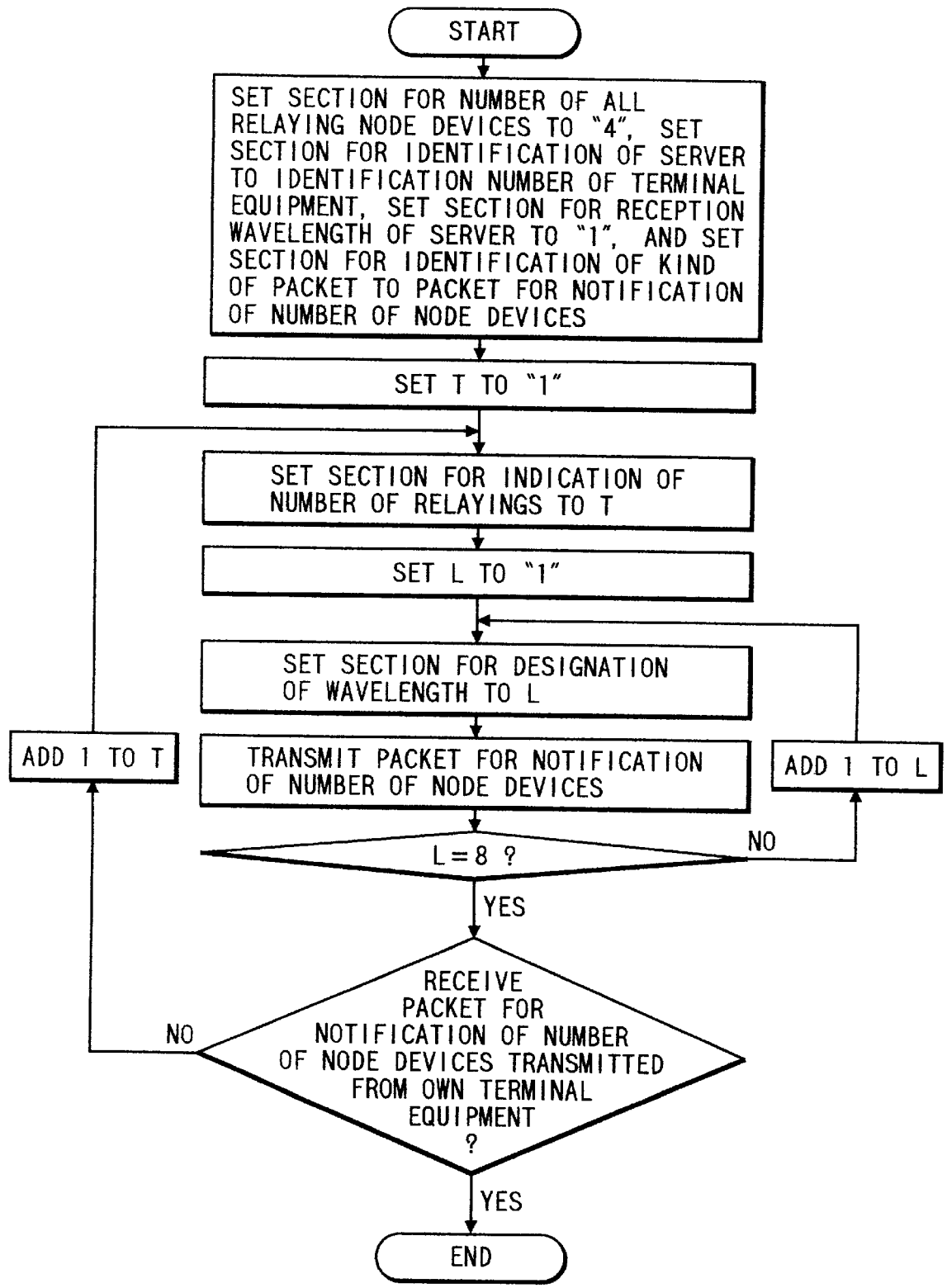
FIG. 29 is a flow chart showing the operation of the server in the second process according to the seventh embodiment of the present invention.

FIG. 28 is a flow chart showing the operation of the server as the source terminal equipment of the packet for count of the number of node devices in the seventh embodiment of the present invention, and FIG. 29 is a flow chart showing the operation of the sever as the source terminal equipment of the packet for notification of the number of node devices in the seventh embodiment of the present invention. In the following description, the same constituting elements in different terminal equipments are denoted by the same reference numerals as in FIGS. 5A, 5B, 6, 9, 16, and 17, for the sake of convenience. In the arrangement of the network system shown in FIGS. 5A and 5B, assume that identification numbers "11" to "18" are respectively assigned to the terminal equipments I 545 to VIII 552 connected to the node device I 601, identification numbers "21" to "28" are respectively assigned to the terminal equipments I 545 to VIII 552 connected to the node device II 602, identification numbers "31" to "38" are respectively assigned to the terminal equipments I 545 to VIII 552 connected to the node device III 603, and identification numbers "41" to "48" are respectively assigned to the terminal equipments I 545 to VIII 552 connected to the node device IV 604.

In the process of transmitting the packet for count of the number of node devices, which is used for detecting the number of node devices connected to the network system, the terminal equipment I 545 as the server connected to the node device I 601 forms a packet for count of the number of node devices by setting "1" in the section 2501 for indication of the number of relayings of the header portion, "1" in the section 2502 for designation of the wavelength in use, "1"

in the section 2505 for the initial setting value in the section for indication of the number of relayings, and a predetermined value in the section 2503 for identification of the kind of packet, and transmits this packet to the separation-insertion unit I 512 of the node device I 601 via the sub transmission path I 537. In the following description, this packet will be referred to as a packet D for count of the number of node devices.

The I/F unit 1603 of the separation-insertion unit I 512 of the node device I 601 sequentially writes the packet D for count of the number of node devices transmitted via the sub transmission path 537 in the FIFO I 1606. Upon completion of the writing operation of the packet D for count of the number of node devices in the FIFO I 1606, the insertion control unit 1605 detects a division of a packet flow which is being read out from the FIFO II 1607, switches the input source of the selector 1608 to the FIFO I 1606, stops the reading operation of the FIFO II 1607, and starts a reading operation of the FIFO I 1606. Thereafter, upon completion of the reading operation of the packet D for count of the number of node devices written in the FIFO I 1606, the insertion control unit 1605 switches the input source of the selector 1608 to the FIFO II 1607 again, stops the reading operation of the FIFO I 1606, and restarts a reading operation of the FIFO II 1607. The packet D for count of the number of node devices output from the selector 1608 is input to the buffer I 520.

The demultiplexer 1701 of the buffer I 520 outputs the value in the section 2502 for designation of the wavelength in use of the header portion of the packet D for count of the number of node devices output from the separation-insertion unit 512 to the latch I 1702, the value in the section 2501 for indication of the number of relayings to the latch II 1703, and the data portion to the shift register 1705. The latch I 1702 stores the value in the section 2502 for designation of the wavelength in use of the header portion of the packet D for count of the number of node devices, and outputs the stored value to the writing address counter 1706 and the selector 1707. The latch II 1703 stores the value in the section 2501 for indication of the number of relayings of the header portion of the packet D for count of the number of node devices, and outputs the stored value to the down counter 1704. The value "1" in the section 2501 for indication of the number of relayings of the header portion of the packet D for count of the number of node devices output from the latch II 1703 is decremented to "0" by the down counter 1704, and the decremented value is output to the selector 1707. The shift register 1705 delays the data portion of the packet D for count of the number of node devices output from the demultiplexer 1701 by a desired period of time, and outputs the delayed data portion to the selector 1707. The selector 1707 re-constructs the packet D for count of the number of node devices by sequentially selecting the value in the section 2502 for designation of the wavelength in use of the header portion of the packet D for count of the number of node devices output from the latch I 1702, the value in the section 2501 for indication of the number of relayings decremented by the down counter 1704, and the delayed data portion of the packet D for count of the number of node devices output from the shift register 1705. Then, the selector 1707 outputs the re-constructed packet to the dual port memory 1709. On the other hand, the writing address counter 1706 sets the writing start address of the dual port memory 1709, in which the packet D for count of the number of node devices is to be written, to be A1 in accordance with the value "1" in the section 2502 for designation of the wavelength in use of the header portion of the packet D for count of the number of node devices output from the latch I 1702, and sequentially outputs writing address signals of the packet to the dual port memory 1709. The input port of the dual port memory 1709 receives the re-constructed packet D for count of the number of node devices via the selector 1707, and the packet D is sequentially written in the memory region I in accordance with the addresses output from the writing address counter 1706.

After the packet D for count of the number of node devices is written in the memory region I, when the transmission wavelength of the variable wavelength transmission unit I 528 is set to be λ1 under the control of the wavelength control unit in the control section 501, the buffer control unit in the control section 501 outputs an offset value A1 corresponding to the memory region I to the reading address counter 1708 of the buffer I 520. Based on this offset value A1, the reading address counter 1708 generates addresses for reading out the packet D for count of the number of node devices written in the memory region I by sequentially incrementing a counter, and outputs the addresses to the dual port memory 1709. The packet D for count of the number of node devices is read out from the output port of the dual port memory 1709 in accordance with the reading addresses, and is output to the variable wavelength transmission unit I 528. Since the transmission wavelength of the variable wavelength transmission unit I 528 is set to be λ1, the packet D for count of the number of node devices is output from the variable wavelength transmission unit I 528 to the wavelength multiplexer 536 as an optical signal of the wavelength λ1. The wavelength multiplexer 536 multiplexes the packet D with optical signals of different wavelengths output from other variable wavelength transmission units II 529 to VIII 535, and outputs the multiplexed signal onto the optical fiber 502. The optical signal is transmitted to the neighboring node device II 602 at the downstream side.

The packet D for count of the number of node devices transmitted to the node device II 602 as the optical signal of the wavelength λ1 is received by the fixed wavelength reception unit I 504 of the node device II 602, and is output to the separation-insertion unit I 512. The latch 1602 of the separation-insertion unit I 512 stores the value in the section 2501 for indication of the number of relayings of the packet D for count of the number of node devices output from the fixed wavelength reception unit I 504, and outputs the stored value to the comparator 1601. Since the value in the section 2501 for indication of the number of relayings of the packet D for count of the number of node devices output from the latch 1602 is "0", the comparator 1601 outputs a separation instruction to the demultiplexer 1604. Upon reception of the separation instruction from the comparator 1601, the demultiplexer 1604 outputs the input packet D for count of the number of node devices to the I/F unit 1603. Thus, the packet D for count of the number of node devices is output to the I/F unit 1603, and is then output onto the sub transmission path I 537. Thereafter, the packet D is received by the terminal equipment I 545 as the destination. The value in the section 2503 for identification of the kind of packet of the header portion is read by the packet processing unit 902. Since the section 2503 for identification of the kind of packet stores the value indicating the packet for count of the number of node devices, this packet is abandoned without any processing.

After the packet D for count of the number of node devices is transmitted, the terminal equipment I 545 as the server connected to the node device I 601 forms a packet for count of the number of node devices in which "2" is set in the section 2501 for indication of the number of relayings and the section 2505 for the initial setting value in the section for indication of the number of relayings in the header portion, and the same values as in the packet D for count of the number of node devices are set in other sections, and transmits this packet.

This packet for count of the number of node devices is processed by the node device I 601 in the same manner as the packet D for count of the number of node devices, and the value in the section 2501 for indication of the number of relayings is decremented from "2" to "1". Then, the packet is output to the node device II 602. Since the value in the section 2501 for indication of the number of relayings is "1", the separation-insertion unit of the node device II 602 does not separate the packet but outputs it to the buffer, and the value in the section 2501 for indication of the number of relayings is decremented from "1" to "0". Thereafter, the packet is output from the variable wavelength transmission unit to the node device III 603. Since the value in the section 2501 for indication of the number of relayings is "0", the node device III 603 separates this packet and outputs the packet to the terminal I 545. Thereafter, the packet is abandoned in the packet processing unit 902 in the same manner as described above.

Subsequently, the terminal equipment I 545 as the server connected to the node device I 601 forms a packet for count of the number of node devices in which "3" is set in the section 2501 for indication of the number of relayings and the section 2505 for the initial setting value in the section for indication of the number of relayings in the header portion, and transmits this packet. This packet for count of the number of node devices is similarly relayed by the node devices II 602 and III 603, is received by the terminal equipment I 545 connected to the node device IV 604, and thereafter, is abandoned by the packet processing unit 902 in the same manner as described above.

Furthermore, the terminal equipment I 545 as the server connected to the node device I 601 forms a packet for count of the number of node devices in which "4" is set in the section 2501 for indication of the number of relayings and the section 2505 for the initial setting value in the section for indication of the number of relayings in the header portion, and transmits this packet.

This packet for count of the number of node devices is similarly relayed by the node devices II 602, III 603, and IV 604, and is received by the terminal equipment I 545 connected to the node device I 601. The terminal equipment I 545 connected to the node device I 601 is the server that transmitted the packet for count of the number of node devices. The packet processing unit 902 of the server reads the value in the section 2503 for identification of the kind of packet. Since the section 2503 for identification of the kind of packet stores the value indicating the packet for count of the number of node devices, the packet processing unit 902 reads the value "4" stored in the section 2505 for the initial setting value 2505 for the section of indication of the number of relayings, and stores the read value as the number of node devices connected to the network system. After reception of the packet for count of the number of node devices, the server ends transmission of the packet for count of the number of node devices.

In this embodiment, the node device to which the terminal equipment for transmitting a packet is connected is considered as the first relaying node device, and the node device which is the destination node device of the packet, finally receives the packet, and outputs it to the terminal equipment side is not considered as a relaying node device. However, the last node device may also be considered as a relaying node device, and the number of relayings of a packet and a value used for determining whether each node device outputs a packet to the next node device or the terminal equipment side (in this embodiment, when the value in the section for indication of the number of relayings is "0", a packet is output to the terminal equipment) can be set. For example, assuming that the destination node device also decrements the value in the section for indication of the number of relayings (for example, when a node device in which an insertion means is arranged at the upstream side of a down counter and a separation means is arranged at the downstream side of the down counter is used), the server which performs the above-mentioned operation receives the packet for count of the number of node devices which has passed twice the node device to which the own terminal equipment is connected (when the packet is transmitted and when it is received; the value in the section for indication of the number of relayings is decremented twice by the node device to which the own terminal equipment is connected). In this case, a value obtained by subtracting "1" from the value in the section for the initial setting value of the received packet for count of the number of node devices indicates the number of node devices connected to the network.

Subsequently, the server transmits a packet for notification of the number of nodes for notifying all the terminal equipments of the network system of the number of node devices connected to the network system. In this process, the terminal equipment I 545 as the server connected to the node device I 601 forms and transmits eight packets for notification of the number of nodes in which a predetermined value is set in the sections 2503 for identification of the kind of packet, "1" is set in the sections 2501 for indication of the number of relayings of the header portion, and "1" to "8" are respectively set in the sections for designation of the wavelength in use. At this time, the value in the section 2501 for indication of the number of relayings is written in the section 2505 for the initial setting value in the section for indication of the number of relayings, a value "1" indicating $\lambda 1$ as the reception wavelength of the fixed wavelength reception unit I 504 that outputs a packet to the separation-insertion unit I 512 to which the terminal equipment I 545 is connected via the sub transmission path 537 is set in the section 2601 for the reception wavelength of the server, and a value "11" as the identification number of the terminal equipment I 545 is stored in the section 2602 for identification of the server. In addition, the value "4" calculated in the above-mentioned process is used in the section 2603 for the number of all relaying node devices. These eight packets for notification of the number of nodes are processed in the same manner as the above-mentioned packet D for count of the number of node devices, and are output to the buffer I 520. In the buffer I 520, the value "1" in the section 2501 for indication of the number of relayings of each packet is decremented to "0" by the down counter 1704, and the eight packets are written in the memory regions I to VIII in accordance with the values in the sections 2502 for designation of the wavelength in use of their header portions. In this manner, after the eight packets for notification of the number of node devices are written in the memory regions I to VIII, the eight packets are transmitted from the variable wavelength transmission units I 528 to the neighboring node device II 602 at the downstream side using predetermined wavelengths set in their sections 2502 for designation of the wavelength in use under the control of the wavelength control unit and the buffer control unit in the control section 501.

The eight packets for notification of the number of node devices transmitted to the node device II 602 are respectively received by the fixed wavelength reception units I 504 to VIII 511 of the node device II 602 in accordance with the wavelengths indicated by the values set in their sections 2502 for designation of the wavelength in use, are separated by the separation-insertion units I 512 to VIII 519 in the same manner as the packet D for count of the number of node devices, and are then output to the terminal equipments I 545 to VIII 552 via the sub transmission paths.

The terminal equipments I 545 to VIII 552 connected to the node device II 602 store a value "1" in the section 2505 for the initial setting value in the section for indication of the number of relayings, a value "1" in the section 2601 for the reception wavelength of the server, a value "11" in the section for identification of the server, and a value "4" in the section 2603 for the number of all relaying node devices of each received packet for notification of the number of node devices.

Subsequently, the terminal equipment I 545 as the server similarly forms and transmits eight packets for notification of the number of node devices in which "2" is set in the sections 2501 for indication of the number of relayings and the sections 2505 for the initial setting value in the section for indication of the number of relayings of the header portion. These eight packets for notification of the number of node devices are processed by the node device I 601 in the same manner as described above, and the value in the section 2501 for indication of the number of relayings of each packet is decremented from "2" to "1". Thereafter, the packets are output to the node device II 602. Since the value in the section 2501 for indication of the number of relayings of each packet is "1", the separation-insertion units of the node device II 602 do not separate these eight packets but output them to the buffers. Thereafter, the value in the section 2501 for indication of the number of relayings of each packet is decremented from "1" to "0", and the packets are output from the variable wavelength transmission units to the node device III 603. Since the value in the section 2501 for indication of the number of relayings of each packet is "0", the node device III 603 separates these packets and supplies them to the terminal equipments I 545 to VIII 552. The packet processing units 902 of these terminal equipments similarly store a value "2" in the section 2505 for the initial setting value in the section for indication of the number of relayings, a value "1" in the section 2601 for the reception wavelength of the server, a value "11" in the section for identification of the server, and a value "4" in the section 2603 for the number of all relaying node devices of each packet for notification of the number of node devices.

Subsequently, the terminal equipment I 545 as the server similarly forms and transmits eight packets for notification of the number of node devices in which "3" is set in the sections 2501 for indication of the number of relayings and the sections 2505 for the initial setting value in the section for indication of the number of relayings of the header portion. These eight packets for notification of the number of node devices are similarly relayed by the node devices II 602 and III 603, and are received by the eight terminal equipments 545 to 552 connected to the node device IV 604. Then, the packet processing units 902 of these terminal equipments store a value "3" in the section 2505 for the initial setting value in the section for indication of the number of relayings, a value "1" in the section 2601 for the reception wavelength of the server, a value "11" in the section for identification of the server, and a value "4" in the section 2603 for the number of all relaying node devices of each packet for notification of the number of node devices.

Furthermore, the terminal equipment I 545 as the server similarly forms and transmits eight packets for notification of the number of node devices in which "4" is set in the sections 2501 for indication of the number of relayings and the sections 2505 for the initial setting value in the section for indication of the number of relayings of the header portion.

These eight packets for notification of the number of node devices are similarly relayed by the node devices II 602, III 603, and IV 604, and are received by the eight terminal equipments 545 to 552 connected to the node device I 601. At this time, the packet processing units 902 of the terminal equipments II 546 to VIII 552 connected to the node device I 601 similarly store a value "4" in the section 2505 for the initial setting value in the section for indication of the number of relayings, a value "1" in the section 2601 for the reception wavelength of the server, a value "11" in the section for identification of the server, and a value "4" in the section 2603 for the number of all relaying node devices of each packet for notification of the number of node devices.

On the other hand, the terminal equipment I 545 connected to the node device I 601 is the terminal equipment that transmitted the packet for notification of the number of node devices. Since this packet for notification of the number of node devices was relayed by all the node devices of the network system and returned to the own terminal equipment after traveling through the network once, the terminal equipment I 545 ends the transmission of the packets for notification of the number of node devices upon reception of the packet for notification of the number of node devices.

Figure 30:
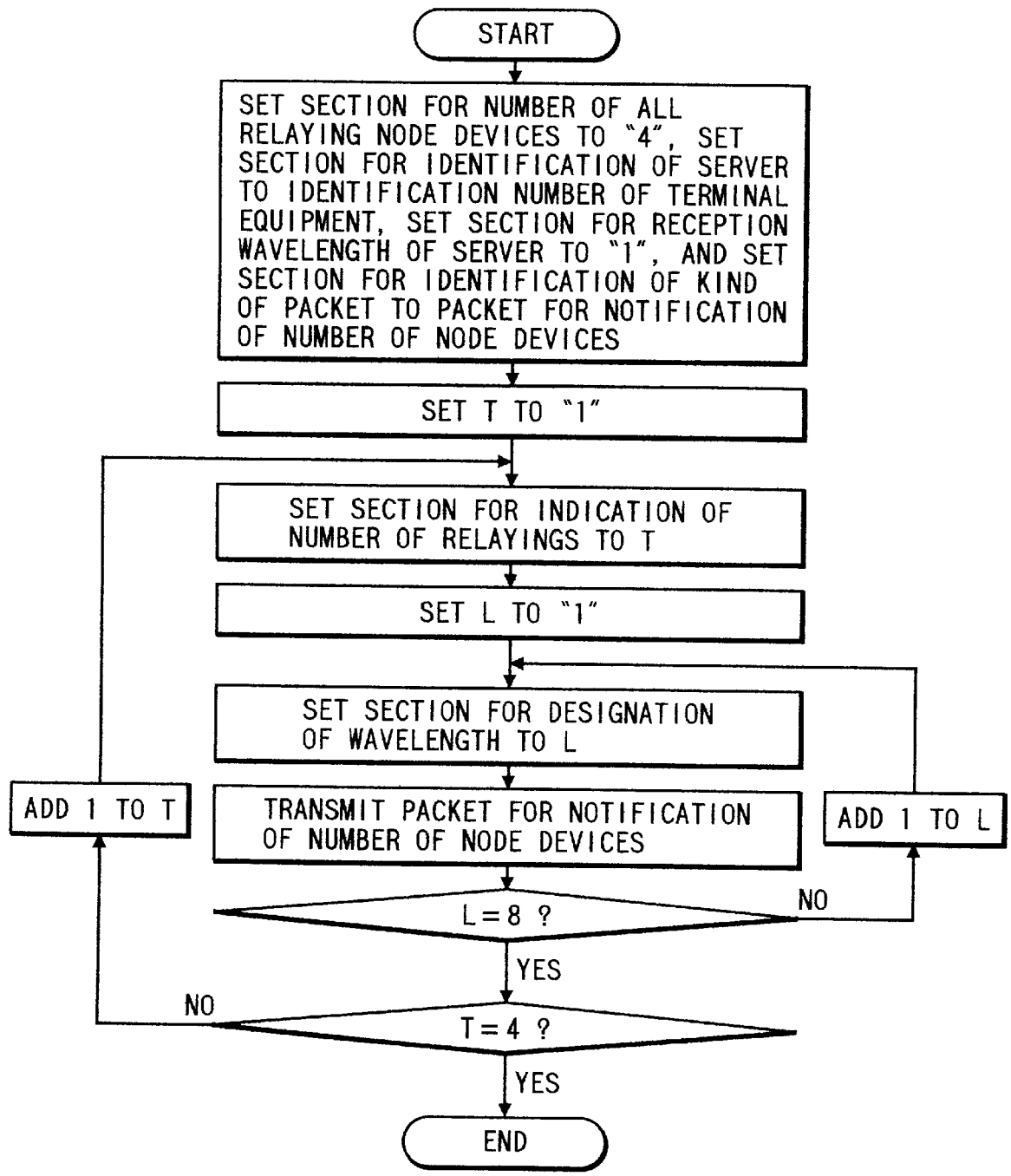
FIG. 30 is a flow chart showing the operation of the server in the second process according to the seventh embodiment of the present invention.

FIG. 29 is a flow chart showing the transmission operation of the packet for notification of the number of node devices. At this time, since the terminal equipment which transmits the packet for notification of the number of node devices recognizes the number of all the node devices of the network, the terminal equipment as the server may end the transmission of the packet for notification of the number of node devices after it transmits packets for notification of the number of node devices to the respective node devices using their reception wavelengths. FIG. 30 is a flow chart showing this operation.

A terminal equipment, which received the packet for notification of the number of node devices, sends back a packet for report of the connection form to the terminal equipment which generates the terminal equipment connection table. Each terminal equipment sets a predetermined value indicating the packet for report of the connection form in the section 2503 for identification of the kind of packet, and writes, in the section 2501 for indication of the number of relayings of the header portion, a value obtained by subtracting the value in the section 2505 for the initial setting value in the section for indication of the number of relayings from the value "4" in the section for the number of all relaying node devices stored upon reception of the packet for notification of the number of node devices. In this case, if this subtraction yields "0", "4" is set instead. In the terminal equipments connected to the node device II 602, this value becomes "3" since the value in the section 2505 for the initial setting value in the section for indication of the number of relayings is "1", as described above. On the other hand, in the terminal equipments connected to the node device III 603, this value becomes "2". Also, in the terminal equipments connected to the node device IV 604, this value becomes "1". Furthermore, in the terminal equipments connected to the node device I 601, this value becomes "4". In this manner, the section for indication of the number of relayings of each packet stores information indicating the number of relayings until the packet reaches the server.

The section 2502 for designation of the wavelength in use stores the value in the section 2601 for the reception wavelength of the server stored upon reception of the packet for notification of the number of node devices. The section 2505 for the initial setting value in the section for indication of the number of relayings stores the same value as that in the section 2501 for indication of the number of relayings. On the other hand, the section 2701 for the reception wavelength of the terminal equipment stores the value indicating the reception wavelength of the fixed wavelength reception unit that outputs a packet to the separation-insertion unit to which the own terminal equipment is connected via the sub transmission path. Furthermore, the section 2702 for identification of the terminal equipment stores the identification number of the own terminal equipment. The packet for report of the connection form which is generated in this manner is transmitted from each terminal equipment and is received by the terminal equipment I 545 as the server.

Upon reception of the packets for report of the connection form, the terminal equipment I 545 as the server generates a terminal equipment connection table including the terminal equipment identification numbers as the values in the sections 2702 for identification of the terminal equipment, the values (the numbers of relayings) to be written in the sections 2501 for indication of the number of relayings upon transmission of packets to the respective terminal equipments, and the values (reception wavelengths) to be written in the section 2502 for indication of the wavelength in use. At this time, as the terminal equipment identification numbers, the values in the sections 2702 for identification of the terminal equipment of the received packets for report of the connection form are used. Also, as the number of relayings, a value obtained by subtracting the value in the section 2505 for the initial setting value in the section for indication of the number of relayings of each received packet for report of the connection form from the value "4" in the section for the number of all relaying node devices is written. In this case, if this subtraction yields "0", "4" is written instead. On the other hand, as the reception wavelengths, the values in the sections 2701 for the reception wavelength of the terminal equipment of the received packets for report of the connection form are written. In this manner, the server generates a terminal equipment connection table shown in Table 4 below.

TABLE 4

| Terminal Equipment Identification Number | Number of Relayings | Reception Wavelength |
|---|---|---|
| 11 | — | — |
| 12 | 4 | 2 |
| 13 | 4 | 3 |
| 14 | 4 | 4 |
| 15 | 4 | 5 |
| 16 | 4 | 6 |
| 17 | 4 | 7 |
| 18 | 4 | 8 |
| 21 | 1 | 1 |
| 22 | 1 | 2 |
| 23 | 1 | 3 |
| 24 | 1 | 4 |
| 25 | 1 | 5 |
| 26 | 1 | 6 |
| 27 | 1 | 7 |
| 28 | 1 | 8 |
| 31 | 2 | 1 |

TABLE 4-continued

| Terminal Equipment Identification Number | Number of Relayings | Reception Wavelength |
|---|---|---|
| 32 | 2 | 2 |
| 33 | 2 | 3 |
| 34 | 2 | 4 |
| 35 | 2 | 5 |
| 36 | 2 | 6 |
| 37 | 2 | 7 |
| 38 | 2 | 8 |
| 41 | 3 | 1 |
| 42 | 3 | 2 |
| 43 | 3 | 3 |
| 44 | 3 | 4 |
| 45 | 3 | 5 |
| 46 | 3 | 6 |
| 47 | 3 | 7 |
| 48 | 3 | 8 |

The server which generated the terminal equipment connection table transmits the generated terminal equipment connection table to the respective terminal equipments as in the packets for notification of the number of node devices. Upon reception of the terminal equipment connection table, each terminal equipment generates a terminal equipment connection table which can be used by itself on the basis of the received terminal equipment connection table. As another method, since the terminal equipment which generated the terminal equipment connection table first already recognizes the connection forms of the respective terminal equipments, it may modify its terminal equipment connection table in correspondence with the respective terminal equipments and may transmit the modified terminal equipment connection tables to the respective terminal equipments.

On the other hand, a section for storing a copy of the value in the section for designation of the wavelength in use may be assigned to the data portion of the packet for notification of the number of node devices. With this format, even when the terminal equipment itself does not recognize its own reception wavelength, it can detect the reception wavelength based on the value in the section for storing a copy of the value in the section for designation of the wavelength in use of the received packet for notification of the number of node devices.

(Eighth Embodiment)

Figure 31:
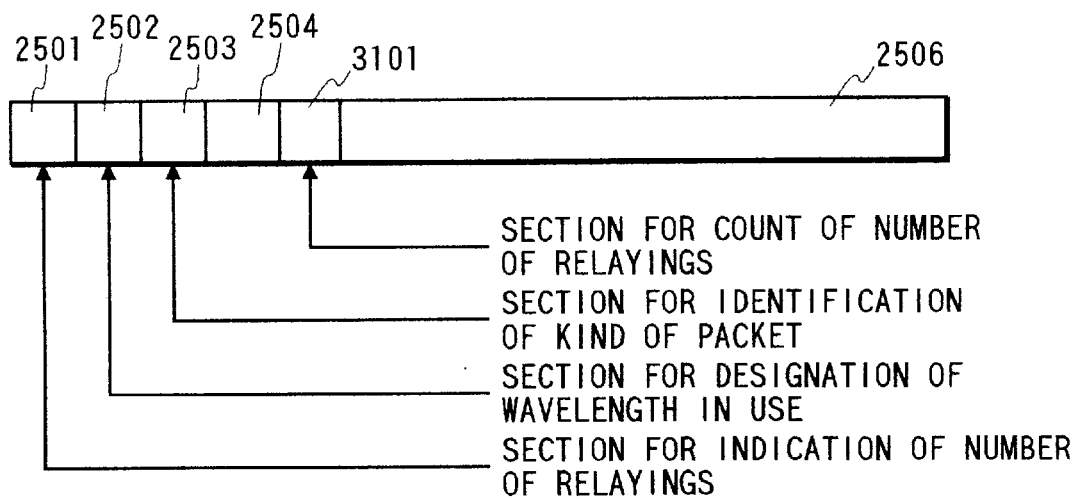
FIG. 31 is a view showing the format of a packet for count of the number of node devices according to the eighth embodiment of the present invention.

FIG. 31 shows the format of a packet for count of the number of node devices according to the eighth embodiment of the present invention, which packet is suitably used in a terminal equipment connection table generation method in the above-mentioned multihop system.

Referring to FIG. 31, sections 2501, 2502, 2503, and 2506 are the same as those in the seventh embodiment. A section 3101 for count of the number of relayings is used for counting the number of relayings. Each node device which relays and transmits the packet for count of the number of node devices increments the value in this section 3101 by "1" to generate a new packet for count of the number of node devices, and relays the packet.

Figure 32:
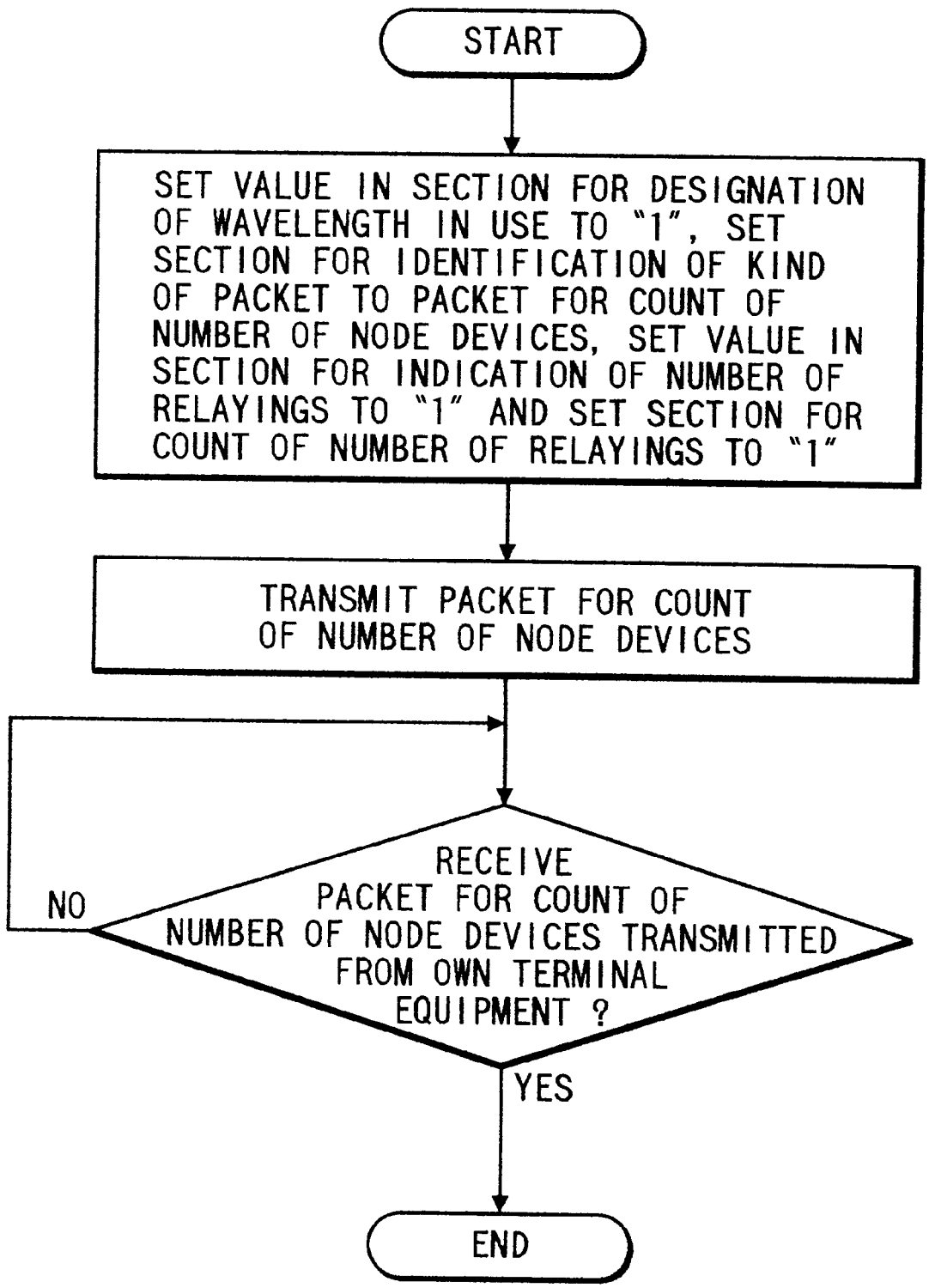
FIG. 32 is a flow chart showing the operation of a server in the first process according to the eighth embodiment of the present invention.

FIG. 32 is a flow chart showing the operation of the terminal equipment as the source of the packet for count of the number of node devices in the eighth embodiment of the present invention.

Figure 33:
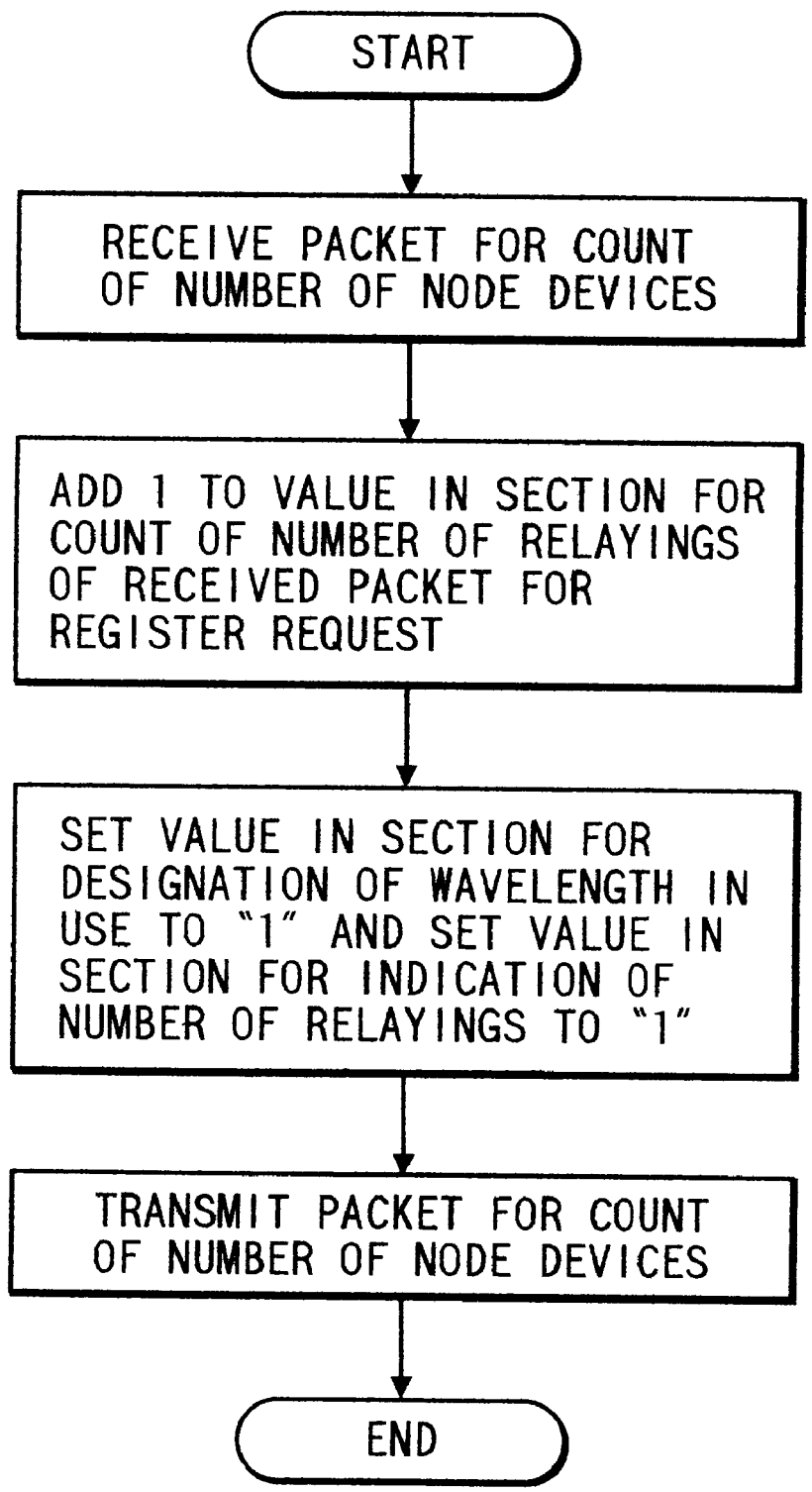
FIG. 33 is a flow chart showing the operation of a terminal equipment in the first process according to the eighth embodiment of the present invention.

FIG. 33 is a flow chart showing the operation of the terminal equipment which receives the packet for count of the number of node devices in the eighth embodiment of the present invention.

In this embodiment, the terminal equipment as the source of the packet for count of the number of node devices sets "1" in the section for indication of the number of relayings and "1" in the section for designation of the wavelength in use, and transmits the packet for count of the number of node devices to only a specific terminal equipment connected to the neighboring node device at the downstream side.

The terminal equipment which received this packet for count of the number of relayings re-sets the value in the section 3101 for count of the number of relayings in the received packet for count of the number of node devices by incrementing the value by "1", and similarly transmits this packet for count of the number of node devices to only a specific terminal equipment connected to the neighboring node device at the downstream side. In this manner, the packet for count of the number of node devices is transmitted in turn to terminal equipments having the same reception wavelength as the transmission wavelength of the terminal equipment as the source of the packet for count of the number of node devices and connected to the neighboring node devices at the downstream side. When the terminal equipment as the source of the packet for count of the number of node devices receives the packet for count of the number of node devices, the transmission process of the packet for count of the number of node devices ends. The source of the packet for count of the number of node devices can detect the number of all the node devices on the basis of the value set in the section for count of the number of relayings. Thereafter, the subsequent process is executed as in the seventh embodiment.

In this embodiment, since the number of packets for count of the number of node devices transmitted from the terminal equipment as the source of the packet for count of the number of node devices becomes small and the packet for count of the number of node devices is transmitted from a plurality of terminal equipments, the load upon transmission of the packet for count of the number of node devices can be reduced.

As described above, the present invention reveals the method of checking the form of the network by the terminal equipment. In the terminal equipment connection table generation method according to the present invention, for example, the terminal equipment connection table can be generated by acquiring terminal equipment connection information via communications of the network system without looking up the terminal equipment connection table. For this reason, even when none of the terminal equipments have a terminal equipment connection table (for example, when a new network system is constituted or when the arrangement of the network system is changed), the terminal equipment connection tables of all the terminal equipments connected to the network system need not be manually created or updated using input/output units, thus easily and accurately generating terminal equipment connection tables.

Furthermore, when the network system has a large scale and a large number of terminal equipments are connected over a broad area, terminal equipment connection tables can be easily and accurately generated.

(Ninth Embodiment)

Figure 34:
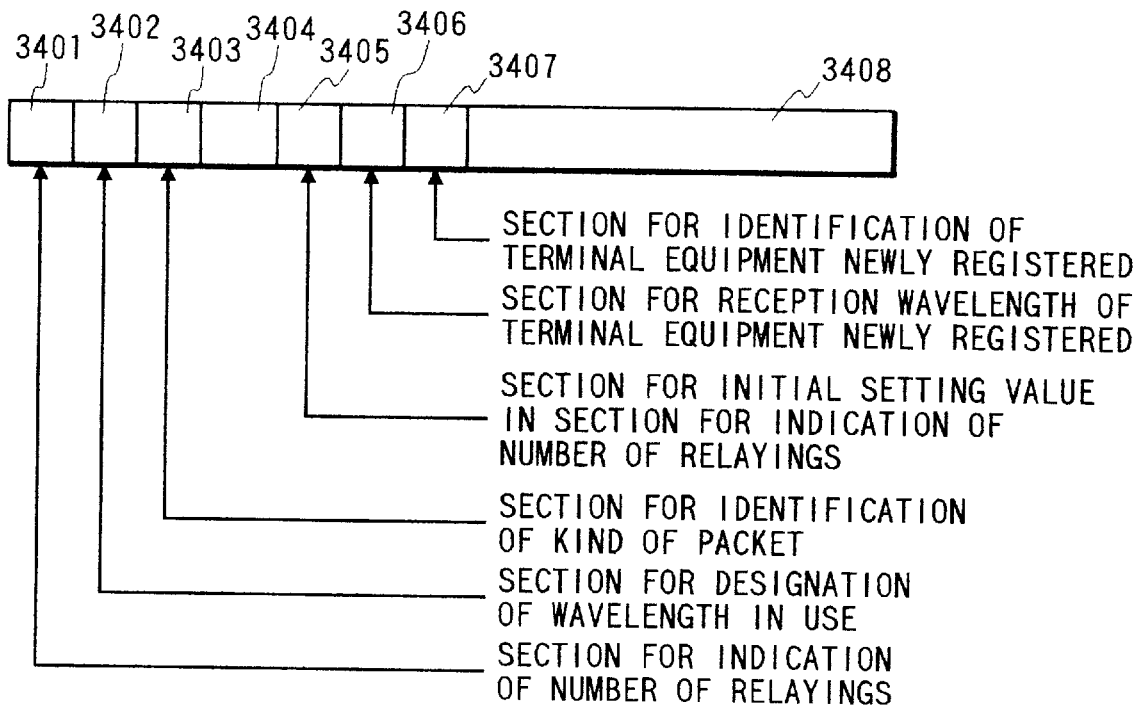
FIG. 34 is a view showing the format of a packet for register request according to the ninth embodiment of the present invention.

FIG. 34 shows the format of a packet for register request according to the ninth embodiment of the present invention, which packet is suitably used in the above-mentioned multihop system. When a new terminal equipment is connected to the network system or the connection condition of the terminal equipment is changed, the packet for register request is transmitted from the terminal equipment to the existing terminal equipments, and the terminal equipments that received this packet register new data in their terminal equipment connection tables.

Referring to FIG. 34, a section 3401 for indication of the number of relayings indicates the number of relayings required for transmitting a packet from the source node device to the destination node device. Each node device can detect based on the value in the section 3401 for indication of the number of relayings whether or not the neighboring node device at the downstream side in the transmission direction is the destination node device. Furthermore, each node device can detect whether or not a terminal equipment connected to the own node device is the destination by checking if this value is "0". A section 3402 for designation of the wavelength in use designates the wavelength to be used in the relaying transmission operation. As the value used in the section 3402 for designation of the wavelength in use of this header portion, "1" to "8" are assigned in correspondence with transmission wavelengths $\lambda 1$ to $\lambda 8$, as shown in Table 2 above. A section 3403 for identification of the kind of packet indicates the kind of packet. In this case, a value indicating the packet for register request is set in the section 3403. The header portion includes a remaining header portion 3404. The section 3401 for indication of the number of relayings, the section 3402 for designation of the wavelength in use, the section 3403 for identification of the kind of packet, and the remaining header portion 3404 constitute the header portion.

A section 3405 for the initial setting value in the section for indication of the number of relayings stores a value set in the section 3401 for indication of the number of relayings by the terminal equipment as the source of the packet for register request. A section 3406 for the reception wavelength of the terminal equipment newly registered stores one of values indicating the wavelengths (to be simply referred to as reception wavelengths hereinafter) received by the fixed wavelength reception units 504 to 511, which output packets to the separation-insertion units 512 to 519 to one of which the terminal equipment as the source of the packet for register request is connected via one of the sub transmission paths 537 to 544. A section 3407 for identification of the terminal equipment newly registered stores a value indicating the terminal equipment identification number of the terminal equipment as the source of the packet for register request. The packet includes a remaining data portion 3408. The section 3405 for the initial setting value in the section for indication of the number of relayings, the section 3406 for the reception wavelength of the terminal equipment newly registered, the section 3407 for identification of the terminal equipment newly registered, and the remaining data portion 3408 constitute a data portion to be carried by this packet.

Figure 35:
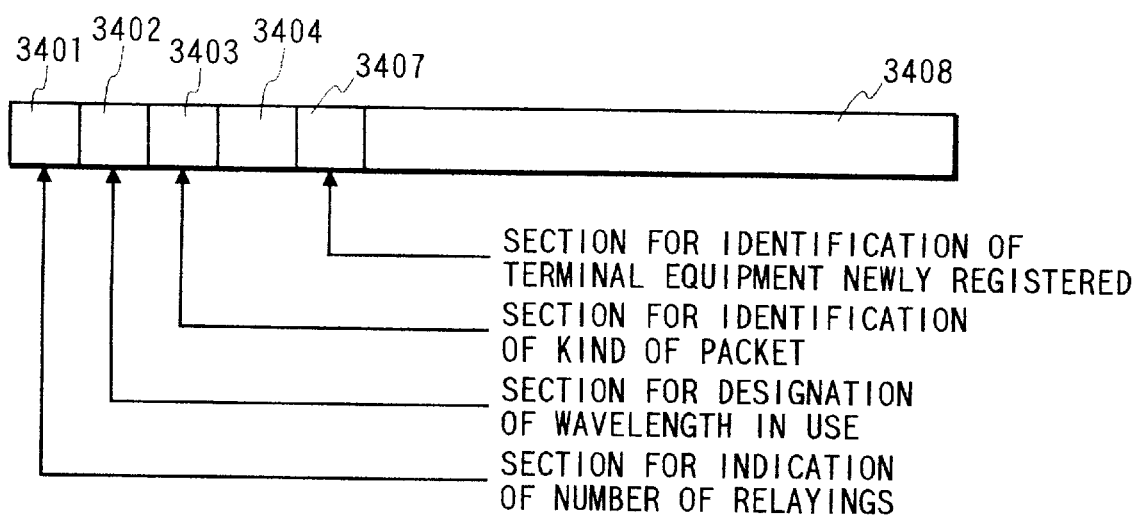
FIG. 35 is a view showing the format of a packet for transfer request according to the ninth embodiment of the present invention.

FIG. 35 shows the format of a packet for transfer request according to the present invention. In the packet for transfer request, a value indicating the packet for transfer request as the kind of packet is stored in a section for identification of the kind of packet. A data portion includes the section 3407 for identification of the terminal equipment newly registered.

Figure 36:
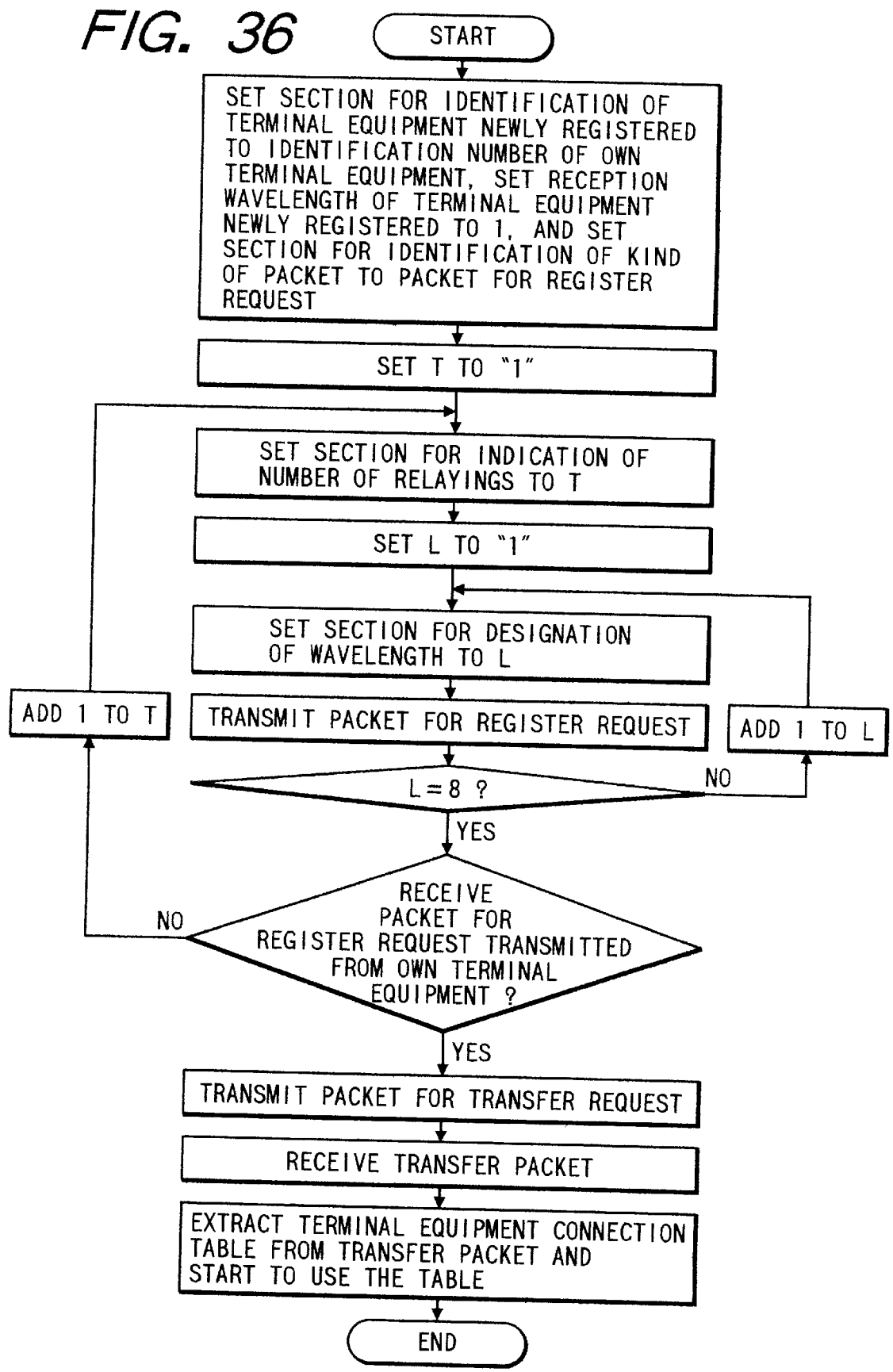
FIG. 36 is a flow chart showing the operation of a terminal equipment as a source of the packet for register request according to the ninth embodiment of the present invention.

FIG. 36 is a flow chart showing the operation of the terminal equipment as the source of the packet for register request of this embodiment.

Figure 37:
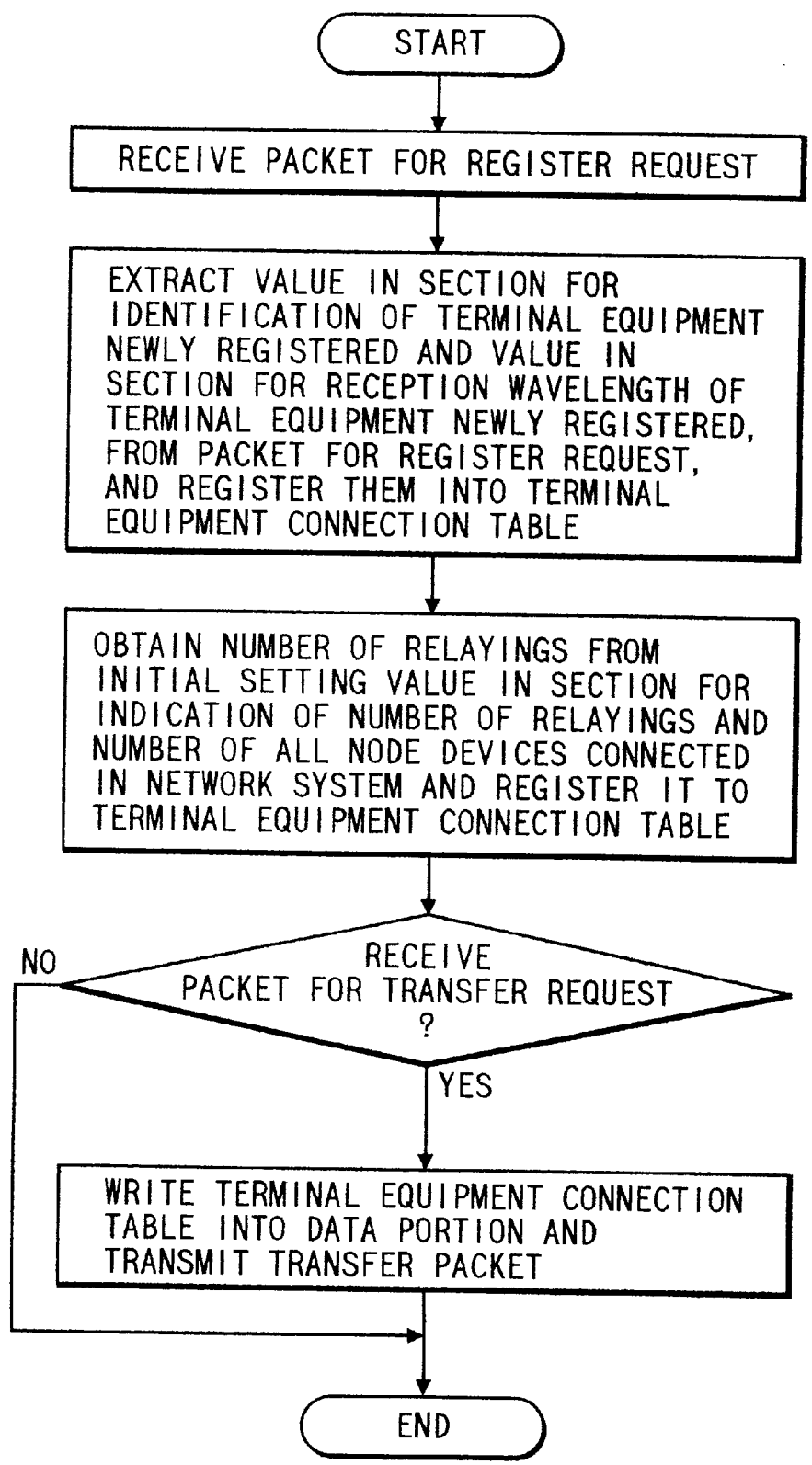
FIG. 37 is a flow chart showing the operation of a terminal equipment for receiving the packet for register request according to the ninth embodiment of the present invention.

FIG. 37 is a flow chart showing the operation of the terminal equipment which receives the packet for register request of this embodiment.

An embodiment of a terminal equipment registration method using the packet for register request and the packet for transfer request according to the present invention will be described below. In the following description, a case will be exemplified wherein the terminal equipment I 545 connected to the node device I 601 is newly connected to the network system in the arrangement of the network system shown in FIG. 6 using the arrangement of the node device shown in FIGS. 5A and 5B. Also, in the following description, the same constituting elements in different terminal equipments are denoted by the same reference numerals as in FIGS. 5A, 5B, 6, 9, 16, and 17, for the sake of convenience.

The terminal equipment I 545 as a terminal equipment to be newly registered connected to the node device I 601 forms a packet for register request in which "1" is set in the section 3401 for indication of the number of relayings and "1" is set in the section for designation of the wavelength in use of the header portion, and transmits this packet to the separation-insertion unit I 512 of the node device I 601 via the sub transmission path I 537. At this time, the section 3405 for the initial setting value in the section for indication of the number of relayings of the packet for register request stores a value "1", the section 3406 for the reception wavelength of the terminal equipment newly registered stores a value "1" indicating λ1 as the reception wavelength of the fixed wavelength reception unit I 504 that outputs a packet to the separation-insertion unit I 512 to which the terminal equipment I 545 is connected via the sub transmission path I 537, and the section 3407 for identification of the terminal equipment newly registered stores a value indicating the identification number of the terminal equipment I 545. In the following description, this packet will be referred to as a packet E.

The I/F unit 1603 of the separation-insertion unit I 512 of the node device I 601 writes the packet E for register request transmitted via the sub transmission path I 537 in the FIFO I 1606. Upon completion of the writing operation of the packet E for register request in the FIFO I 1606, the insertion control unit 1605 detects a division of a packet flow which is being read out from the FIFO II 1607, switches the input source of the selector 1608 to the FIFO I 1606, stops the reading operation of the FIFO II 1607, and starts a reading operation of the FIFO I 1606. Thereafter, upon completion of the reading operation of the packet E for register request written in the FIFO I 1606, the insertion control unit 1605 switches the input source of the selector 1608 to the FIFO II 1607 again, stops the reading operation of the FIFO I 1606, and restarts a reading operation of the FIFO II 1607. The packet E for register request output from the selector 1608 is input to the buffer I 520.

The demultiplexer 1701 of the buffer I 520 outputs the value in the section 3402 for designation of the wavelength in use of the header portion of the packet E for register request to the latch I 1702, the value in the section 3401 for indication of the number of relayings to the latch II 1703, and the data portion to the shift register 1705. The latch I 1701 stores the value in the section for designation of the wavelength in use of the head portion of the packet E for register request, and outputs the stored value to the writing address counter 1706 and the selector 1707. The latch II 1703 stores the value in the section 3401 for indication of the number of relayings of the header portion of the packet E for register request, and outputs the stored value to the down counter 1704. The value "1" in the section 3401 for indication of the number of relayings of the header portion of the packet E for register request output from the latch II 1703 is decremented to "0" by the down counter 1704, and the decremented value is output to the selector 1707. The shift register 1705 delays the data portion of the packet E for register request output from the demultiplexer 1701 by a required period of time, and outputs the delayed data portion to the selector 1707. The selector 1707 re-constructs the packet E for register request with the decremented value in the section 3401 for indication of the number of relayings by sequentially selecting the value in the section 3402 for designation of the wavelength in use of the header portion of the packet E for register request output from the latch I 1702, the decremented value in the section 3401 for indication of the number of relayings output from the down counter 1704, and the delayed data portion of the packet E for register request output from the shift register 1705. The selector 1707 outputs the re-constructed packet to the dual port memory 1709. On the other hand, the writing address counter 1706 sets the writing start address of the dual port memory 1709 in which the packet E for register request is to be written in accordance with the value "1" in the section 3402 for designation of the wavelength in use of the packet E for register request output from the latch I 1702, and sequentially outputs writing address signals to the dual port memory 1709. The input port of the dual port memory 1709 receives the re-constructed packet E for register request via the selector 1707, and the packet E is sequentially written in the memory region I in accordance with the addresses output from the writing address counter 1706.

After the packet E for register request is written in the memory region I, when the transmission wavelength of the variable wavelength transmission unit I 528 is set to be λ1 under the control of the wavelength control unit in the control section 501, the buffer control unit in the control section 501 outputs an offset value A1 corresponding to the memory region I to the reading address counter 1708 of the buffer I 520. Based on the offset value A1, the reading address counter 1708 generates addresses for reading out the packet E for register request written in the memory region I by incrementing a counter, and outputs the addresses to the dual port memory 1709. The packet E for register request is read out from the output port of the dual port memory 1709 in accordance with the reading addresses, and is output to the variable wavelength transmission unit I 528. Since the transmission wavelength of the variable wavelength transmission unit I 528 is set to be λ1, the packet E for register request is output from the variable wavelength transmission unit I 528 to the wavelength multiplexer 536 as an optical signal of the wavelength λ1, and is multiplexed by the wavelength multiplexer 536 with optical signals of different wavelengths output from other variable wavelength transmission units II 529 to VIII 535. The multiplexed signal is output onto the optical fiber 502, and is transmitted to the neighboring node device II 602 at the downstream side.

The packet E for register request transmitted to the node device II 602 as the optical signal of the wavelength λ1 is received by the fixed wavelength reception unit I 504 of the node device II 602, and is output to the separation-insertion unit I 512. The latch 1602 of the separation-insertion unit I 512 stores the value in the section 3401 for indication of the number of relayings of the packet E for register request output from the fixed wavelength reception unit I 504, and outputs the stored value to the comparator 1601. Since the value in the section 3401 for indication of the number of relayings of the packet E for register request output from the latch 1602 is "0", the comparator 1601 outputs a separation instruction to the demultiplexer 1604. Upon reception of the separation instruction from the comparator 1601, the demultiplexer 1604 outputs the input packet E for register request to the I/F unit 1603. Thus, the packet E for register request is output to the I/F unit 1603 and is transmitted via the sub transmission path I 537. Thereafter, the packet E is received by the terminal equipment I 545 as the destination, and the packet processing unit 902 reads the value in the section 3403 for identification of the kind of packet of the header portion. Since this section stores a value indicating the packet for register request, the packet processing unit 902 newly registers information of the terminal equipment I 545 connected to the node device I 601 in the terminal equipment connection table 903 using the value in the section 3405 for the initial setting value in the section for indication of the number of relayings, the value in the section 3406 for the reception wavelength of the terminal equipment newly registered, and the value in the section 3407 for identification of the terminal equipment newly registered in the data portion of this packet. At this time, as the value of the number of relayings in Table 2 above, a value "3" obtained by subtracting the value "1" in the section 3405 for the initial setting value in the section for indication of the number of relayings from the value "4" indicating the number of node devices connected to the network system is set.

In this manner, the terminal equipment I 545 connected to the node device I 601 as the source of the packet for register request is registered in the terminal equipment connection table 903 of the terminal equipment I 545 connected to the node device II 602.

After the first packet E for register request is transmitted, the terminal equipment I as a terminal equipment to be newly registered connected to the node device I 601 forms seven packets for register request in which "1" is set in the sections 3401 for indication of the number of relayings and "2" to "8" are respectively set in the sections 3402 for designation of the wavelength in use, and transmits these packets to the separation-insertion unit I 512 of the node device I 601 via the sub transmission path I 537 in the same manner as the above-mentioned packet E for register request. At this time, the values in the sections 3405 for the initial setting value in the section for indication of the number of relayings, the sections 3406 for the reception wavelength of the terminal equipment newly registered, and the section 3407 for identification of the terminal equipment newly registered of the seven packets for register request are the same as those in the packet E for register request. These seven packets for register request are processed in the same manner as the packet E for register request, and are output from the separation-insertion unit I 512 to the buffer I 520. In the buffer I 520, the value "1" in the section 3401 for indication of the number of relayings of each packet is decremented to "0" by the down counter 1704, and thereafter, the seven packets for register request are written in the memory regions II to VIII in accordance with the values in the sections 3402 for designation of the wavelength in use of their header portions. After the seven packets for register request are written in the memory regions II to VIII in this manner, these packets are transmitted from the variable wavelength transmission unit I 528 to the neighboring node device II 602 at the downstream side using predetermined wavelengths set by the values in their sections 3402 for designation of the wavelength in use under the control of the wavelength control unit and the buffer control unit in the control section 501.

The seven packets for register request transmitted to the node device II 602 are respectively received by the fixed wavelength reception units II 505 to VIII 5111 in accordance with the wavelengths set by the values in their sections 3402 for designation of the wavelength in use, and are separated by the separation-insertion units II 513 to VIII 519 in the same manner as the first packet E for register request. Then, the packets are output to the terminal equipments II 546 to VIII 552 via the sub transmission paths. In each of the terminal equipments II 546 to VIII 552, the terminal equipment I connected to the node device I 601 is newly registered in the terminal equipment connection table 903 as in the packet E for register request.

In this manner, the terminal equipment I 545 as the source of the packet for register request connected to the node device I 601 is registered in the terminal equipment connection tables 903 in the terminal equipments I 545 to VIII 552 connected to the node device II 602.

Subsequently, the terminal equipment I 545 as a terminal equipment to be newly registered connected to the node device I 601 forms and transmits eight packets for register request in which "2" is set in the section 3401 for indication of the number of relayings of the header portion, and "1" to "8" are set in the sections 3402 for designation of the wavelength in use. At this time, the values in the section 3405 for the initial setting value in the section for indication of the number of relayings, the section 3406 for the reception wavelength of the terminal equipment newly registered, and the section 3407 for identification of the terminal equipment newly registered of each of the eight packets for register request are the same as those in the packet E for register request. These eight packets for register request are processed by the node device I 601 in the same manner as the above-mentioned packet E for register request, and the value in the section 3401 for indication of the number of relayings of each packet is decremented from "2" to "1". Thereafter, the eight packets are output to the node device II 602. In this embodiment, since each node device can output packets using desired wavelengths independently of their reception wavelengths, the wavelengths need not be designated when the packets are output from the node device I 601 to the node device II 602. Since the value in the section 3401 for indication of the number of relayings of each packet is "1", the separation-insertion units 512 to 519 of the node device II 602 do not separate the packets but output them to the buffers 520 to 527. After the value in the section 3401 for indication of the number of relayings of each packet is decremented from "1" to "0", the packets are output from any one of the variable wavelength transmission units 528 to 535 to the node device III 603. In the node device III 603, since the value in the section 3401 for indication of the number of relayings of each packet is "0", the packets are separated and are transmitted to the terminal equipments I 545 to VIII 552 to be subjected to the same new registration processing as described above. In this manner, the terminal equipment I as the source of the packet for register request connected to the node device I 601 is registered in the terminal equipment connection tables 903 in the terminal equipments I 545 to VIII 552 connected to the node device III 603.

Subsequently, the terminal equipment I 545 as a terminal equipment to be newly registered connected to the node device I 601 forms and transmits eight packets for register request by setting "3" in the sections 3401 for indication of the number of relayings of the header portions.

These eight packets for register request are similarly relayed by the node devices II 602 and III 603, and are received by the eight terminal equipments 545 to VIII 552 connected to the node device IV 604. In this manner, the terminal equipment I 545 as the source of the packet for register request connected to the node device I 601 is registered in the terminal equipment connection tables 903 in the terminal equipments I 545 to VIII 552 connected to the node device IV 604.

Furthermore, the terminal equipment I 545 as a terminal equipment to be newly registered connected to the node device I 601 forms and transmits eight packets for register request by setting "4" in the sections 3401 for indication of the number of relayings of the header portions.

These eight packets for register request are similarly relayed by the node devices II 602, III 603, and IV 604, and are received by the terminal equipments I 545 to VIII 552 connected to the node device I 601. At this time, in the terminal equipments II 546 to VIII 552 connected to the node device I 601, the terminal equipment I 545 is registered in the terminal equipment connection tables 903. In this case, the value of the number of relayings is set to be "4" corresponding to the number of node devices since the value obtained by subtracting the value "4" in the section 3405 for the initial setting value in the section for indication of the number of relayings from the value "4" indicating the number of node devices connected to the network system becomes "0".

On the other hand, the terminal equipment I 545 connected to the node device I 601 is the terminal equipment which transmitted the packet for register request. Since this packet for register request was relayed by all the node devices on the network system and returned to the own terminal equipment after completing its journey through the network once, the terminal equipment I 545 ends the transmission of the packet for register request upon reception of the packet for register request.

Thereafter, the terminal equipment I 545 as a terminal equipment to be newly registered connected to the node device I 601 forms and transmits a packet for transfer request in which "1" is set in the section 3401 for indication of the number of relayings of the header portion, "1" is set in the section 3402 for designation of the wavelength in use, and a value indicating the identification number of the terminal equipment I 545 is set in the section 3407 for identification of the terminal equipment newly registered.

The packet for transfer request is transmitted to the terminal equipment I 545 connected to the node device II 602, which neighbors the node device I 601. The packet processing unit 902 reads the value in the section for identification of the kind of packet of the header portion. Since the value indicating the packet for transfer request is set in this section, transfer processing of the terminal equipment connection table 903 is performed. The packet processing unit 902 searches the terminal equipment connection table 903 using the value in the section 3407 for identification of the terminal equipment newly registered of the data portion of the packet, and forms a packet (transfer packet) in which "3" is set in the section 3401 for indication of the number of relayings of the header portion, "1" is set in the section for designation of the wavelength in use, and the terminal equipment connection table 903 in the data portion. Then, the packet processing unit 902 transmits the formed packet to the terminal equipment I 545 connected to the node device I 601.

The transfer packet is received by the terminal equipment I 545 connected to the node device I 601, and the table stored in the packet is used as the terminal equipment connection table 903. In this case, this table is modified in correspondence with the terminal equipment I 545 connected to the node device I 601, and information (terminal equipment identification number, number of relayings, and reception wavelength) of the terminal equipment 545 connected to the node device II 602 is also added to the table. Then, the table is stored as the terminal equipment connection table 903. In this case, a terminal equipment to which a packet for transfer request is transmitted is not limited to the terminal equipment I 545 connected to the node device II 602 which neighbors the node device I 601. However, this terminal equipment is selected as the closest one.

The above-mentioned operations are shown in the operation flow charts of FIGS. 36 and 37. (10th Embodiment)

Figure 38:
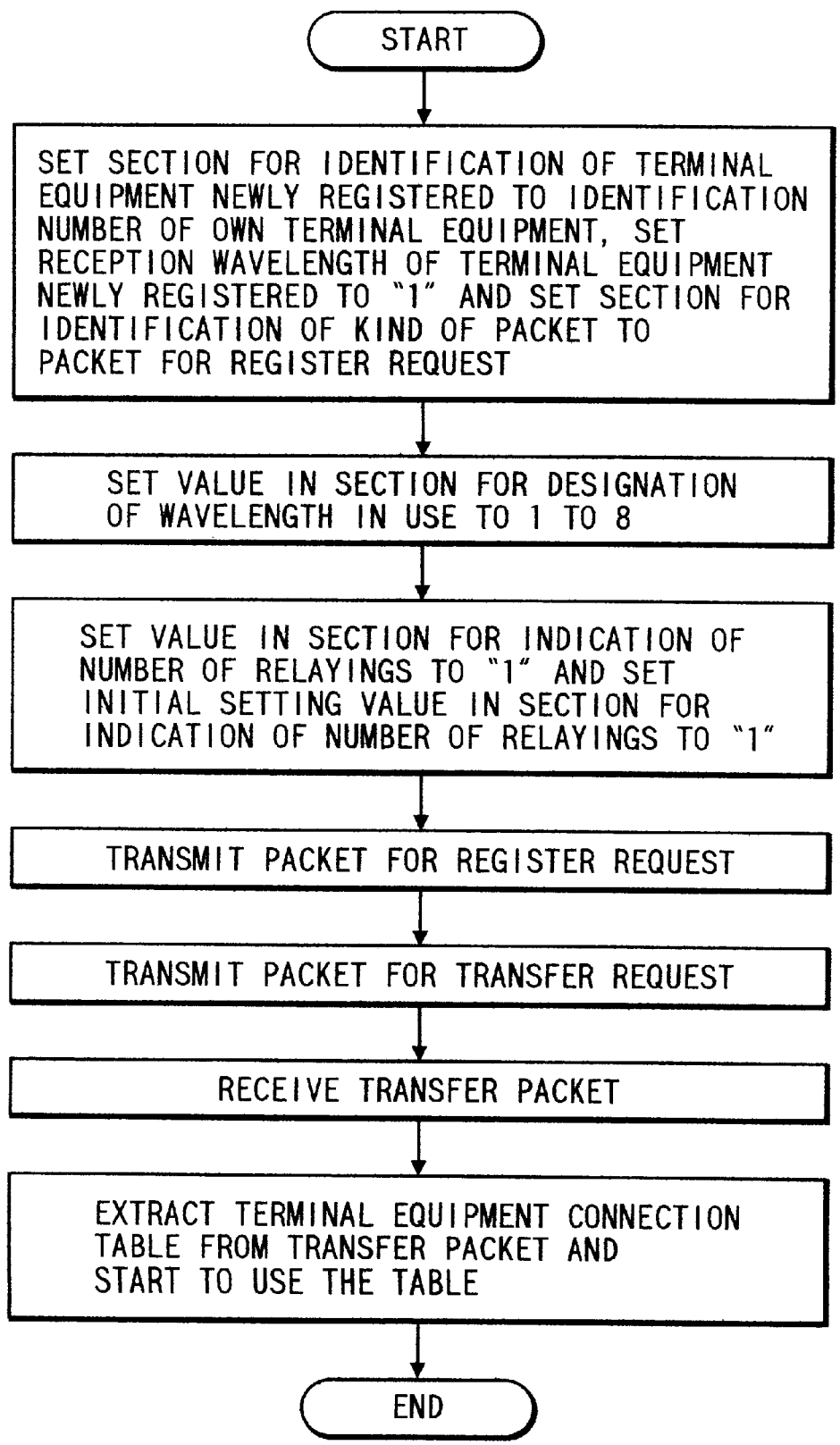
FIG. 38 is a flow chart showing the operation of a terminal equipment as a source of a packet for register request according to the 10th embodiment of the present invention.

FIG. 38 is a flow chart showing the operation of the terminal equipment as the source of a packet for register request in the 10th embodiment of the present invention.

Figure 39:
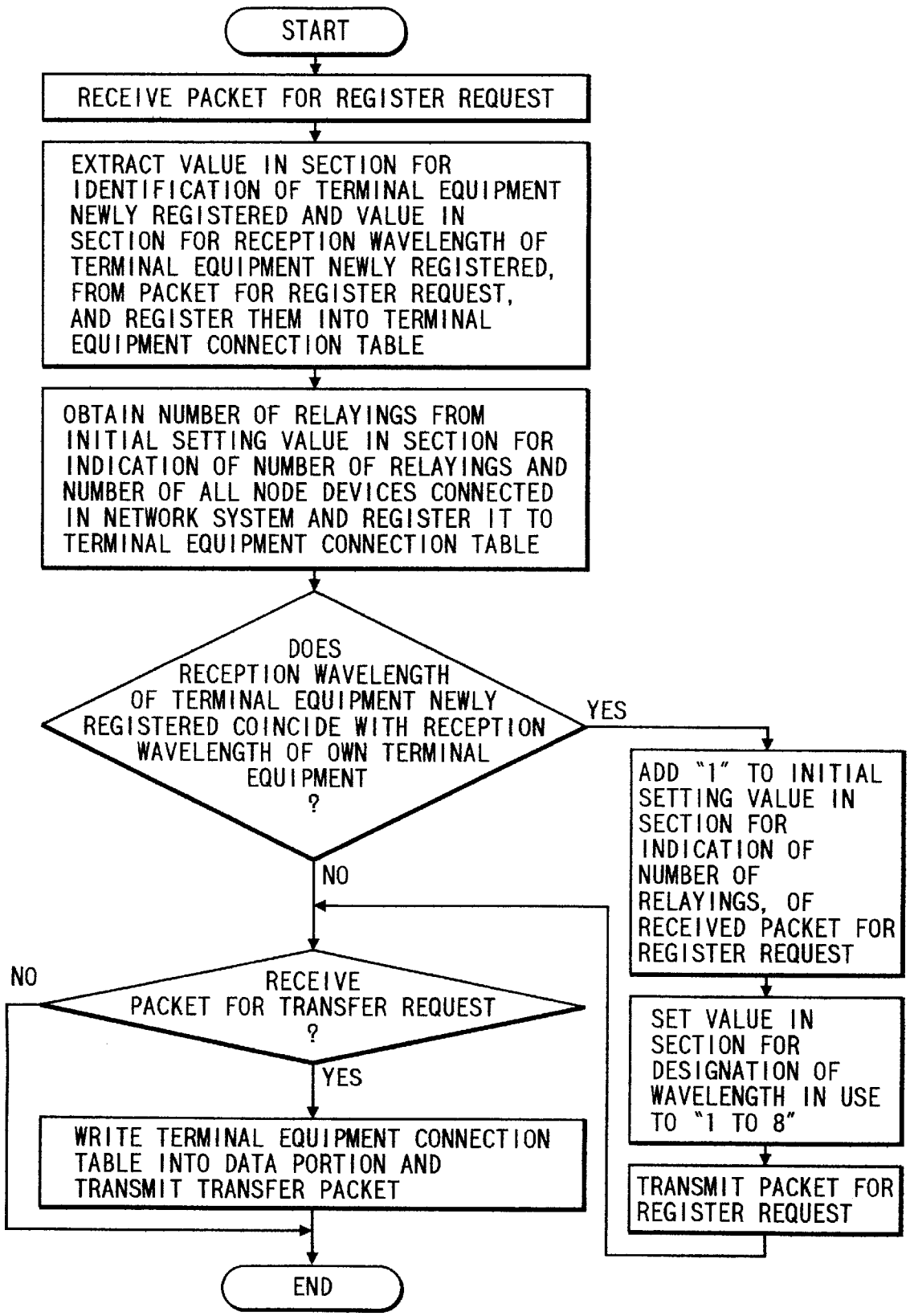
FIG. 39 is a flow chart showing the operation of a terminal equipment for receiving the packet for register request according to the 10th embodiment of the present invention.

FIG. 39 is a flow chart showing the operation of the terminal equipment which receives the packet for register request in the 10th embodiment of the present invention.

In the 10th embodiment, the terminal equipment as the source of a packet for register request transmits packets for register request in which "1" is set in the sections 3401 for indication of the number of relayings and "1" to "8" are set in the sections 3402 for designation of the wavelength in use to only the eight terminal equipments connected to the neighboring node deice at the downstream side. The terminal equipments which received these packets for register request register the information of the source terminal equipment in their terminal equipment connection tables as in the ninth embodiment. Furthermore, the terminal equipment whose reception wavelength is the same as that of the source terminal equipment of the packet for register request re-sets the packets by adding "1" to the value of the section 3405 for the initial setting value in the section for indication of the number of relayings of the received packet for register request, and transmits the packets to only the terminal equipments connected to the neighboring node device at the downstream side. In this manner, the terminal equipment whose reception wavelength is the same as that of the source terminal equipment of the packet for register request transmits packets for register request to the terminal equipments connected to the neighboring node device at the downstream side. When the terminal equipment as the source of the packet for register request receives the packet for register request, it ends the transmission of the packet for register request, and then performs, e.g., transmission of a packet for transfer request as in the ninth embodiment.

The above-mentioned operations are shown in the operation flow charts of FIGS. 38 and 39.

In this embodiment, since the number of packets for register request to be transmitted from the source terminal equipment of a packet for register request can be reduced, and a packet for register request is transmitted from a plurality of terminal equipments, the load upon transmission of the packet for register request can be reduced.

Upon execution of the operations of the ninth embodiment, if the packet for register request transmitted from the own terminal equipment is received before the packets for register request to be transmitted are transmitted to all the terminal equipments (such an error tends to occur especially when the number of node devices or the number of wavelengths is small), transmission of the packet for register request undesirably ends at that time, and the packet for register request can no longer be transmitted even if more destinations to which the packet for register request need be transmitted still remain (in particular, other terminal equipments connected to the node device to which the register request terminal equipment is connected). In order to solve this problem, a packet for register request to be transmitted to the respective node devices using a wavelength that can be received by the own terminal equipment (λ1 in the ninth embodiment) is sent after packets for register request transmitted using other wavelengths. For example, in the ninth embodiment, when packets for register request in which the value in the section for designation of the wavelength in use is sequentially changed while the value in the section for indication of the number of relayings is fixed are output from the register request terminal equipment, the value to be set in the section for designation of the wavelength in use can be changed in the order of, e.g., 2→3→4→5→6→7→8→1, so that "1" indicating the wavelength that can be received by the source is set last. The same applies to the 10th embodiment. However, in the sixth embodiment, if there are two or more node devices, the register request terminal equipment receives a packet relayed by another terminal equipment (not limited to a terminal equipment as long as the means used can process and transmit a packet) as a packet for register request transmitted by the own terminal equipment, the wavelength that can be received by the register request terminal equipment must be designated for the relaying terminal equipment. Alternatively, the need for this designation can be obviated if terminal equipments that can receive the same wavelength as the reception wavelength of the register request terminal equipment are used as the relaying terminal equipments.

In the above embodiment, a packet is broadcasted by relaying the packet from the register request terminal equipment to the respective node devices. The value in the section for indication of the number of relayings is set so that the node device to which the destination terminal equipment in which the source terminal equipment is to be registered is connected receives a packet in which information indicating the number of relayings becomes "0". However, another appropriate value may be used instead, and the number of relayings may be set by considering, as a relaying node device, the node device to which the destination terminal equipment in which the source terminal equipment is to be registered is connected.

As described above, in the connection information (terminal equipment and the like) registration method according to the present invention, since a packet for register request can be transmitted via the network system, the need for manual registration using input/output units of the terminal equipments can be obviated, and registration can be easily and accurately attained.

Furthermore, the source terminal equipment can detect that the packets for register request are transmitted to all the terminal equipments since the packet for register request transmitted from the own terminal equipment is transmitted thereto. For this reason, completion of transmission of packets for register request to all the terminal equipments can be easily detected.

As described above, one characteristic feature of the present invention is that a packet has information with which a node device can discriminate whether an input packet is to be output to another node device or is to be output to a sub transmission path, without comparing the destination address of the packet with the address of the sub transmission path (or the address of the terminal equipment connected to the sub transmission path).

In the arrangement of the first and second embodiments, the two output directions can be determined depending on whether or not the packet has a section for designation of the wavelength in use of the relaying node device. In the arrangement of the third and subsequent embodiments, the two output directions can be determined depending on whether or not the value in the section for indication of the number of relayings matches a given value ("0" in the above embodiments). The number of sections for indicating the number of relayings and the value indicating the number of relayings can be appropriately determined.

What is claimed is:

1. A network system for connecting node devices through a plurality of channels, wherein a node device comprises:
   receiving means for receiving, from at least one of the plurality of channels, a packet that includes number information indicating a number of relayings based on a number of node devices that are to relay the packet from said node device to a destination node device;
   determination means for determining a channel for transmitting the packet from the plurality of channels for connecting said node device and a first node device based on the number information; and
   output means for outputting the packet to an output channel determined by said determination means.

2. A system according to claim 1, wherein said node device further comprises rewrite means for rewriting the number information so that another node device can look up the rewritten number information when the packet is output toward the other node device.

3. A system according to claim 2, wherein said rewrite means rewrites the number information by performing a predetermined arithmetic operation on the number information.

4. A system according to claim 1, wherein the packet includes respective selection sections containing selection information for determining an output channel arranged in correspondence with each of the node devices that are to relay the packet.

5. A system according to claim 4, wherein said determination means refers to the selection information based on the number information.

6. A system according to claim 4, said node device further comprising processing means for, when said output means outputs the packet toward another node device, processing the packet so that a selection section corresponding to the other node device is located at a predetermined position in the packet.

7. A system according to claim 6, wherein
   the selection sections are arranged at predetermined positions in the packet in an order corresponding to an order of the node devices that are to relay the packet, and
   said processing means deletes a selection section corresponding to said node device.

8. A system according to claim 4, wherein said determination means determines whether or not to look up a selection section based on the number information.

9. A system according to claim 1, wherein, when the number information indicates that said node device is the destination node device, said output means outputs the packet through a sub transmission path to a terminal connected to said node device.

10. A system according to claim 1, wherein said receiving means can receive a packet from any of the plurality of channels, and said output means can output a packet to any of the plurality of channels.

11. A node device used in a network connecting node devices through a plurality of channels, said node device comprising:
    receiving means for receiving, from at least one of the plurality of channels, a packet that includes number information indicating a number of relayings based on a number of node devices that are to relay the packet from said node device to a destination node device;
    determination means for determining a channel for transmitting the packet from said plurality of channels connecting said node device to a first node device based on the number information; and output means for outputting the packet to an output channel determined by said determination means.

12. A node device according to claim 11, further comprising rewrite means for rewriting the number information so that another node device can look up the rewritten number information when the packet is output toward the other node device.

13. A node device according to claim 12, wherein said rewrite means rewrites the number information by performing a predetermined arithmetic operation on the number information.

14. A node device according to claim 11, wherein the packet includes respective selection sections containing selection information for determining an output channel arranged in correspondence with each of the node devices that are to relay the packet.

15. A node device according to claim 14, wherein said determination means refers to the selection information based on the number information.

16. A node device according to claim 14, further comprising processing means for, when said output means outputs the packet toward another node device, processing the packet so that a selection section corresponding to the other node device is located at a predetermined position in the packet.

17. A node device according to claim 16, wherein the selection sections are arranged at predetermined positions in the packet in an order corresponding to an order of the node devices that are to relay the packet, and said processing means deletes a selection section corresponding to said node device.

18. A node device according to claim 14, wherein said determination means determines whether or not to look up a selection section based o n the number information.

19. A node device according to claim 11, wherein, when the number information indicates that said node device is the destination node device, said output means outputs the packet through a sub transmission path to a terminal connected to said node device.

20. A node device according to claim 11, wherein said receiving means can receive a packet from any of the plurality of channels, and said output means can output a packet to any of the plurality of channels.

21. A method for controlling a node device used in a network connecting a plurality of node devices through a plurality of channels, said method comprising the steps of:

receiving, from at least one of the plurality of channels, a packet that includes number information indicating a number of relayings based on a number of node devices that are to relay the packet from said node device to a destination node device;

determining a channel for transmitting the packet from the plurality of channels connecting said node device to a first node device based on the number information; and outputting the packet to an output channel determined in said determining step.

22. A method according to claim 21, further comprising, at said node device, a rewrite step of rewriting the number information so that another node device can look up the rewritten number information when the packet is output toward the other node device.

23. A method according to claim 22, wherein said rewrite step rewrites the number information by performing a predetermined arithmetic operation on the number information.

24. A method according to claim 21, wherein the packet includes respective selection sections containing selection information for determining an output channel arranged in correspondence with each of the node devices that are to relay the packet.

25. A method according to claim 24, wherein said determining step refers to the selection information based on the number information.

26. A method according to claim 24, further comprising, at said node device, a processing step of, when said outputting step outputs the packet toward another node device, processing the packet so that a selection section corresponding to the other node device is located at a predetermined position in the packet.

27. A method according to claim 26, wherein the selection sections are arranged at predetermined positions in the packet in an order corresponding to an order of the node devices that are to relay the packet, and said processing step deletes a selection section corresponding to said node device.

28. A method according to claim 24, wherein said determining step determines whether or not to look up a selection section based on the number information.

29. A method according to claim 21, wherein, when the number information indicates that said node device is the destination node device, said output step outputs the packet through a sub transmission path to a terminal connected to said node device.

30. A method according to claim 21, wherein said receiving step can receive a packet from any of the plurality of channels, and said output step can output a packet to any of the plurality of channels.

31. A relay node device for use in a network connecting node devices through a transmission path in which a plurality of communication channels are multiplexed and transmitting communication data from a first communication device connected to a first node device to a second communication device connected to a second node device, said relay node device comprising:

receiving means for receiving communication data to which number information is added, the number information being based on a number of node devices through which the communication data is transmitted from the first communication device to the second communication device;

determination means for determining a communication channel for transmitting the communication data from the plurality of multiplexed communication channels based on the number information; and transmitting means for transmitting the communication data through the communication channel determined by said determination means.

32. A relay node device according to claim 31, wherein when said relay node device is not the second node device, based on the number information, the communication data is transmitted to another node device.

33. A relay node device according to claim 31, wherein when said relay node device is the second node device, based on the number information, the communication data is transmitted to the second communication device.

34. A relay node device according to claim 31, wherein the number information is added to a packet by the first communication device.

35. A relay node device according to claim 31, wherein said transmitting means rewrites the number information as rewritten number information and then transmits the communication data with the rewritten number information to another node device.

36. A relay node device according to claim 31, wherein the network connects the node devices through the plurality of multiplexed channels.

37. A relay node device according to claim 36, wherein channel information indicating the determined communication channel through which the communication data is to be transmitted is added to the communication data.

38. A relay node device according to claim 37, wherein the communication data is transmitted through the determined communication channel to the second node device by a node device one node prior to the second node device.

39. A relay node device according to claim 37, wherein the communication data is transmitted through the determined communication channel by a node device adjacent to the first node device.

40. A network system according to claim 1, wherein said determination means performs the determination when the number information indicates that said node device is not said destination node device.

41. A node device according to claim 11, wherein said determination means performs the determination when the number information indicates that said node device is not said destination node device.

42. A method according to claim 21, wherein said determination means performs the determination when the number information indicates that said node device is not said destination node device.

43. A relay node device according to claim 31, wherein said determination means determines, based on the number information, whether the communication data is to be transmitted to the communication device connected to said relay node device or to another node device connected through the plurality of multiplexed communication channels, and said determination means performs the determination of a communication channel when a determination is made to transmit to another node device.

44. A relay node device according to claim 43, wherein when said determination means determines that the communication data is to be transmitted to the communication device connected to said relay node device, said transmitting means transmits the communication data to the communication device connected to said relay node device.

* * * * *

UNITED STATES PATENT AND TRADEMARK OFFICE
CERTIFICATE OF CORRECTION

PATENT NO. : 6,044,076
DATED : March 28, 2000
INVENTOR(S) : Mitsuru Yamamoto

It is certified that error appears in the above-identified patent and that said Letters Patent is hereby corrected as shown below:

[*] Notice,
Insert, -- [*] Notice: This patent issued on a continued prosecution application filed under 37 CFR 1.53 (d), and is subject to the twenty year patent term provisions of 35 U.S.C. 154 (a) (2). --.

[57] ABSTRACT,
Line 14, "determines" should read -- determine --.

Column 9,
Line 46, "comprises" should read -- comprise --.

Column 10,
Line 9, "includes" should read -- include --.

Column 11,
Line 65, "count" should read -- counting --.
Line 66, "of" (first occurrence) should be deleted.

Column 12,
Line 16, "count" should read -- counting --.
Line 17, "of" (first occurrence) should be deleted.

Column 13,
Line 54, "to be not" should read -- not to be --.

Column 14,
Line 37, "to be not" should read -- not to be --.

Column 15,
Line 22, "designates" should read -- designate --.
Table 2, "$\lambda 6$  7         -- $\lambda 6$  6
         $\lambda 7$  8" should read   $\lambda 7$  7
                                       $\lambda 8$  8 --.

Column 17,
Line 29, "section." should read -- section --.

Column 30,
Line 19, "need" should read -- needs to --.

UNITED STATES PATENT AND TRADEMARK OFFICE
CERTIFICATE OF CORRECTION

PATENT NO. : 6,044,076
DATED : March 28, 2000
INVENTOR(S) : Mitsuru Yamamoto

It is certified that error appears in the above-identified patent and that said Letters Patent is hereby corrected as shown below:

Column 48,
Line 19, "deice" should read -- device --.
Line 58, "need" should read -- needs to --.

Column 51,
Line 33, "o n" should read -- on --.

Signed and Sealed this

Eleventh Day of December, 2001

Attest:

NICHOLAS P. GODICI
Attesting Officer
Acting Director of the United States Patent and Trademark Office